（12）United States Patent
Kobayashi et al.

(10) Patent No.: US 7,579,130 B2
(45) Date of Patent: *Aug. 25, 2009

(54) IMAGE TRANSFER SHEET FOR ELECTROPHOTOGRAPHY, METHOD FOR MANUFACTURING IMAGE RECORDED MEDIUM USING THE SAME, AND IMAGE RECORDED MEDIUM

(75) Inventors: Tomoo Kobayashi, Minamiashigara (JP); Kaoru Torikoshi, Minamiashigara (JP); Kunio Sakurai, Ashigarakami-gun (JP); Tetsuro Kodera, Ashigarakami-gun (JP); Naoyuki Egusa, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 526 days.

This patent is subject to a terminal disclaimer.

(21) Appl. No.: 11/298,848

(22) Filed: Dec. 12, 2005

(65) Prior Publication Data

US 2007/0031650 A1 Feb. 8, 2007

(30) Foreign Application Priority Data

Aug. 8, 2005 (JP) .............................. 2005-230164

(51) Int. Cl.
*G03G 13/16* (2006.01)
(52) U.S. Cl. .............................. 430/125.3; 430/125.31; 428/446; 428/447; 428/448
(58) Field of Classification Search ............. 430/125.3, 430/125.31; 428/446, 447, 448
See application file for complete search history.

(56) References Cited

U.S. PATENT DOCUMENTS

| 5,437,913 A | 8/1995 | Asaka et al. |
| 5,593,939 A | 1/1997 | Saito et al. |
| 6,723,444 B2 | 4/2004 | Kobayashi et al. |
| 7,052,817 B2 | 5/2006 | Sakurai et al. |
| 2004/0161690 A1* | 8/2004 | Sakurai et al. ............... 430/124 |

FOREIGN PATENT DOCUMENTS

| CN | 1196302 A | 10/1998 |
| CN | 1467573 A | 1/2004 |
| CN | 1523454 A | 8/2004 |
| JP | A 05-096871 | 4/1993 |
| JP | A 07-068812 | 3/1995 |
| JP | A-08-142365 | 6/1996 |
| JP | A 08-142365 | 6/1996 |
| JP | A 08-156302 | 6/1996 |
| JP | A 09-314875 | 12/1997 |
| JP | A 10-86562 | 4/1998 |
| JP | A 11-291646 | 10/1999 |
| JP | A 11-334265 | 12/1999 |

(Continued)

*Primary Examiner*—Mark A Chapman
(74) *Attorney, Agent, or Firm*—Oliff & Berridge, PLC

(57) ABSTRACT

An image transfer sheet for electrophotography comprising a substrate and at least one layer including an image receiving layer on one side surface of the substrate, wherein at least one layer of the layers is a curable resin-containing layer which is a layer separable from the substrate or a layer disposed between the curable resin-containing layer and the substrate on the one side surface. Also provided are a method for manufacturing the image recorded medium which use the image transfer sheet for electrophotography and an image recorded medium.

10 Claims, 3 Drawing Sheets

FOREIGN PATENT DOCUMENTS

| | | |
|---|---|---|
| JP | A-01-092255 | 4/2001 |
| JP | A 2001-92255 | 4/2001 |
| JP | A-2002-72530 | 3/2002 |
| JP | B2 3359962 | 10/2002 |
| JP | B2 3359963 | 10/2002 |
| JP | A-2004-351660 | 12/2004 |

* cited by examiner

IMAGE TRANSFER SHEET FOR ELECTROPHOTOGRAPHY, METHOD FOR MANUFACTURING IMAGE RECORDED MEDIUM USING THE SAME, AND IMAGE RECORDED MEDIUM

CROSS-REFERENCE TO RELATED APPLICATION

This application claims priority under 35 USC 119 from Japanese Patent Application No. 2005-230164, the disclosure of which is incorporated by reference herein.

BACKGROUND OF THE INVENTION

1. Field of the Invention

The present invention relates to an image transfer sheet for electrophotography for forming (recording) a clear image on an image supporting element by use of an electrophotographic image formation apparatus, a method for manufacturing an image recorded medium using the same and an image recorded medium. More specifically, the present invention relates to an image transfer sheet for electrophotography for forming a printed image. The printed image may be used for image recorded media, such as information recording media containing personal information and image information of the non-contact or contact types. Such image recorded media may be facial-photograph-containing cash cards, employee identification cards, student identification cards, individual membership cards, resident identification cards, various types of driver's licenses, various types of qualification certificates, and the like. The printed image may be used also for RFID tags, and for image recorded sheets for personal identification and image display boards used in medical settings, and for indication labels, and the like. The invention also relates to a method for manufacturing an image recorded medium using the same, and an image recorded medium.

2. Description of the Related Art

In recent years, the image formation technology has developed. Currently, means are known which can form images of the same quality in large quantities at low cost by various printing methods, such as intaglio printing, letterpress printing, planographic printing, gravure printing, and screen printing. Such printing methods are also widely used for manufacturing an information recording medium which stores predetermined information and which can communicate with an external device in a contact or non-contact manner, such as an IC card, a magnetic card, an optical card, and a card which is a combination thereof.

However, for example, the above-mentioned screen printing requires a lot of printing plates corresponding to the number of images to be printed. In the case of color printing, the required printing plates are further increased corresponding to the number of colors. Therefore, these printing methods are not suitable for individual pieces of personal identification information (including the facial photograph, the name, the address, the date of birth, the variety of licenses, and the like).

Against the above-mentioned problem, the most dominant image formation means currently used is the image formation method based on the printer or the like which employs a sublimation-type or melting-type heat-transfer method using an ink ribbon, or the like. However, while these can easily print personal identification information, these still have a problem that increase in the printing speed lowers the resolution, and increase in the resolution leads to decrease in the printing speed.

A heat-transfer method has been proposed which uses an intermediate transfer element for printing onto the image recording medium (as disclosed, for example in Japanese Patent Application Laid-Open (JP-A) No. 5-096871, JP-A No. 7-068812, JP-A No. 8-142365, JP-A No. 8-156302, JP-A No. 9-314875, and JP-A No. 11-291646). However, in any case, a thin colored layer transferred from the ink sheet is formed on the surface of the above-mentioned intermediate transfer element. A good image quality cannot be obtained unless the thin colored layer is properly transferred to the image recording medium. In addition, the image quality basically depends on the irregularities on the surface of the image recording medium. Therefore, in order to improve the adhesion to the image recording medium, a rubber-like elastic layer is provided on the intermediate transfer element. The image is transferred by pressure contact, so that the image quality is maintained. The surface layer of the intermediate transfer elements is basically designed to have releasability. However, because the surface layer has to be able to follow the deformation of the above-mentioned rubber-like elastic layer, a hard surface layer cannot be used. Therefore, specifically, a silicone rubber or fluorine rubber is used for the surface layer.

In image formation (printing) by the electrophotographic method, the surface of the image carrier is electrically charged uniformly, and then subjected to light exposure according to image signals, to form an electrostatic latent image based on the difference in potential between the exposed portion and the unexposed portion. Thereafter, electrostatic development is conducted with a color powder (an image forming material) called toner with the opposite polarity to (or with the same polarity as) that of the charge of the image carrier, thereby forming a visible image (a toner image) on the surface of the image carrier. In the case of a color image, the color image is created by repetition of this process a plurality of times or by processes conducted by a plurality of image formation units disposed in parallel to form a color visible image, and the color visible image is transferred to an image recording medium and fixed (immobilized, in other words, melting of the color powder mainly by heat followed by solidification thereof by cooling).

As described above, by the electrophotographic method, the electrostatic latent image on the surface of the image carrier is electrically formed based on the image signals. Therefore, it is possible to form the same image any number of times, and it is also possible to easily form different images. In addition, almost the entire toner image on the surface of the image carrier can be transferred to the image forming material transfer element or to the surface of the image recording medium. Moreover, a slight amount of toner image remaining on the surface of the image carrier can also be easily removed by means of a resin blade, a brush, or the like; accordingly, it is possible to easily produce prints for high-mix, low-volume production.

In addition, the above-mentioned toner is generally formed by fusing and mixing a thermally fusible resin and a pigment, as well as optional additives such as a charge control agent, and then pulverizing and atomizing the kneaded substance. Further, the electrostatic latent image in the electrophotographic method has a considerably higher resolution compared with the above-mentioned atomized toner, and a sufficient resolution on a par with the resolutions realized by the screen printing and the heat-transfer method using ink ribbon can be expected.

Also, a color image can be obtained by using color toners of four primary colors of cyan, magenta, yellow, and black and then mixing the toner images of the respective colors.

Theoretically, the same colors as realized in printing can be reproduced. In addition, in the above-mentioned color toner, the toner resin and the pigment can be relatively freely compounded, thereby enabling easy increase in light shielding property of the image.

In addition, there have been almost no studies on the heat resistance and light resistance of information recording media intended to be used outdoors. Particularly when a driver's license or the like is left in a car and exposed to direct sunlight, fading occurs if the image is a heat-transferred image using a dye as a coloring material. However, when a color image is formed by the electrophotographic method, pigments corresponding to the respective colors of cyan, magenta, yellow, and black used in the color toner have excellent light resistance. Therefore, the light resistance of the images formed by the electrophotographic method is considered to be sufficiently high. Likewise, if a heat-resistant toner is selected, the heat resistance of the image formed on an information recording medium is considered to be high enough to allow the information recording medium to be used outdoors.

On the other hand, the most widely used substrates (cores) used for various types of cards are currently vinyl chloride sheets. This is because vinyl chloride sheets are excellent in printing characteristics in conventional printing machines, because they are also excellent in suitability for embossing (process to raise or lower the character portions), and particularly because they are inexpensive. However, the above-mentioned vinyl chloride sheets have a problem that dioxins are generated when cards are incinerated using a heating furnace or the like after being disposed of due to expiration or the like. From the viewpoint of environmental compatibility, various types of sheet films are currently used more widely as alternatives to vinyl chloride cards.

If embossing is not carried out in the manufacturing of cards, conventional films such as biaxially stretched PET (polyethylene terephthalate) films can be used. However, in order to retain the functions of the conventional cards, embossing is often indispensable. Films currently used for embossing include: ABS (acrylonitril-butadiene-styrene) resin films and polyolefin resin films, which soften at relatively low temperatures; a modified PET resin film called PETE, which is obtained by copolymerizing at least ethylene glycol, terephthalic acid, and 1,4-cyclohexane dimethanol; and films obtained by integrally forming a modified PET resin film and (a PET film, an amorphous PET resin film, or a polycarbonate resin film).

A method for producing prints has been proposed which uses the above-described electrophotographic apparatus and further uses a transfer sheet (as disclosed in U.S. Pat. No. 3,359,962 and U.S. Pat. No. 3,359,963). However, in the above-mentioned sheet, the surface resistivity of the thermal adhesion layer, which works an image receiving layer, is particularly high. Therefore, transfer of the image forming material to the surface of the sheet may be defective, whereby fine characters are not reproduced. In T-shirt printing, since a large design and a hue are reproduced, use of such a sheet is not problematic. However, it is impossible to reproduce on the sheet delicate information, such as a facial photograph and a two-point character to be recorded on an ID card. In addition, the charge caused by a high resistance is problematic since the charge easily attracts fiber waste, dust, dirt, and the like, which seriously affect the card quality. In addition, when the supporting element is a plastic film, the coefficient of friction between sheets is too high, whereby the sheets tightly adhere to one another and the transferability of the sheets is deteriorated.

On the other hand, a method has been proposed, for example in JP-A No. 2001-92255. In the method, in addition to various types of personal information, an invisible barcode is printed on a vinyl chloride sheet having a thickness of 250 μm or on a polyester sheet having a thickness of 280 μm by the electrophotographic method; then an over-film is superposed on each printed surface, and lamination is carried out by a hot-press machine.

However, in the above-mentioned sheet, the coefficient of friction between sheets is too high. Therefore, the sheets tightly adhere to one another, thereby deteriorating the transferability of the sheets. This poor transferability may stop the electrophotographic apparatus. Further, an insulator (a sheet) having a thickness of 250 μm or larger as mentioned above may cause an increased image defect because of insufficient transfer of the image forming material (toner) thereto. In addition, when the resin film which softens at a relatively low temperature is used for image formation by an electrophotographic apparatus, the following problem occurs: the tackiness develops during the fixing process because the fixing temperature is higher than the softening temperature of the film; and the film winds around the fixing apparatus, resulting in jamming. Further, the image forming material may offset to the fixing apparatus. Further, when fixing is continuously conducted on the sheet having a thickness of 250 μm or larger, the edge (corner) of the sheet may unnecessarily damage the fixing apparatus, causing necessity for frequently replacement of members.

As another example, a method has been proposed in which a mirror image of personal identification information is printed on an optically transparent sheet (as disclosed, for example in JP-A No. 11-334265). However, with respect to the optically transparent laminate sheet, the JP-A No. 11-334265 only teaches that at least a part the laminate sheet is preferably a biaxially stretched polyester film, ABS, or a film/biaxially stretched polyester film consisting of polyester, but may also be vinyl chloride.

Therefore, in this structure, since the film is simply an insulator, transfer of the image forming material to the surface of the film or the like may be defective, and a resolution cannot be as high as that realized by the heat-transfer method or the like. In addition, in this apparatus focusing on improved productivity, the laminate sheet to be used is in the form of a roll. Therefore, there is a problem that a lot of loss and waste inevitably occur in order to meet the need for urgent or high-mix production, such as when conducting different types of print for cards for one to several persons.

Also, JP-A No. 10-86562 discloses an image formation method that uses a recognition and identification medium obtained by superposing an adhesive layer on a supporting element (a substrate), disposing a transparent sheet on the adhesive layer, and forming an image with a colorant between the supporting element and the transparent sheet. In this method, the total thickness of the image identifying medium is the sum of the thickness of the substrate, the transparent sheet, and the adhesive layer. When the image identifying medium is an IC card, a magnetic card or the like, the respective thickness must be controlled to meet the specification of the card thickness (760 μm±80 μm). Particularly, the substrate for an IC card contains an IC chip, an antenna or the like, whereby the thickness of the substrate is often close to the limit of the specification for the card thickness. Therefore, this method has problems that the card thickness is increased by the thickness of the transparent sheet and the thickness of the adhesive layer to exceed the specified thickness limit.

Further, with respect to cards such as an IC card, an magnetic card and the like, there are cards whose surfaces are over-coated by an image from an ink sheet or a film and long-term use, the surfaces may be scratched by friction with other cards and contact with a card holder when inserting and removing the cards.

SUMMARY OF THE INVENTION

The present invention has been made in consideration of the above problems of the conventional techniques. That is, the invention provides an image transfer sheet for electrophotography capable of transferring an image formed by electrophotography on an image supporting element in a protected condition, and a method manufacturing for an image recorded medium using the sheet and an image recorded medium.

Besides the above-mentioned problems, the inventors have made investigations into the following items. For example: (1) a method of improving the transferability by adding fine particles to the image receiving layer, (2) a method for forming a mirror image so as to make the image seen as a normal reverse image (an ordinary image) when the image is observed from the side opposite to the side on which the image is formed through the substrate, and (3) an improvement of transferability in the inside of an image forming apparatus by lowering the friction coefficient on the surface of an image transfer element with the use of an acrylic resin, a polyester resin, or a polyacetal resin as a resin to be contained in the coating layer such as the image receiving layer which is formed on the surface of an image formation material transfer sheet for electrophotography and with the addition of a filler in the coating layer.

The invention provides an image transfer sheet for electrophotography comprising a substrate and at least one layer including an image receiving layer on one side surface of the substrate, wherein at least one layer of the layers is a curable resin-containing layer which is a layer separable from the substrate or a layer disposed between the curable resin-containing layer and the substrate on the one side surface.

The invention further provides an image recorded medium formed by process comprising: providing an image transfer sheet for electrophotography comprising a substrate and an image receiving layer provided on a surface of the substrate; electrophotographically forming a mirror image of a desired image made of an image forming material on the image receiving layer of the image transfer sheet; adhering the image receiving layer to an image supporting element by heat and pressure such that the mirror image contacts the image supporting element; and after cooling and solidifying the image formation material, peeling the substrate off the image receiving layer so as to transfer the image formation material to the image supporting element, wherein the image transfer sheet for electrophotography is the image transfer sheet for electrophotography as described above.

The invention further provides a method for manufacturing an image recorded medium, the method comprising: providing an image transfer sheet for electrophotography comprising a substrate and an image receiving layer provided on the substrate; electrophotographically forming a mirror image of a desired image made of an image forming material on the surface of the image transfer sheet which surface is on the side having thereon the image receiving layer; superposing the image transfer sheet on an image supporting element such that a surface of the image supporting element and the fixed mirror image contact each other to form a stacked assembly; subjecting the stacked assembly to thermocompression bonding; and after cooling and solidification of the image forming material; peeling the substrate off the image receiving layer so as to transfer the image forming material to the image supporting element, wherein the image transfer sheet for electrophotography is the image transfer sheet for electrophotography as described above.

The invention further provides a method for manufacturing an image recorded medium comprising providing an image transfer sheet for electrophotography comprising a substrate and an image receiving layer provided on the substrate; electrophotographically forming a mirror image of a desired image made of an image forming material on the surface of the image transfer sheet which surface is on the side having thereon the image receiving layer; superposing the image transfer sheet on an image supporting element such that a surface of the image supporting element and the fixed mirror image contact each other to form a stacked assembly; subjecting the stacked assembly to thermocompression bonding; and after cooling and solidification of the image forming material; peeling the substrate off the image receiving layer so as to transfer the image forming material to the image supporting element, wherein the image transfer sheet for electrophotography comprising a substrate and at least one layer including an image receiving layer on one side surface of the substrate, wherein at least one layer of the layers is a curable resin-containing layer which is a layer separable from the substrate or a layer disposed between the curable resin-containing layer and the substrate on the one side surface, and two image recorded medium are produced using one transfer sheet for electrophotography.

DETAILED DESCRIPTION OF THE INVENTION

Figure 1:
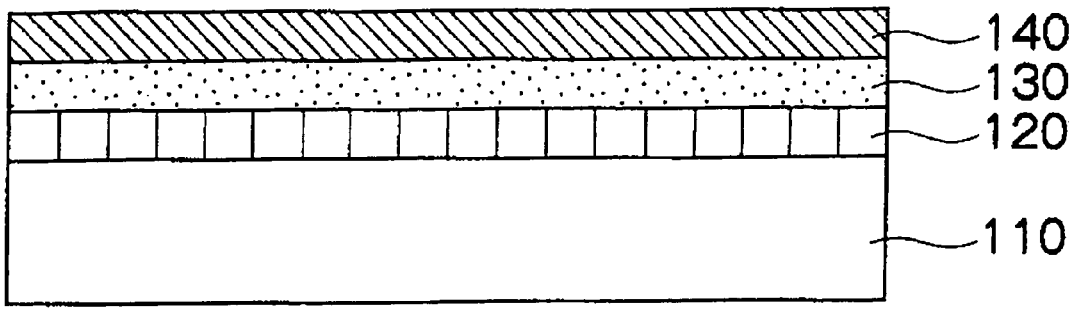
FIG. 1 is a schematic cross-sectional view showing an example of the first embodiment of an image transfer sheet of the present invention.

Hereinafter, the present invention will be described in detail.

(Transfer Sheet for Electrophotography)

The transfer sheet for electrophotography (hereinafter, occasionally abbreviated to "transfer sheet") of the present invention is a an image transfer sheet for electrophotography which comprises a substrate and at least one layer including an image receiving layer on one surface of a substrate, wherein at least one layer of the layers is a curable resin-containing layer which is a layer separable from the substrate or separable from a layer disposed between the curable resin-containing layer and the substrate on the one side surface. Since the above-mentioned curable resin-containing layer is released from a substrate or a layer disposed between the curable resin-containing layer and the substrate on the one side surface, when an image formed by an electrophotographic method is transferred to the image supporting element, the curable resin-containing layer is released from a substrate or a layer disposed between the curable resin-containing layer and the substrate on the one side surface and covers the image transferred to the image supporting element and thus protects the image.

The transfer sheet of the invention has a peel strength between the curable resin-containing layer and the substrate or between the curable resin-containing layer and a layer disposed between the curable resin-containing layer and the substrate on the one side surface preferably in a range of 0.098 N/cm to 4.90 N/cm (10 gf/cm to 500 gf/cm), more preferably in a range of 0.196 N/cm to 3.92 N/cm (20 gf/cm to 400 gf/cm), and even more preferably in a range of 0.490 N/cm to 2.41 N/cm (50 gf/cm to 250 gf/cm). If the peel strength is lower than 0.98 N/cm (10 gf/cm), the releasing layer and the curable resin-containing layer are easily peeled so that the curable resin-containing layer may be transferred to a fixing apparatus of an electrophotographic apparatus at the time of image fixation or that the curable resin-containing layer slips relative to the releasing layer at the time of manufacturing the image recorded medium, thereby causing image defects owing to transfer defects. On the other hand, if the peel strength exceeds 4.90 N/cm (500 gf/cm), the curable resin-containing layer is partially left in the releasing layer and it may be recognized as a defect on the surface of the image recorded medium. The above-mentioned peel strength is a value measured in terms of the strength of 180 degree-peel adhesion specified in JIS Z0237.

Next, the respective embodiments of the image transfer sheet for electrophotography of the invention will be described.

A first embodiment of the image transfer sheet for electrophotography of the invention (hereinafter, referred to as "a transfer sheet of the first invention" in some cases) is an image transfer sheet for electrophotography of which both surfaces have a surface resistivity in the range of $1.0 \times 10^8 \Omega$ to $1.0 \times 10^{13} \Omega$ at 23° C. and 55% RH. The transfer sheet comprises a substrate and an image receiving layer formed thereon. Between the substrate and the image receiving layer, a releasing layer and a curable resin layer containing a curable resin may be disposed. That is, the transfer sheet comprises a releasing layer, a curable resin layer containing a curable resin and an image receiving layer formed successively in this order from the substrate side. In the transfer sheet of the first invention, the curable resin layer is the curable resin-containing layer and the curable resin layer is separable from the release layer which is adjacent in the substrate side. That is, when an image formed by an electrophotographic method is transferred to the image supporting element which receives the image, the curable resin layer is peeled from the releasing layer, and the curable resin layer covers the image transferred to the image supporting element and thus protects the image.

In the transfer sheet of the first invention, the image receiving layer formed on the surface has a proper surface resistivity range, and satisfactory electrophotographic image formation can be carried out well without causing transfer failure or the like.

Further, in the transfer sheet of the first invention, the image receiving layer is provided on the curable resin layer, and therefore, when an image is formed with a toner on the image receiving layer, the toner does not spread into any other layer, and the resolution is improved.

On the other, in the transfer sheet of the first invention, the image receiving layer preferably has a thickness of 2 to 25 µm and contains a thermoplastic resin and comprises fine particles having a volume average particle diameter which is larger than the thickness of the image receiving layer. In this case, the image receiving layer contains fine particles larger than the thickness of the image receiving layer itself and therefore, the releasing layer enables not only a good transfer of the image forming material to be described hereinafter to the image supporting element but also excellent fixability of the image forming material in an electrophotographic method.

Accordingly, the invention can provide an image forming material-transfer sheet for electrophotography with which a high quality image can be obtained by an electrophotographic method.

The releasing layer in the transfer sheet of the first invention is a layer for releasing the image forming material together with the curable resin layer and the image receiving layer when the transfer sheet and the image supporting element are subjected to thermocompression bonding. The releasing layer comprises a resin material, and the resin material enables proper sticking and fixing of the image formation material to the image receiving layer in the transfer sheet and releasing of the image forming material together with the curable resin layer and the image receiving layer when the transfer sheet and the image supporting element are subjected to thermocompression bonding.

Such a releasing material is not particularly limited. The releasing material is preferably a silicone hardcoat material The silicone hardcoat material to be used in the present invention comprises a condensate resin containing at least a silane composition, or a mixture composition of the condensate resin and a colloidal silica dispersion liquid. In order to improve the adhesion to the substrate, silicone hardcoat material may further comprise an organic resin.

The silane composition is specifically an organic silicon compound, and examples thereof include silane compounds, fluorine-containing silane compounds, and isocyanate silane compounds. Such an organic silicon compound forms a resin composition through condensation reaction.

Examples of the silane compounds include: alkoxysilanes such as $Si(OCH_3)_4$, $CH_3Si(OCH_3)_3$, $H_2Si(OCH_3)_3$, $(CH_3)_2Si(OCH_3)_2$, $CH_3SiH(OCH_3)_2$, $C_6H_5Si(OCH_3)_3$, $Si(OC_2H_5)_4$, $CH_3Si(OC_2H_5)_3$, $(CH_3)_2Si(OC_2H_5)_2$, $H_2Si(OC_2H_5)_2$, $C_6H_5Si(OC_2H_5)_3$, $(CH_3)_2CHCH_2Si(OCH_3)_3$, $CH_3(CH_3)_{11}Si(OC_2H_5)_3$, $CH_3(CH_2)_{15}Si(OC_2H_5)_3$, and $CH_3(CH_2)_{17}Si(OC_2H_5)_3$; silazanes such as $(CH_3)_3SiNHSi(CH_3)_3$; special silylating agents such as $((CH_3)SiNH)_2CO$ and tert-$C_4H_9(CH_3)_2SiCl$; silane coupling agents; and silane compounds such as $HSC_3H_6Si(OCH_3)_3$; as well as hydrolysates and partial condensates thereof.

Examples of the silane coupling agents include: vinyl silanes such as vinyl tris(β-methoxyethoxy)silane, vinyltriethoxysilane, and vinyltrimethoxysilane; acryl silanes such as γ-methacryloxypropyltrimethoxysilane; epoxy silanes such as β-(3,4-epoxycyclohexyl)ethyltrimethoxysilane and γ-glycidoxypropylmethyldiethoxysilane; and amino silanes such as N-β-(amino ethyl)-γ-aminopropylmethyldimethoxysilane, γ-aminopropyltriethoxysilane, and N-phenyl-γ-aminopropyltrimethoxysilane.

Examples of the fluorine-containing silane compounds include: fluorine-containing silane compounds such as $CF_3(CH_2)_2Si(OCH_3)_3$, $C_6F_{13}C_2H_4Si(OCH_3)_3$, $C_7F_{15}CONH(CH_2)_3Si(OC_2H_5)_3$, $C_8F_{17}C_2H_4Si(OCH_3)_3$, $C_8F_{17}C_2H_4SiCH_3(OCH_3)_2$, $C_8F_{17}C_2H_4Si(ON=C(CH_3)(C_2H_5))_3$, $C_9F_{19}C_2H_4Si(OCH_3)_3$, $C_9F_{19}C_2H_4Si(NCO_3$, $(NCO)_3SiC_2H_4C_6F_{12}C_2H_4Si(NCO)_3$, $C_9F_{19}C_2H_4Si(C_2H_5)(OCH_3)_2$, $(CH_3O)_3SiC_2H_4C_8F_{16}C_2H_4Si(OCH_3)_3$, and $(CH_3O)_2(CH_3)SiC_9F_{18}C_2H_4Si(CH_3)(OCH_3)_2$; and silane compounds such as hydrolysates and partial condensates of the above fluorine-containing silane compounds.

Examples of the isocyanate silane compounds include $(CH_3)_3SiNCO$, $(CH_3)_2Si(NCO)_2$, $CH_3Si(NCO)_3$, vinylsilyltriisocyanate, $C_6H_5Si(NCO)_3$, $Si(NCO)_4$, $C_2H_5OSi(NCO)_3$, $C_8H_{17}Si(NCO)_3$, $C_{18}H_{37}Si(NCO)_3$, and $(NCO)_3SiC_2H_4(NCO)_3$.

Examples of the condensate resin of a silane composition in the present invention include curable silicone resins such as thermosetting (condensation type and addition type) silicone resins and photocurable silicone resins. Specific examples thereof include the resins described below.

Among the thermosetting silicone resins, examples of the condensation-type curable silicone resin include: a curable silicone resin synthesized by providing a polysiloxane having silanol groups at terminals thereof as a base polymer such as polydimethylsiloxane, adding a crosslinking agent such as polymethyl hydrogen siloxane, and causing the condensation reaction by heating the mixture in the presence of an organic acid metal salt such as an organotin catalyst, an amine, or the like; a curable silicone resin synthesized by causing a reaction of a polydiorgano siloxane having reactive functional groups such as a hydroxyl group or an alkoxy group at terminals thereof; and a polysiloxane resin synthesized by condensation of a silanol obtained by hydrolyzing a tri- or higher-functional chlorosilane, or by hydrolyzing a mixture of a tri- or higher-functional chlorosilane and a mono- or di-functional chlorosilane.

The condensation-type curable silicone resins are classified into the solution-type and the emulsion-type, based on their forms. Both can be used advantageously.

Among the thermosetting silicone resins, examples of the addition-type curable silicone resin include a curable silicone resin synthesized by: providing a polysiloxane, such as polydimethylsiloxane, having a vinyl group as a base polymer, adding polydimethylhydrogensiloxane as a crosslinking agent, and allowing them to react and cure in the presence of a platinum catalyst.

The addition-type curable silicone resins are classified into the solvent type, the emulsion type, and the non-solvent type, based on their forms. Any of the types can be used advantageously.

Preferable examples of the thermosetting silicone resin obtained by the condensation-type or addition-type curing include pure silicone resins, silicone alkyd resins, silicone epoxy resins, silicone polyester resins, silicone acrylic resins, silicone phenolic resins, silicone urethane resins, and silicone melamine resins.

Examples of the photocurable silicone resins include: a curable silicone resin synthesized by using a photo-cation catalyst; and a curable silicone resin synthesized by using a radical-curing mechanism. It is also preferable to use a modified silicone resin obtained by allowing a low molecular weight polysiloxane having a hydroxyl group, an alkoxy group, or the like bonded to a silicon atom to react with an alkyd resin, a polyester resin, an epoxy resin, an acrylic resin, a phenolic resin, a polyurethane, a melamine resin, or the like to undergo a photocuring reaction. Only a single photocurable silicone resin may be used, or two or more photocurable silicone resins may be used in combination.

As the curable silicone resins, it is preferable to use an acryl-modified silicone resin (a resin obtained by allowing the acrylic resin to react with a low molecular weight polysiloxane to undergo a photocuring reaction) or a thermosetting silicone resin, for the following reasons.

The acryl-modified silicone resin contains an acrylic chain having a high chemical affinity for a styrene-acrylic resin and a polyester resin, which are generally used as image forming materials; on the other hand, the resin also has a silicone resin moiety, which provides releasability. Therefore, a moiety which easily binds to the toner and a moiety which poorly binds to the toner exist in a single molecule. Because the moieties are distributed uniformly, image fixability and image releasability are imparted on the molecular level.

When the acryl-modified silicone resin is used, a transfer sheet having an adequate surface hardness can be manufactured by properly controlling the ratio of the acrylic chain to the silicone chain in the acryl-modified silicone resin, the curing condition for the resin, and the like.

For the above-mentioned reasons, it is preferable to use a thermosetting silicone resin, particularly, an acryl-modified silicone resin.

As the curable silicone resins, an acryl-modified silicone resin and a thermosetting silicone resin may be simultaneously contained.

When an acryl-modified silicone resin and a thermosetting silicone resin are simultaneously contained, it becomes possible to obtain properties which are in between the properties of the respective resins, and the obtained properties can be controlled by the content ratio between the resins, the curing condition, the amounts of the resins to be added, and the like, whereby the image fixability, and the image peelability can be controlled more freely.

When the curable silicone resin simultaneously contains an acryl-modified silicone resin and a thermosetting silicone resin, the content ratio by weight between the resins (the ratio by weight of the acryl-modified silicone resin to the thermosetting silicone resin) cannot be specified uniquely because an adequate ratio varies depending on the type of the curable silicone resin and the like. In general, the ratio is preferably in the range of 1/100 to 100/1, more preferably in the range of 1/10 to 10/1.

In addition, when the curable silicone resin simultaneously contains an acryl-modified silicone resin and a thermosetting silicone resin, preferable examples of the combination include: a combination of an acryl-modified silicone resin and a silicone alkyd resin; a combination of an acryl-modified silicone resin and a pure silicone resin; and a combination of an acryl-modified silicone resin, a silicone alkyd resin, and a pure silicone resin.

The molecular weight of the curable silicone resin is preferably in the range of 10,000 to 1,000,000 in terms of a weight-average molecular weight. The proportion of the phenyl group in all the organic groups in the curable silicone resin is preferably in the range of 0.1 to 50 mole %.

In a preferable embodiment, the silicone hardcoat material in the present invention further comprises colloidal silica in an amount of approximately 5 to 25 parts (more preferably approximately 10 to 15 parts) per 100 parts of the solid content of the condensate resin of the above-mentioned silane composition. When colloidal silica is used in such an amount, cracks do not occur in the image receiving layer and an optimal mechanical strength can be achieved.

The colloidal silica is generally in the form of an aqueous dispersion liquid or in the form of a dispersion in an aqueous/organic solvent. Methods for manufacturing the colloidal silica are disclosed, for example, in U.S. Pat. No. 4,914,143, U.S. Pat. No. 3,986,997, U.S. Pat. No. 5,503,935, and U.S. Pat. No. 4,177,315, the disclosures of which are incorporated herein by reference.

The colloidal silica has an average particle diameter of less than approximately 10 nanometer (nm) when observed with a transmission electron microscope or the like. Further, on a particle volume basis, at least approximately 80% of the colloidal silica particles have a diameter in the range of 6 to 9 nm.

The curable resin layer in the transfer sheet of the first invention finally becomes a surface layer (an overcoat layer) of an image recorded medium after the image transfer. Accordingly, for a purpose to protect the image, the layer is required to be strong against scratches and chemical agents. Accordingly, the above-mentioned photocurable and thermosetting resin layers of silicone type hard coat materials are preferable. Besides them, various kinds of materials, which will be described hereinafter, are preferable to be added and the silicone type hard coat materials are contained preferably in a range of 0.5% by weight to 98% by weight and more preferably in a range of 1% by weight to 95% by weight in the entire resins composing the curable resin layer. If the silicone type hard coat materials are less than 0.5% by weight, the desired separation property cannot be exhibited well in some cases and they exceed 98% by weight, the transfer/fixation state of the image may possibly be worsened and the image may be deteriorated.

It is preferable that the image receiving layer of the invention contains at least one kind of polyester resins as the organic resin. Generally, the polyester resins are used for the image formation material and the fixability of the image formation material to the surface of the transfer sheet can properly be controlled by addition of a resin similar to the material to the image receiving layer. In this connection, beside common polyester resins, silicone-modified polyester resins, urethane-modified polyester resins, and acryl-modified polyesters may be used as the polyester resins.

The method for synthesizing the polyester resin is not particularly limited. For example, the urethane-modified polyester resin can be obtained generally by: allowing a polybasic acid component having two or more carboxyl groups and a glycol component to undergo a condensation reaction, and then allowing the obtained saturated polyester to react with an organic diisocyanate compound and a chain elongating agent.

The polybasic acid may be, for example, an aromatic dicarboxylic acid, which is a dibasic acid, can be used. Examples thereof include terephthalic acid, isophthalic acid, orthophthalic acid, naphthalene dicarboxylic acid, biphenyl dicarboxylic acid, and 1,5-naphthalic acid. In addition, aromatic oxycarboxylic acids such as p-oxybenzoic acid and p-(hydroxyethoxy)benzoic acid, and tri- and tetra-aromatic carboxylic acids such as trimellitic acid and pyromellitic acid, are also usable.

Examples of the aliphatic dicarboxylic acid include succinic acid, adipic acid, sebacic acid, azelaic acid, dodecandioic acid, and dimer acid. Examples of the alicyclic dicarboxylic acid include 1,4-cyclohexane dicarboxylic acid, 1,3-cyclohexane dicarboxylic acid, 1,2-cyclohexane dicarboxylic acid, and anhydrides thereof.

In addition, a dicarboxylic acid having a polymerizable unsaturated double bond can also be used. Such a dicarboxylic acid may be: an α,β-unsaturated dicarboxylic acid such as fumaric acid, maleic acid, maleic anhydride, itaconic acid, or citraconic acid; or an alicyclic dicarboxylic acid containing an unsaturated double bond such as 2,5-norbornene dicarboxylic anhydride or tetrahydrophthalic anhydride. Among these, fumaric acid, maleic acid, itaconic acid, and 2,5-norbornene dicarboxylic anhydride are more preferable.

Further, a hydroxycarboxylic acid may be used such as hydroxypivalic acid, γ-butyrolactone, or ε-caprolactone, in accordance with the necessity. Only a single polybasic acid may be used, or two or more polybasic acids may be used in combination.

The glycol component may be, for example, at least one selected from aliphatic glycols each having 2 to 10 carbon atoms, alicyclic glycols each having 6 to 12 carbon atoms, and ether-bond-containing glycols.

Examples of the aliphatic glycol having 2 to 10 carbon atoms include ethylene glycol, 1,2-propylene glycol, 1,3-propanediol, 1,4-butanediol, 1,5-pentanediol, neopentyl glycol, 1,6-hexanediol, 3-methyl-1,5-pentanediol, 1,9-nonanediol, 2-ethyl-2-butylpropanediol, hydroxypivalic acid neopentyl glycol ester, and dimethylol heptane.

Examples of the alicyclic glycol having 6 to 12 carbon atoms include 1,4-cyclohexane dimethanol and tricyclodecane dimethylol.

Examples of the ether-bond-containing glycol include diethylene glycol, triethylene glycol, dipropylene glycol, and further, a glycol obtained by adding one to several ethylene oxide or propylene oxide residues to each of the two hydroxyl groups bonded to the aromatic ring of a bisphenol, such as 2,2-bis(4-hydroxyethoxyphenyl)propane. Polyethylene glycol, polypropylene glycol, and polytetramethylene glycol can also be used, in accordance with the necessity.

Examples of the organic diisocyanate compound include hexamethylene diisocyanate, tetramethylene diisocyanate, 3,3-dimethoxy-4,4'-biphenylene diisocyanate, p-xylylene diisocyanate, m-xylylene diisocyanate, 1,3-diisocyanate-methylcyclohexane, 1,4-diisocyanate-methylcyclohexane, 4,4'-diisocyanate dicyclohexylmethane, isophorone diisocyanate, 2,4-tolylene diisocyanate, 2,6-tolylene diisocyanate, p-phenylene diisocyanate, diphenylmethane diisocyanate, m-phenylene diisocyanate, 2,4-naphthalene diisocyanate, 3,3'-dimethyl-4,4'-biphenylene diisocyanate, 4,4'-diisocyanate diphenyl ether, and 1,5-naphthalene diisocyanate. Among these, hexamethylene diisocyanate, tetramethylene diisocyanate, isophorone diisocyanate, and diphenylmethane diisocyanate are preferable.

Examples of the chain elongating agent include ethylene glycol, propylene glycol, neopentyl glycol, 2,2-diethyl-1,3-propanediol, polyethylene glycol, diethylene glycol, polypropylene glycol, polytetramethylene glycol, tricyclodecane dimethylol, bisphenol A ethylene oxide adduct, and 1,4-cyclohexane dimethanol. Among these, ethylene glycol, polyethylene glycol, neopentyl glycol, diethylene glycol, and bisphenol A ethylene oxide adduct are more preferable.

The polyester resin may be synthesized by a known method. For example, the polyester resin may be synthesized in a solvent at a reaction temperature of 20 to 150° C. optionally using a catalyst, such as an amine or an organotin compound. Examples of the solvent include: ketones such as methyl ethyl ketone, methyl isobutyl ketone, and cyclohexanone; aromatic hydrocarbons such as toluene and xylene; and esters such as ethyl acetate and butyl acetate. Only a single polyester resin may be used, or two or more polyester resins may be used in combination.

With respect to the transfer sheet of the first invention, the thickness of the image receiving layer is preferably 2 μm to 25 μm more preferably 5 μm to 20 μm, and even more preferably 7.5 μm to 15 μm. If the thickness of the image receiving layer is 2 μm to 25 μm, the image quality deterioration is scarcely caused by embedding the toner image in the up and down direction and the toner image is protected and therefore it is preferable.

Next, the substrate to be used in the present invention will be described.

The above-mentioned substrate is not particularly limited, and is typically a plastic film. The plastic film is preferably a polyacetate film, a cellulose triacetate film, a nylon film, a polyester film, a polycarbonate film, a polysulfone film, a polystyrene film, a polyphenylene sulfide film, a polyphenylene ether film, a cycloolefin film, a polypropylene film, a polyimide film, cellophane, an ABS (acrylonitrile-butadiene-styrene) resin film, or ▇poly acetate film or since such a film is a PET film enough to be used for OHP films or printing films.

Considering the thermocompression-bondability (laminatability) to the later-described image supporting element, the substrate to be used in the present invention preferably consists of two or more layers.

In the above materials, polycarbonate is a polycondensate obtained from bisphenol and carbonic acid, and polyallylate is a polyester obtained by polycondensation of bisphenol and an aromatic dicarboxylic acid. Polyallylate generally has a higher heat resistance than polycarbonate because polyallylate contains a rigid aromatic ring in the main chain at a high density.

Examples of the bisphenol include bisphenol A (2,2-bis(4-hydroxyphenyl)propane), bisphenol C (4,4'-(1-methylethylidene)bis(2-methylphenol)), bisphenol AP (4,4'-(1-phenylethylidene)bisphenol), bisphenol Z (4,4'-cyclohexylidene bisphenol), 4,4'-cyclohexylidene bis(3-methylphenol), 5,5'-(1-methylethylidene) (1,1'-biphenyl)-2-ol, (1,1'-biphenyl)-4,4'-diol, 3,3'-dimethyl (1,1'-biphenyl)-4,4'-diol, 4,4'-(1,4-phenylene bis(1-methylethylidene))bisphenol), 4,4'-(1,4-phenylene bis(1-methylethylidene)bis(2-methylphenol)), 4,4'-(1,3-phenylene bis(1-methylethylidene)bis(2-methylphenol)), and bisphenol S (4,4'-bis(dihydroxy diphenyl sulfone). Bisphenol A is often used. Only a single bisphenol may be used, or a mixture of two or more bisphenols may be used.

Examples of the aromatic dicarboxylic acid include terephthalic acid, isophthalic acid, oxalic acid, malonic acid, succinic acid, adipic acid, itaconic acid, azelaic acid, sebacic acid, eicosanedioic acid, naphthalene dicarboxylic acid, diphenic acid, dodecanedioic acid, and cyclohexane dicarboxylic acid. Only a single aromatic dicarboxylic acid may be used, or two or more aromatic dicarboxylic acids may be included in the copolymer components. When a mixture of a bisphenol with a terephthalic acid component and/or an isophthalic acid component is used, the resultant polyallylate has a preferable melt-processability and a preferable total performance. In such a mixture, the mixing ratio thereof can be arbitrarily selected. The mixing ratio of the terephthalic acid component to the isophthalic acid component is preferably in the range of 9/1 to 1/9 (in molar ratio), particularly in the range of 7/3 to 3/7 (in molar ratio) considering the balance between the melt-processability and the performance, and is more preferably 1/1 (in molar ratio).

Although the method for manufacturing the substrate to be used in the present invention is not particularly limited, the substrate can be manufactured by using a well-known method such as a co-extrusion method or a lamination method. Particularly, substrates manufactured by the co-extrusion method are preferable because the adhesion strength between layers is strong. For example, the method described below can be employed for manufacturing a substrate if the substrate is a lamination including: film 1 (layer I) made of polycarbonate, polyallylate, a copolymer thereof, or PET, and film(s) 2 (layer(s) II) made of PETG resin which is/are provided on one side or both sides of film 1.

In an exemplary method, the composition to constitute film 1 (layer I) and the composition to constitute film 2 (layer II) are supplied to separate extruding machines and then the molten compositions are extruded from the same die in the stacked state. An unstretched film can be obtained by this coextrusion method. By the method, film 2 (layer II) is provided on one side of film 1 (layer I), or films 2 (layers II) are provided on both sides of film 1 (layer I).

The unstretched film obtained above can be used as a substrate as it is. Alternatively, the unstretched film may be additionally subjected to biaxial orientation before being used as a substrate. The biaxial orientation may be conducted, for example, by stretching the film between rolls different in speed (roll stretching), by stretching the film by gradual expansion with a grasping clip (tenter stretching), or by stretching the film by expansion under air pressure (inflation stretching).

Generally, when manufacturing a substrate, the co-extrusion operation is followed by a longitudinal stretching process in which: the film is stretched between two or more rolls different in the peripheral velocity to adjust the film thickness to the desired thickness, and then the film is wound up. In the case of a biaxial stretching, the film which has undergone the above-mentioned process is, as it is, introduced into a tenter and stretched to 2.5- to 5-fold in the crosswise direction. The preferable stretching temperature at this time is in the range of 100 ° C. to 200° C.

The biaxially stretched film thus obtained is subjected to heat treatment, as required. It is preferable that the heat treatment be carried out in a tenter, and particularly when it is heat-treated while being loosened in the longitudinal and crosswise directions, a film with a lower heat shrinkage factor is obtained.

Preferable examples of the substrate include papers (such as plain paper and coated paper), metals (such as aluminum), and ceramics (such as alumina). The form of the substrate is not particularly limited and may be suitably selected from well-known forms of substrates. The substrate is preferably in a film form.

The paper may be chemical pulp. Examples thereof include a hardwood bleached kraft pulp, a hardwood unbleached kraft pulp, a hardwood bleached sulphite pulp, a coniferous bleached kraft pulp, a coniferous unbleached kraft pulp, a coniferous bleached sulphite pulp, and virgin bleached chemical pulps fabricated by chemically processing of woods and other fiber raw materials, and then subjecting them to the bleaching process, such as soda pulp. Among these, pulps having high whiteness are particularly preferable. In addition, examples of the recycled pulp include: recycled pulps obtained by disintegrating unprinted high white paper, special white paper, middle white paper, white broke, and the like, which occur in bookbinding, printing factories, paper-cutting sites, and the like, and recycled pulps obtained by disintegrating and then adequately deinking the following: waste high quality paper, high quality coated paper, middle quality paper, middle quality coated paper, woody paper, or the like, printed by planography, letterpress, intaglio printing, or the like, or by electrophotographic method, thermosensitive method, thermal transfer method, pressure-sensitive recording paper, ink jet recording method, carbon paper, or the like; waste paper written in aqueous or oil-based ink, pencil, or the like; and waste newspaper. Among these, recycled pulp having a higher whiteness and containing less impurities is particularly preferable.

Such a material may be colored by incorporation of a pigment, a dye, or the like. The substrate 110 may be in the form of a film or a plate. The substrate may have a thickness which makes the substrate inflexible or a thickness which makes the substrate strong enough to have strength generally required for a substrate.

Also, with respect to the transfer sheet of the first invention, the image receiving layer formed on the substrate has a surface resistivity at 23° C. and 55% RH preferably in a range of $1.0 \times 10^8 \Omega$ to $1.0 \times 10^{13} \Omega$ and more preferably in a range of $1.0 \times 10^9 \Omega$ to $1.0 \times 10^{11} \Omega$.

When an image forming material with a surface resistivity of lower than $1.0 \times 10^8 \Omega$ is used under a condition of a high temperature and a high humidity, the resistance of the image forming material transfer sheet as an image receiving element is too low. As a result, for example, the toner transfer from a primary transfer member in an electrophotographic apparatus does not proceed properly. On the other hand, when the surface resistivity exceeds $1.0 \times 10^{13} \Omega$, the resistance of the image forming material transfer sheet as an image receiving element is too high. As a result, for example, the toner cannot be transferred sufficiently from a primary transfer member in an electrophotographic apparatus to the surface of the transfer sheet, thereby causing image defects owing to the transfer failure.

Also, for the same reason, when the image receiving layer is formed only on one side of the substrate, the surface resistivity of the substrate surface not having the image receiving layer is preferably in a range of $1.0 \times 10^8 \Omega$ to $1.0 \times 10^{13} \Omega$ and more preferably in a range of $1.0 \times 10^9 \Omega$ to $1.0 \times 10^{11} \Omega$ at 23° C. and 55% RH.

The difference in the surface resistivity between the front and the back sides of the image transfer sheet of the first invention at 23° C. and 55% RH is preferably within 4 digits and more preferably within 3 digits. If the difference in the surface resistivity between the front and the back sides exceeds 4 digits, transfer of the toner tends to be defective, and the resultant image is likely to be of low quality. In this connection, the difference of the surface resistivity between the front and the back sides is within 4 digits means that the difference of the common logarithms of the respective surface resistivity values is within 4 in the case the respective surface resistivity values are expressed by the common logarithms.

In the invention, the surface resistivity is measured according to a double ring electrode method standardized in JIS K6271 and calculated according to the calculation expression shown therein. More practically, the value is calculated according to the calculation expression standardized in JIS K6271 from the current value measured after application of 1000 V voltage for 60 seconds under a condition of 23° C. and 55% RH while a sample box (a probe) for ultra high resistance measurement is connected to a digital ultra-high resistance/micro-ampere meter R 8340 manufactured by Advantest Corp.

When the image receiving layer is provided only on one side of the substrate, the surface resistivity of the substrate surface not having the image receiving layer can be controlled, for example, by: adding a surfactant, a high-molecular electrically conductive agent, electrically conductive particles, or the like, to the resin in the production of the film as the substrate; by coating the surface of the film as the substrate with a surfactant; by vapor depositing a metal thin film on the film as the substrate; or by adding an adequate amount of a surfactant or the like to the adhesive.

The surface resistivity of the image receiving layer provided on the substrate is preferably in the range of $1.0 \times 10^8$ to $1.0 \times 10^{13} \Omega$. A charge control agent is preferably contained in the image receiving layer in order to set the surface resistivity within this range. A high molecular electrically conductive agent, a surfactant, electrically conductive metal oxide particles, or the like may be added to the image receiving layer as a charge control agent, as already mentioned.

Examples of usable surfactants include: cationic surfactants such as polyamines, ammonium salts, sulfonium salts, phosphonium salts, and betaine amphoteric salts; anionic surfactants such as alkyl phosphate; and nonionic surfactants such as fatty acid esters. Among these surfactants, use of a cationic surfactant is effective for improving the transferability since the cationic surfactant interacts strongly with negatively-charged toner for electrophotography used currently Among the above-mentioned cationic surfactants, a quaternary ammonium salt is preferable. The quaternary ammonium salt is preferably a compound represented by the following formula (I):

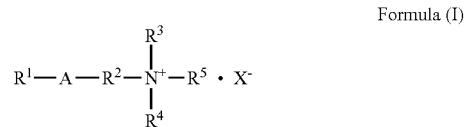

Formula (I)

In the formula (I), $R^1$ represents an alkyl, alkenyl, or alkynyl group having 6 to 22 carbon atoms, and $R^2$ represents an alkylene, alkenylene, or alkynylene group having 1 to 6 carbon atoms. $R^3$, $R^4$, and $R^5$ may be the same or different, and each represents an aliphatic group, an aromatic group, or a heterocyclic group. The aliphatic group refers to a linear, branched, or cyclic alkyl, alkenyl, or alkynyl group. The aromatic group refers to a benzene monocyclic aryl group or a condensed polycyclic aryl group. These groups each may have a substituent such as a hydroxyl group. In the formula (I), A represents an amide bond, an ether bond, an ester bond, or a phenyl group, but can be omitted. $X^-$ represents a halogen element, a sulfate ion, or a nitrate ion; such an ion may have a substituent.

The transfer sheet of the first invention is not particularly limited if it comprises the releasing layer, the curable resin layer, and the image receiving layer formed successively in this order from the substrate side. Hereinafter, the constitution example of the transfer sheet of the first invention will be described in detail with reference to drawing. However, the transfer sheet of the first invention is not limited to the illustrated drawings. Additionally, the same symbols are assigned to the same members in the following drawings and the duplicated explanation may sometimes be omitted.

FIG. 1 is a schematic perspective view illustrating an example of the first embodiment of the image transfer sheet of the present invention. The image transfer sheet of the present invention shown in FIG. 1 comprises a substrate 110, a releasing layer 120, curable resin layer 130, and an image receiving layer 140 (corresponds to the electrography transfer sheet 100 shown in FIG. 4).

In the image transfer sheet of the first present invention, for example, a fixed reverse image (a mirror image) is formed on the surface of the image receiving layer 140 on the supporting element 110 having transparency such that the image on the image supporting element is a normal image (an ordinary image) when the fixed reverse image is transferred to the image supporting element to be transferred (corresponds to the image supporting element 200 in FIG. 5).

The substrate 110 which can be used for the image transfer sheet of the present invention does not have to be transparent.

Here, transparency refers to, for example, a property of transmitting light in the visible light range to some degree. When transparency is required in the present invention, the transparency is sufficient if the formed image can be viewed through the substrate 110 from the surface opposite to the surface having thereon the image. Such a level of transparency makes it easy to check the alignment of the image transfer medium, and errors, displacement, and the like in the information to be printed.

As the substrate 110, a plastic film, especially a PET film, can be used preferably. Conventionally, polyvinyl chloride has been used as a substrate (core) material for cards. However, polyvinyl chloride has begun to be recognized as an environmentally unfavorable substance. This is because polyvinyl chloride generates dioxins when burnt as a combustible waste. As a result, polyvinyl chloride is used less and less. The plastic film material used in the invention does not have such a problem. In the present invention, considering the problems related to use of chlorine, a substrate free of chlorine such as described above may be used. It is also preferable to use a film obtained by adding a hot-melt adhesive such as polyester or EVA (Ethylene Vinyl Acetate copolymer) to a polystyrene resin film as described above, an ABS resin film, an AS (acrylonitrile-styrene) resin film, a PET film, or a polyolefin resin film such as polyethylene or polypropylene.

The material used in combination with the PETG resin may be the plastic film described above, another resin having a transparency, or ceramics having transparency. Such a material may be colored by incorporation of a pigment, a dye, or the like. The substrate 110 may be in the form of a film or a plate. The substrate 110 may have a thickness which makes the substrate inflexible or a thickness which makes the substrate strong enough to have strength generally required for an image transfer sheet.

In order to prevent adhesion to the fixing member or winding around the fixing member during fixing of the image, the image receiving layer 140 may comprise a natural or synthetic wax which is a material which does not adhere to the fixing member strongly, or a releasing agent such as a release resin, a reactive silicone compound, or a modified silicone oil.

Specific examples of the wax include: natural waxes such as carnauba wax, beeswax, montan wax, paraffin wax, and microcrystalline wax; synthetic waxes such as low molecular weight polyethylene wax, low molecular weight oxidized polyethylene wax, low molecular weight polypropylene wax, low molecular weight oxidized polypropylene wax, higher fatty acid wax, higher fatty acid ester wax, and Sasol wax. Only a single type of wax may be used, or two or more waxes may be used in combination.

The release resin may be selected from: silicone resins; fluororesins; modified silicone resins which are modification products of silicone resins and various types of resins, such as polyester-modified silicone resin, urethane-modified silicone resin, acryl-modified silicone resin, polyimide-modified silicone resin, olefin-modified silicone resin, ether-modified silicone resin, alcohol-modified silicone resin, fluorine-modified silicone resin, amino-modified silicone resin, mercapto-modified silicone resin, and carboxy-modified silicone resin; thermosetting silicone resins; and photocurable silicone resins.

The above-mentioned modified silicone resin has high affinity for the resin particles as an image forming material comprising a toner resin or a thermally fusible resin. Accordingly, the modified silicone resin and the image forming material are suitably miscible with each other, compatible with each other, and can mix with each other when heated. Thus, the color of the pigment contained in the toner is exhibited well. Further, it is considered that the releasing property imparted by the silicone resin prevents adhesion between the fixing member and the transfer sheet during heat fusion.

Further, in the present invention, in order to further decrease the adhesiveness, a reactive silane compound and a modified silicone oil may be included in the image receiving layer 120. It has been found that the reactive silane compound reacts with the resin contained in the image receiving layer 120, and simultaneously reacts with the modified silicone oil, whereby the combination of the reactive silane compound and the modified silicone oil exhibits a releasing property which is stronger than the releasing property derived from the silicone oil as a liquid lubricant. Further, the combination undergoes a curing reaction to be firmly immobilized in the image receiving layer as a releasing agent, and the releasing agent does not come off the image receiving layer even when subjected to mechanical wear, solvent extraction, or the like.

The wax or release resin may be present in the particle state or the like, similarly to the case of the resin particles made of a thermally fusible resin. In a preferable embodiment, the wax or releasing agent is added to, dispersed in, and mixed with a thermally fusible resin to be incorporated in the thermally fusible resin before use.

As already mentioned, the surface resistivity of the image receiving layer 140 is preferably in the range of $1.0 \times 10^8$ to $1.0 \times 10^{13} \Omega$. In order to set the surface resistivity within this range, a high molecular electrically conductive agent, a surfactant, electrically conductive metal oxide particles, or the like may be added to the image receiving layer as a charge control agent, as already mentioned. In addition, in order to improve the transferability, it is preferable to add a matting agent to the image receiving layer 140 and to a coating layer other than the image receiving layer 140 (hereinafter, the image receiving layer and the coating layer provided on the surface of the substrate other than the image receiving layer are collectively referred to as "coating layer" in some cases).

Examples of the metal oxide constituting the above-mentioned electrically conductive metal oxide particles include $ZnO$, $TiO$, $TiO_2$, $SnO_2$, $Al_2O_3$, $In_2O_3$, $SiO$, $SiO_2$, $MgO$, $BaO$, and $MoO_3$. Only a single metal oxide may be used, or two or more metal oxides may be used. The metal oxide preferably contains a hetero element. Examples thereof include: $ZnO$ containing (doped with) Al, In, or the like; $TiO$ doped with Nb, Ta, or the like; and $SnO_2$ doped with Sb, Nb, a halogen element, or the like. Among these, $SnO_2$ doped with Sb is particularly preferable because it shows little change in electrical conductivity over time and has higher stability.

A lubricative resin may be used for the matting agent. Examples of the lubricative resin include: polyolefins such as polyethylene; and fluororesins such as polyvinyl fluoride, polyvinylidene fluoride, polytetrafluoroethylene (TEFLON (registered trademark)). Specific examples thereof include low molecular weight polyolefin waxes (for example, polyethylene waxes with a molecular weight of 1000 to 5000), high density polyethylene waxes, paraffin waxes, and microcrystalline waxes.

Examples of the fluororesin include a polytetrafluoroethylene (PTFE) dispersion liquid.

The transfer sheet in the first invention preferably includes particles in the image receiving layer 140, from the viewpoint of improving the transferability of the transfer sheet.

The type of the particles to be used in the present invention is not limited. However, when the particles are organic resin particles, the organic resin may be a homopolymer of any of the following monomers, or a copolymer containing at least one of the following monomers: styrenes such as styrene, vinyl styrene, and chlorostyrene; mono-olefins such as ethylene, propylene, butylene, and isobutylene; vinyl esters such as vinyl acetate, vinyl propionate, vinyl benzoate, and vinyl butyrate; esters of α-unsaturated aliphatic monocarboxylic acid such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers such as vinyl methyl ether, vinyl ethyl ether, and vinyl butyl ether; vinyl ketones such as vinyl methyl ketone, vinyl hexyl ketone, and vinyl isopropenyl ketone; and diene monomers such as isoprene and 2-chlorobutadiene.

Among these, styrenes, esters of α-unsaturated aliphatic monocarboxylic acid, and the like are preferable. When such a thermally fusible resin is used as particles, the particles may be applied by using a solvent which does not dissolve the particles, and used as particles constituting a gloss control layer. However, particles are more preferably selected from particles obtained by atomizing a thermosetting resin having a crosslinked structure generated by addition of a crosslinking agent or the like to a thermally fusible resin, particles obtained by atomizing the previously described thermosetting resins, particles obtained by atomizing photocurable resins, and particles obtained by atomizing electron-beam curable resins and the like.

When the particles are inorganic particles, specific examples of the substance constituting the particles include mica, talc, silica, calcium carbonate, zinc white, hallosite clay, kaolin, basic magnesium carbonate, quartz powder, titanium dioxide, barium sulfate, calcium sulfate, and alumina.

The transfer sheet of the first invention may have a structure comprising at least one coating layers as the image receiving layer so as to form an image excellently. A thermally fusible acrylic resin is preferable to be used for the image receiving layer.

The shape of the fine particles is generally spherical and may be plate-typed, needle-shape and amorphous.

The volume average particle diameter of the fine particles is preferably 0.1 μm to 30 μm. On the other hand, the volume average particle diameter of the fine particles is larger than the thickness of the image receiving layer 140 and is preferably not less than 1.2 times the thickness of the image receiving layer. When the volume average particle diameter of the fine particles exceeds 1.2 times the thickness of the image receiving layer, the fine particles come off the image receiving layer 140 (detachment of the particles), and the surface is easily worn and damaged in some cases. It is because, owing to the extrusion of the fine particles out of the surface of the image receiving layer, the coefficient of friction between the image forming material transfer sheets layered on the front and the back sides is decreased, whereby the image forming material transfer sheet can be smoothly transferred in the electrophotographic apparatus.

The weight ratio of the particles to the binder (the resin component) in the image receiving layer of the image forming material transfer sheet is preferably in the range of 0.01:100 to 200:100, more preferably in the range of 0.5:100 to 100:100. When the proportion of the filler is within the above-mentioned range, there is less disorder in the transfer of the image forming material from the transfer sheet, and the image quality is superior. When the proportion of the filler is smaller than the above-mentioned range, the coefficient of friction between stacked transfer sheets is larger, and jamming may occur in the electrophotographic apparatus. When the filler proportion is greater than the above-mentioned range, the image may not be transferred properly at the transfer of the image forming material.

As a filler, inorganic particles (for example, $SiO_2$, $Al_2O_3$, talc, and kaolin) other than the inorganic particles mentioned above and plastic powder in bead form (for example, crosslinked PMMA, polycarbonate, polyethylene terephthalate, and polystyrene) may be used simultaneously.

In order to improve the transferability of the image transfer sheet in the electrophotographic apparatus, it is necessary to reduce the friction on the film surface by use of particles or the like, as mentioned above. In practical use, the coefficient of static friction on the surface of the transfer sheet is preferably 2 or less, more preferably 1 or less. The coefficient of kinetic friction on the surface of the transfer sheet is preferably in the range of 0.2 to 1, more preferably in the range of 0.3 to 0.65.

The image receiving layer 140 comprises a resin, and preferably further comprises particles. The image receiving layer 140 and coating layers other than the image receiving layer 140 are formed on the surface of the substrate 110 by the following method.

Each layer may be formed by: mixing a resin and other optional components such as particles selected in accordance with the necessity by using an organic solvent or water; subjecting the mixture to a dispersing treatment by ultrasound, a wave rotor, or an apparatus such as an attriter or a sand mill, to form a uniform dispersion liquid (a coating liquid); and applying or impregnating the coating liquid, as it is, onto the surface of the substrate 110.

The method for coating or impregnating the coating liquid may be a commonly employed method such as the blade coating method, the wire-bar coating method, the spray coating method, the immersion coating method, the bead coating method, the air knife coating method, the curtain coating method, or the roll coating method.

When the image transfer sheet has coating layers on both sides of the substrate, either surface may be coated first, or both sides may be simultaneously coated.

The drying in the formation of the coating layer on the surface of the substrate 110 may be conducted by air. As an alternative, the coating layer can be easily dried by heat. The drying method may be a commonly-used method such as a method of putting the substrate 110 having the wet coating layer in an oven, a method of passing it through an oven, or a method of bringing it into contact with a heating roller.

The thickness of the image receiving layer 140 which is formed on the surface of the substrate 110 as described above is preferably in a range of 0.1 μm to 20 μm and more preferably in a range of 1.0 μm to 10 μm.

In fixing for image formation on the transfer sheet, the toner is fixed on the surface of the image receiving layer by simultaneous application of heat and pressure. At the same time, the toner contacts with the fixing member. Therefore, if the toner has a low viscosity, high affinity for the fixing member, or the like, a part of the toner is transferred to the fixing member and remains on the fixing member as an offset, thereby causing deterioration of the fixing member. As a result, the service life of the fixing unit is also shortened. Therefore, the transfer sheet for electrophotography has to be such that the toner image is sufficiently fixed on the transfer sheet to prevent the offset on the fixing member.

In the invention, the surface of the image receiving layer provided on the surface of the transfer sheet for electrophotography can adhere well to the toner, and the toner is sufficiently fixed on the surface of the transfer sheet at a temperature which is not higher than the temperature at which the toner is fused to become viscous.

Therefore, in the present invention, fixing of the toner image formed on the surface of the transfer sheet for electrophotography is carried out preferably in such a manner that the temperature of the surface of the transfer sheet (the surface on which the image is formed) is not higher than the melting temperature of the toner. In consideration of the melting temperature of usual toner, the surface temperature of the transfer sheet for electrophotography at the fixing is preferably 130° C. or lower, more preferably 110° C. or lower.

Even when the fixing is conducted under the above-mentioned condition, the temperature at the fixing may be within such a temperature range in which the substrate of the transfer sheet thermally deforms. In such a case, the stiffness of the transfer sheet is lowered, and the transfer sheet easily winds around the heating roll of the fixing apparatus. In such a case, it is preferable to superpose paper or the like on the transfer sheet upon conveyance so as to reinforce the stiffness of the transfer sheet in the fixing apparatus or to modify or adjust the inside of the fixing apparatus such that the film edge part contacts the guide.

On the other hand, in the trasfer sheet of the first invention, in the fixing, also the non-image region of the image receiving layer contacts with the fixing member. Therefore, the image receiving layer preferably has high releasing property. The presence of the particles in the image receiving layer is preferable also from the viewpoint of securing such high releasing property.

In the transfer sheet of the first invention, as described above, when the constitutions, materials, and the like of the substrate and the image receiving layer are suitably selected, the image obtained by using the transfer sheet for electrophotography of the present invention is excellent in image quality (with respect to color, gloss, shielding property, and the like) required for highly design-oriented prints, free from occurrence of image defects caused by scratches, foreign matter, and the like, and sufficiently resistant to heat and light even when used outdoors. In addition, occurrence of offset can be prevented even when oil-less toner is used.

The second embodiment of the image transfer sheet for electrophotography of the invention (hereinafter, referred to as "a transfer sheet of the second invention" in some cases) comprises a substrate and an image receiving layer formed on the surface of the substrate, and the image receiving layer comprises a mixture of a curable silicone resin and a resin other than the curable silicone resin.

In the transfer sheet of the second invention, the image receiving layer is a layer containing the curable resin and the image receiving layer is releasable from the substrate. That is, since the resins consisting the image receiving layer are a mixture of a curable silicone resin and the resin other than the curable silicone resin, the image receiving layer can be peeled from the substrate and when the image formed by an electrophotographic method is transferred to the image supporting element, the image receiving layer is peeled from the substrate, covers the image transferred to the image supporting element and thus protects the image. Further, since the curable silicone resin is tough, the scratching resistance is made excellent owing to the cover of the image.

Figure 2:
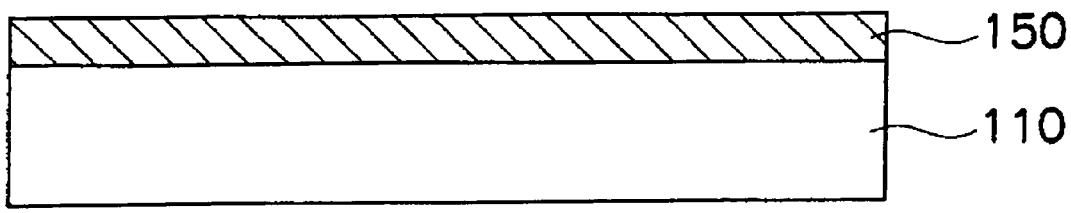
FIG. 2 is a schematic cross-sectional view showing an example of the second embodiment of an image transfer sheet of the present invention.

FIG. 2 is a schematic cross-sectional view showing an example of the second embodiment of an image transfer sheet for electrophotography of the invention.

As shown in FIG. 2, the transfer sheet of the second invention comprises a substrate 110 and an image receiving layer 150. The transfer sheet may contain coating layer (a charge control layer) which is not shown or a layer similar to the image receiving layer on the side of the substrate on which the image receiving layer 150 is not formed.

In the transfer sheet of the second invention, since the toner image is formed on the surface of the image receiving layer 150, the toner image is preferable to be well compatible with the component materials of the image receiving layer 150 at the time of fixation. From this viewpoint, since an acrylic resin (a styrene acrylic resin) and a polyester resin are generally used as a binder resin for the toner, the image receiving layer 150 preferably contains a curable silicone resin which has excellent compatibility with the acrylic resin and the polyester resin. Further, the image receiving layer 150 preferably contains, as a resin other than the curable silicone resin, an acrylic resin and a polyester resin which has excellent compatibility with the acrylic resin and the polyester resin in a mixed state (as a mixture of resin) with the curable silicone resin.

(Curable Silicone Resin)

The curable silicone resin contained in the image receiving layer 150 will be described below.

Generally, silicon resins can be classified into silicone resins having a straight chain structure to be materials of silicone oils and silicone rubber and silicone reins having three-dimensional crosslinked structure in accordance with the molecular structure. The various properties such as the releasing property, adhesive property, heat resistance, insulation, and chemical stability depends on the molecules (organic molecules) bonded to silicon atoms and the polymerization degree.

The curable silicone resin in the transfer sheet of the second invention is preferably a silicone resin having a three-dimensional crosslinked structure. The silicone resin having a three-dimensional crosslinked structure is generally polymerized from polyfunctional (trifunctional or tetrafunctional) monomers and has a crosslinked structure.

The silicone resin having a straight chain structure may include a silicon resin having a low molecular weight and used for an insulating oil, a liquid coupling, a buffer oil, a lubricating oil, a heating medium, a water-repelling agent, a surface treatment agent, a releasing agent, and a defoaming agent as a silicon oil and silicone rubbers polymerized to have a molecular weight (based on the siloxane unit) of 5,000 to 10,000 by thermosetting after addition of a vulcanizing agent.

The curable silicone resin can be classified into silicone varnish having a relatively low molecular weight and soluble in organic solvents, and silicone resin having a high polymerization degree according to the molecular unit. Also, the curable silicone resin can be classified into condensation type, addition type, and radiation type (UV-setting type and electron-setting type) depending on the curing reaction in the production steps. Also, according to the type of application, the resin can be classified into solvent type and solvent-less type.

The reasons for the requirement of the curable silicone resin addition are as follows. At first, the curable silicone resin has a low surface energy attributed to Si—O bonds and therefore is originally excellent in the releasing property and non-compatible property. However, if the curing conditions are controlled, an excellent adhesion property is also provided and therefore the addition makes it possible to obtain an image recorded medium provided with satisfactory image releasing property and image fixability.

The curing conditions may include the types of reactive groups, the number of the reactive groups, the curing duration, the temperature, and the radiation energy. Methods for controlling the curing conditions may include, for example, a method of adding monofunctional or bifunctional polydimethylsiloxanes and reaction suppressing agents (acetylene alcohols, cyclic methylvinylcyclosiloxanes, siloxane-modified acetylene alcohols, etc.) and a method of adjusting the catalyst amount, the reaction temperature, reaction time and the UV radiation intensity. Control of these curing conditions can adjust the molecular weight of the curable silicone resin, the amount of the residual silanol as a reaction group and therefore the releasing property, the hardness, the adhesion property, the surface hardness, the transparency, the heat resistance, and the chemical stability can be controlled as desired.

In the step of curing the curable silicone resin, firm bonds are formed between the substrate and the curable silicone resin. Accordingly, the image receiving layer to be formed on the substrate is provided with a high adhesion strength and even if the image release and image fixation are repeated, the image receiving layer is not separated from the substrate.

Since the curable silicone resin is also excellent in heat resistance, it is hardly affected with fixation condition of a printing apparatus. Accordingly, the fixability of the image forming material is almost solely determined in accordance with the intermolecular force between the curable silicone resin and the image forming material. Generally, image forming materials used have analogous characteristics to one another. Accordingly, if the curable silicone resin is used, approximately constant fixability can be obtained independently of the types of the image forming materials used. Further, since the curable silicone resin is excellent in heat resistance and is scarcely deteriorated by heat, its properties scarcely fluctuate with the lapse of time in the printing apparatus and even after fixation of the image forming material, sufficient fixability can be maintained for a long duration owing to the coagulation power of the toner and the intermolecular force between the toner and the curable silicone resin.

Further, a uniform and thin image receiving layer can be formed by diluting a coating solution containing the curable silicone resin and applying the diluted coating solution on the substrate. Therefore, when a paper is used as the substrate, the curable silicone resin-containing image receiving layer so thin as not to completely cover the surface roughness can be formed and the toner therefore enters in the projections and recessions of the surface of the image recorded medium and causes an anchor effect to consequently improve the fixability.

The curable silicone resin is not particularly limited and may properly be selected from conventionally known curable silicone resins. A curable acryl-modified silicon resin (a curable acryl silicon resin) is particularly preferable, and the reasons are as follows:

The curable acryl silicon resin comprises both acrylic chains having high chemical affinity with a styrene-acrylic resin and a polyester resin used commonly as an image formation material and silicone resin portions exhibiting the releasing property. Accordingly, The curable acryl silicon resin has a portion which is easily bonded to the toner and a portion which is hard to be bonded to the toner in one molecule. Further, since they evenly and compatibly exist, the image releasing property and the image fixability can be exhibited in the molecular order.

In the curable acryl silicon resin, it is made possible to control the image fixability and the image separation property as desired by properly controlling the ratio of the acrylic chains and silicone chains, the curing conditions, and the addition amounts of a curable silicone compound and a modified silicon oil, which will be described hereinafter.

A thermosetting silicone resin is also preferably used as the curable silicone resin.

The thermosetting silicone resin has a low surface hardness as compared with the acrylic silicone resin known as a photocurable type resin and makes the image forming material easy to be enclosed in the image receiving layer and thus tens to be excellent in the image fixability.

The thermosetting silicone resin also has a high releasing property as compared with the acrylic silicone resin and consequently, excellent in the image releasing property.

Further, in the case of a mixed system of silicone components and non-silicone components, the thermosetting silicone resin can be made further controllable in the image fixability and the image release property as desired by properly controlling the ratio of those components, the curing conditions, and the addition amounts of a curable silicone compound and a modified silicon oil.

While being mixed, the acrylic silicone resin and thermosetting silicone resin can be used preferably. When the acrylic silicone resin and thermosetting silicone resin are mixed, intermediate properties of both can be provided in accordance with the mixing ratio and the image fixability and the image release property can be controlled as desired by properly controlling the ratio, the curing conditions, and the addition amounts of a curable silicone compound and a modified silicon oil.

The curable silicone resin can be classified into condensation type, addition type and UV-setting type and example thereofs are as follows.

Examples of the condensation-type curable silicone resin include: a curable silicone resin synthesized by providing a polysiloxane having silanol groups at terminals thereof as a base polymer such as polydimethylsiloxane, adding a crosslinking agent such as polymethyl hydrogen siloxane, and causing the condensation reaction by heating the mixture in the presence of an organic acid metal salt such as an organotin catalyst, an amine, or the like; a curable silicone resin synthesized by causing a reaction of a polydiorgano siloxane having reactive functional groups such as a hydroxyl group or an alkoxy group at terminals thereof; and a polysiloxane resin synthesized by condensation of a silanol obtained by hydrolyzing a tri- or higher-functional chlorosilane, or by hydrolyzing a mixture of a tri- or higher-functional chlorosilane and a mono- or di-functional chlorosilane.

The condensation-type curable silicone resins are classified into the solution-type and the emulsion-type, based on their forms. Both can be used advantageously.

Examples of the addition-type curable silicone resin include a curable silicone resin synthesized by: providing a polysiloxane, such as polydimethylsiloxane, having a vinyl group as a base polymer, adding polydimethylhydrogensiloxane as a crosslinking agent, and allowing them to react and cure in the presence of a platinum catalyst.

The addition-type curable silicone resins are classified into the solvent type, the emulsion type, and the non-solvent type, based on their forms. Any of the types can be used advantageously.

Examples of the photocurable silicone resins include: a curable silicone resin synthesized by using a photo-cation catalyst; and a curable silicone resin synthesized by using a radical-curing mechanism.

It is also preferable to use a modified silicone resin obtained by allowing a low molecular weight polysiloxane having a hydroxyl group, an alkoxy group, or the like bonded to a silicon atom to react with an alkyd resin, a polyester resin, an epoxy resin, an acrylic resin, a phenolic resin, a polyurethane, a melamine resin, or the like to undergo a photocuring reaction. Only a single photocurable silicone resin may be used, or two or more photocurable silicone resins may be used in combination.

The molecular weight of the curable silicone resin to be used in the image receiving layer is preferably 10,000 to 1,000,000 on the basis of weight average molecular weight. The ratio of phenyl group in the entire organic groups present in the curable silicone resin is preferably 0.1% by mole to 50% by mole and the functionality is preferably 1 to 4.

The content of the curable silicone resin in the image receiving layer is preferably 30% by weight to 100% by weight and more preferably 50% by weight to 100% by weight. When the content is lower than 30% by weight, the releasing property may become insufficient in some cases.

As the resin other than the curable silicone resin, acrylic resin and polyester resins excellent in compatibility with the toner are preferable to be used and besides, thermally fusible resins and curable resins can be used.

Examples of the acrylic resins mentioned as the resin other than the curable silicone resin are poly(methacrylic acid) resins such as poly(methyl methacrylate), poly(ethyl methacrylate), poly(butyl methacrylate), poly(octyl methacrylate), and poly(stearyl methacrylate); poly(acrylic acid) resins such as poly(methyl acrylate), poly(ethyl acrylate), poly(propyl acrylate), poly(butyl acrylate), and poly(octyl acrylate); polyacrylonitrile, polyacrylamide, poly(methacrylic acid) dimethylaminoethyl ester, poly(methacrylic acid) diethylaminoethyl ester, poly(acrylic acid) dimethylaminoethyl ester and polydimethylaminopropyl-methacrylamide.

The acrylic resins as resins other than the curable silicone resin have a glass transition temperature (Tg) preferably in a range of 50° C. to 120° C. and more preferably in a range of 60° C. to 105° C.

The polyester resins as resins other than the curable silicone resin are not particularly limited. Generally, polyesters are produced by reaction of polyhydric hydroxy compounds and either polybasic carboxylic acids or their reactive acid derivatives. Examples of the polyhydric hydroxy compounds consisting the polyesters includes diols such as ethylene glycol, diethylene glycol, triethylene glycol, 1,2-propylene glycol, 1,3-propylene glycol, 1,4-butanediol, and neopentyl glycol and polyesters to be used particularly preferably in the invention are ethylene glycol and neopentyl glycol.

Examples of the polybasic carboxylic acids includes dicarboxylic acids such as malonic acid, succinic acid, adipic acid, sebacic acid, alkylsuccinic acid, maleic acid, fumaric acid, mesaconic acid, citraconic acid, itaconic acid, glutaconic acid, cyclohexanedicarboxylic acid, isophthalic acid, and terephthalic acid, and the other bifunctional carboxylic acid. Preferably, isophthalic acid and terephthalic acid are used in the invention in terms of the production, availability, and cost. Generally, phthalic acid includes structural isomers; isophthalic acid and terephthalic acid and therefore, both are inevitably mixed almost evenly in polyester production.

The polyester resins as resins other than the curable silicone resin have a glass transition temperature (Tg) preferably in a range of 55° C. to 120° C. and more preferably in a range of 60° C. to 90° C.

The image receiving layer 150 may contain other resins in combination with the acrylic resins and polyester resins as resins other than the curable silicone resin to the extent that the effects of the invention are not adversely affected. Examples of resins used in combination includes homopolymers or copolymers obtained by polymerizing one or more monomers, e.g. styrenes such as styrene, vinyl styrene and chlorostyrene; monoolefins such as ethylene, propylene, butylene, and isobutylene; vinyl esters such as vinyl acetate, vinyl propionate, vinyl benzoate, and vinyl butyrate; vinyl ethers such as vinyl methyl ether, vinyl ethyl ether, and vinyl butyl ether; vinyl ketones such as vinyl methyl ketone, vinyl hexyl ketone, and vinyl isopropenyl ketone; and diene type monomers such as isoprene and 2-chlorobutadiene.

On the other hand, it is preferable to use a thermosetting acrylic resin as an arcrylic resin as a resin other than the above-mentioned curable silicone resins. The thermosetting acrylic resin may be obtained by crosslinking a polymer containing at least one acrylic monomer with a melamine compound, an isocyanate compound, or an epoxy compound, or by crosslinking a copolymer obtained by polymerizing an acrylic monomer and a styrene monomer with a melamine compound, an isocyanate compound, or an epoxy compound.

Examples of the acrylic monomer include: methacrylic acid alkyl esters such as methyl methacrylate, butyl methacrylate, octyl methacrylate, and stearyl methacrylate; acrylic acid alkyl esters such as ethyl acrylate, propyl acrylate, butyl acrylate, and octyl acrylate; acrylonitrile; and amino-group-containing vinyl monomers such as acrylamide, dimethylaminoethyl methacrylate, diethylaminoethyl methacrylate, dimethylaminoethyl acrylate, and dimethylaminopropyl methacrylamide. Examples of the styrene monomer include styrene, α-methyl styrene, vinyl toluene, and p-ethyl styrene.

The melamine type compounds are etherified melamine resins obtained by reaction of alcohols such as butyl alcohol and propyl alcohol with trimethylolmelamine, hexamethylolmelamine, diemthylol urea, dimethylol guanidine, dimethylol acetoguanamine, and dimethylol benzoguanamine, which are obtained respectively by reaction of materials having polyfunctional amino groups such as melamine, urea, thiourea, guanidine, guanamine, acetoguanamine, benzoguanamine, dicyandiamide, and guanamine with formaldehyde.

The isocyanate type compounds are isocyanate compounds having two or more isocyanato groups in one molecule and examples thereof may include monomers such as tolylene diisocyanate, diphenylmethane diisocyanate, naphthalene diisocyanate, tolidine diisocyanate, triphenylmethane triisocyanate, tris(isocyanatophenyl) thiophosphite, p-phenylene diisocyanate, xylylene diisocyanate, bis(isocyanatomethyl)cyclohexane, dicyclohexylmethane diisocyanate, hexamethylene diisocyanate, lysin diisocyanate, hexamethylene diisocyanate, and isophorone diisocyanate; and trimethylol propane adducts, isocyanurate-modified compounds, biuret-modified compounds, carbodiimide-modified compounds, urethane-modified compounds, and allophanate-modified compounds of these monomers.

The epoxy type compounds are glycidyl compounds of polyhydric alcohols having a plurality of epoxy groups and used together with a Lewis acid catalyst. The Lewis acid is preferably micro-capsulated to retard the reaction. Examples of the compounds are glycidyl compounds such as diglycidyl esters of butadiene dioxide, hexadiene dioxide, and phthalic acid; diglycidyl ester of bisphenol A, diglycidyl ester of bisphenol F, triglycidyl ether amine of p-aminophenol, diglycidyl ether of aniline, tetraglycidyl ether of phenylenediamine, diglycidyl ether of sulfoneamide, and triglycidyl ether of glycerin; and polyether-modified diglycidyl, polyester-modified diglycidyl, urethane-modified diglycidyl compounds (polymers); and vinylcyclohexene dioxide and dicyclopentanediene dioxide.

The image receiving layer in the transfer sheet of the second invention is preferable to further contain, as a curable silicone compound, at least one compound selected from the group consisting of fluorine-containing silicone compounds, isocyanatosilane compounds, alkoxysilane compounds, silane coupling agents, and silane compounds having SiH groups. The layer contains a condensation composition obtained by mixing several kinds of these compounds and/or a mixed composition of these compounds and a colloidal silica dispersion. Further, to improve the adhesion property to the image forming material and the substrate, it is preferable to further contain a thermoplastic resin. The ratio of the thermosetting resin and the thermoplastic resin is in a range of 5% by weight to 95% by weight of the thermoplastic resin, although it depends on the combination of the image forming material and the substrate to be used and additionally, fine particles of thermoplastic resins and additives are contained.

The image receiving layer of the transfer sheet of the second invention is preferable to further contain a modified silicone oil comprising at least one compound selected from the group consisting of silanol-modified silicone oil, carboxy-modified silicone oil, and amino-modified silicone oil. These modified oils are reacted with the curable silicone compound and make the control of the releasing property and the peel strength easy and it is preferable to add the oils in a range of 0.5% by weight to 5% by weight relative to the curable silicone compound to obtain the desired peel strength.

The addition amount of crosslinking agents is preferable to adjust the ratio of the functional group valence of acrylic resins: functional group valence of crosslinking agents to be 1: (0.7 to 1.3). However, actually, reactions of crosslinking agents with the functional groups of the acrylic resins, for example, reactions of melamine type crosslinking agents one another, and reactions of melamine type crosslinking agents and epoxy type crosslinking agents are caused by the reactivity with the acrylic resins, and therefore it is preferable to be determined after preliminary reaction is carried out.

In the transfer sheet of the second invention, in order to prevent adhesion to the fixing member or winding around the fixing member during fixing of the image, the image receiving layer may comprise a natural or synthetic wax which is a material which does not adhere to the fixing member strongly, or a releasing agent such as a release resin, a reactive silicone compound, or a modified silicone oil.

Specific examples of the wax include: natural waxes such as carnauba wax, beeswax, montan wax, paraffin wax, and microcrystalline wax; synthetic waxes such as low molecular weight polyethylene wax, low molecular weight oxidized polyethylene wax, low molecular weight polypropylene wax, low molecular weight oxidized polypropylene wax, higher fatty acid wax, higher fatty acid ester wax, and Sasol wax. Only a single type of wax may be used, or two or more waxes may be used in combination.

The release resin may be selected from: silicone resins; fluororesins; modified silicone resins which are modification products of silicone resins and various types of resins, such as polyester-modified silicone resin, urethane-modified silicone resin, acryl-modified silicone resin, polyimide-modified silicone resin, olefin-modified silicone resin, ether-modified silicone resin, alcohol-modified silicone resin, fluorine-modified silicone resin, amino-modified silicone resin, mercapto-modified silicone resin, and carboxy-modified silicone resin; thermosetting silicone resins; and photocurable silicone resins.

The above-mentioned modified silicone resin has high affinity for the resin particles as an image forming material comprising a toner resin or a thermally fusible resin of the present invention. Accordingly, the modified silicone resin and the image forming material are suitably miscible with each other, compatible with each other, and can mix with each other when heated. Thus, the color of the pigment contained in the toner is exhibited well. Further, it is considered that the releasing property imparted by the silicone resin prevents adhesion between the fixing member and the laminate film for electrography during heat fusion.

Further, in the present invention, in order to further decrease the adhesiveness, a reactive silane compound and a modified silicone oil may be included in the image receiving layer. It has been found that the reactive silane compound reacts with the resin contained in the coated layer, and simultaneously reacts with the modified silicone oil, whereby the combination of the reactive silane compound and the modified silicone oil exhibits a releasing property which is stronger than the releasing property derived from the silicone oil as a liquid lubricant. Further, the combination undergoes a curing reaction to be firmly immobilized in the coated layer as a releasing agent, and the releasing agent does not come off the image receiving layer even when subjected to mechanical wear, solvent extraction, or the like.

The wax or release resin may be present in the particle state or the like, similarly to the case of the resin particles made of a thermally fusible resin. In a preferable embodiment, the wax or releasing agent is added to, dispersed in, and mixed with a thermally fusible resin to be incorporated in the thermally fusible resin before use.

The image receiving layer in the transfer sheet of the second invention comprises a coating layer on the uppermost surface thereof. The coating layer is preferable to have a surface resistivity in a range of $10^8 \Omega$ to $10^{13} \Omega$ at 23° C. and 55% RH, more preferably in a range of $10^9 \Omega$ to $10^{11} \Omega$ at 23° C. and 55% RH. When the surface resistivity is out of the range, the same problems as those of the image transfer sheet for electrophotography having no coating layer may possible be caused.

The surface resistivity of the coating layer can be controlled to be in the above-mentioned range by adding a polymer conductive agent, a surfactant, and conductive metal oxide particles as a charge control agent to the coating layer. Also, a matting agent for improving transportability is preferable to be added.

Examples of the surfactant to be used are those same as the surfactants such as quaternary ammonium salts added to the surface coating for surface resistivity control of the substrate 110.

Examples of the metal oxide constituting the above-mentioned electrically conductive metal oxide particles include $ZnO$, $TiO$, $TiO_2$, $SnO_2$, $Al_2O_3$, $In_2O_3$, $SiO$, $SiO_2$, $MgO$, $BaO$, and $MoO_3$. Only a single metal oxide may be used, or two or more metal oxides may be used. The metal oxide preferably contains a hetero element. Examples thereof include: $ZnO$ containing (doped with) Al, In, or the like; TiO doped with Nb, Ta, or the like; and $SnO_2$ doped with Sb, Nb, a halogen element, or the like. Among these, $SnO_2$ doped with Sb is particularly preferable because it shows little change in electrical conductivity over time and has higher stability.

The volume average particle diameter of the matting agent in the resin is preferably in a range of 1 μm to 50 μm and more preferably in a range of 5 μm to 30 μm. The volume average particle diameter is more preferable as it is larger, however if it is too large, the matting agent is separated from the coating layer and powdering phenomenon takes place and the surface abrasion and scratching tend to easily occur.

Further, the content of the matting agent is preferably in a range of 1% by weight to 200% by weight and more preferably in a range of 5% by weight to 100% by weight relative to the resin for forming the coating layer.

The matting agent is preferable to have flat-shaped and a matting agent previously having a flat shape may be used. A matting agent with a relatively low softening point may be used, and when it uses to coat the image receiving layer 20, it make the shape flat during drying under heating of the image receiving layer. Further, the shape may be made flat by pressing the matting agent under heating. In this connection, it is preferable that the matting agent is projected out of the surface of the coating layer.

As a matting agent, inorganic particles (for example, $SiO_2$, $Al_2O_3$, talc, and kaolin) other than the inorganic particles mentioned above and plastic powder in bead form (for example, crosslinked PMMA, polycarbonate, polyethylene terephthalate, and polystyrene) may be used simultaneously.

In order to improve the transferability of the image transfer sheet in the electrophotographic apparatus, it is necessary to reduce the friction on the film surface by use of matting agent or the like, as mentioned above. In practical use, the coefficient of static friction on the surface of the transfer sheet is preferably 2 or less, more preferably 1 or less. The coefficient of kinetic friction on the surface of the film is preferably in the range of 0.2 to 1, more preferably in the range of 0.3 to 0.65.

In the transfer sheet of the second invention, a substance having antimicrobial activity (an antimicrobial agent) is contained at least in the outermost coated layer of the image receiving layer in accordance with the purpose. The material to be added is selected from the antimicrobial substances which have good dispersion stability in the composition and which are not be denatured upon irradiation with light.

The antimicrobial agent may be an organic substance. Examples thereof include thiocyanato compounds, iodopropargyl derivatives, isothiazolinone derivatives, trihalomethyl thio-compounds, quaternary ammonium salts, biguanide compounds, aldehydes, phenols, benzimidazole derivatives, pyridine oxide, carbanilide, and diphenyl ether.

Alternatively, the antimicrobial agent may be an inorganic substance. Examples thereof include zeolites, silica gels, glasses, calcium phosphates, zirconium phosphates, silicates, titanium oxide, and zinc oxide.

The volume average particle diameter of the inorganic antimicrobial agent is preferably in the range of 0.1 to 10 μm, more preferably in the range of 0.3 to 5 μm. Basically, the antimicrobial agent is preferably exposed on the surface of the image receiving layer 20. Therefore, the volume average particle diameter of the antimicrobial agent to be used is selected according to the film thickness of the outermost coating layer. When the volume average particle diameter is too large, the antimicrobial agent comes off the coating layer (powder detachment), and the film surface may be vulnerable to damage.

Further, the content of the above-mentioned antimicrobial agent in the outermost coating layer is preferably in the range of 0.05 to 5% by weight, more preferably in the range of 0.1 to 3% by weight, based on the resin constituting the coating layer.

As a charge control agent used for the transfer sheet of the second invention, a polymer conductive agent, a surfactant, and conductive metal oxide particles are used, and addition of the charge control agent to the coating layer enable proper control of the surface resistivity of the coating layer to be in the above-mentioned range.

Examples of the surfactant to be used are those same as the surfactants such as quaternary ammonium salts added to surface coating for surface resistivity control of the substrate 110.

Examples of the metal oxide constituting the above-mentioned electrically conductive metal oxide particles include ZnO, TiO, $TiO_2$, $SnO_2$, $Al_2O_3$, $In_2O_3$, SiO, $SiO_2$, MgO, BaO, and $MoO_3$. Only a single metal oxide may be used, or two or more metal oxides may be used. The metal oxide preferably contains a hetero element. Examples thereof include: ZnO containing (doped with) Al, In, or the like; TiO doped with Nb, Ta, or the like; and $SnO_2$ doped with Sb, Nb, a halogen element, or the like. Among these, $SnO_2$ doped with Sb is particularly preferable because it shows little change in electrical conductivity over time and has higher stability.

The antioxidant to be used in the transfer sheet of the second invention may be a commercially available antioxidant. The antioxidant to be added is selected from antioxidants which have good dispersion stability and which are not denatured upon irradiation with light. Examples thereof include phosphoric antioxidants, sulfuric antioxidants, phenolic antioxidants, and hindered amine antioxidants.

Only a single antioxidant may be used, or a mixture of two or more antioxidants may be used.

Further, the ultraviolet absorber to be used in the transfer sheet of the second invention is selected from ultraviolet absorbers which have good dispersion stability in the composition and are not denatured upon irradiation with light. The ultraviolet absorber may be an organic substance. Examples of the organic substance include: salicylates such as phenyl salicylate, p-tert-butylphenyl salicylate, and p-octylphenyl salicylate; benzophenones such as 2,4-dihydroxy benzophenone, 2-hydroxy-4-methoxy benzophenone, 2-hydroxy-4-octyloxy benzophenone, and 2-hydroxy-4-dodecyloxy benzophenone; benzotriazoles such as 2-(2'-hydroxy-5'-methylphenyl)2H-benzotriazole, 2-(2'-hydroxy-5'-tert-butylphenyl)benzotriazole, and 2-(2'-hydroxy-3'-tert-butyl-5'-methylphenyl)-5-chlorobenzotriazole; and cyano acrylates such as 2-ethylhexyl-2-cyano-3,3'-diphenyl acrylate, and ethyl-2-cyano-3,3'-diphenyl acrylate.

The ultraviolet absorber may be an inorganic substance. Examples of the inorganic substance include: oxide particles of zinc oxide or titanium oxide; and particles of a metal oxide such as iron oxide or cerium oxide.

As the ultraviolet absorber, the organic materials are particularly preferable. When the ultraviolet absorber is added, the amount of the ultraviolet absorber to be added is 0.01 to 40 parts by weight, preferably 0.1 to 25 parts by weight, based on 100 parts by weight of the compound having a reactive double bond. In order to protect the image more efficiently, it is preferable to use two or more different types of ultraviolet absorbers. In some cases, it is also preferable to add a hindered amine light stabilizer or an antioxidant.

The transfer sheet of the second invention may have a structure of one or more coating layers as the image receiving layer so as to form an excellent image. A thermally fusible acrylic resin is used preferably for the image receiving layer.

The image receiving layer (the coating layer) may contain various plastic additives such as a heat stabilizer, an oxidation stabilizer, a light stabilizer, a lubricant, a pigment, a plasticizer, a crosslinking agent, an impact resistance improver, an antibacterial agent, a flame retardant, a flame retarding aid, and an antistatic agent, if necessary.

The image receiving layer having at least a resin and a matting agent is formed on the surface of the substrate 110 by the following method.

Each layer may be formed by: mixing at least a resin and a matting agent by using an organic solvent or water; subjecting the mixture to a dispersing treatment by ultrasound, a wave rotor, or an apparatus such as an attriter or a sand mill, to form a uniform dispersion liquid (a coating liquid); and applying or impregnating the coating liquid, as it is, onto the surface of the substrate 110.

The method for coating or impregnating the coating liquid may be a commonly employed method such as the blade coating method, the wire-bar coating method, the spray coating method, the immersion coating method, the bead coating method, the air knife coating method, the curtain coating method, or the roll coating method.

When the image transfer sheet has coating layers on both sides of the substrate, either surface may be coated first, or both sides may be simultaneously coated.

The substrate in transfer sheet of the second invention is similar to the substrate in the transfer sheet of the first invention and the preferable embodiments are also similar to those of the first invention.

The third embodiment of the image transfer sheet for electrophotography of the invention (hereinafter, referred to as "the transfer sheet of the third invention" in some cases) comprises a substrate and an image receiving layer formed on the surface thereof, and a releasing layer interposed between therewith, wherein the releasing layer and the image receiving layer are successively formed on the surface of the substrate. The image receiving layer comprises a curable silicone resin. In the transfer sheet of the third invention, the image receiving layer is a layer containing the curable resin and the image receiving layer is releasable from the releasing layer adjacent in the substrate side.

The transfer sheet of the third invention comprises the releasing layer, and when the image formed in an electrophotographic method is transferred to the image supporting element, the image receiving layer is peeled from the releasing layer and the image receiving layer covers the image transferred on the image supporting element and thus protects the image. Further, since the curable silicone resin contained in the image receiving layer is tough, the scratching resistance is made excellent by covering the image with the resin.

Figure 3:
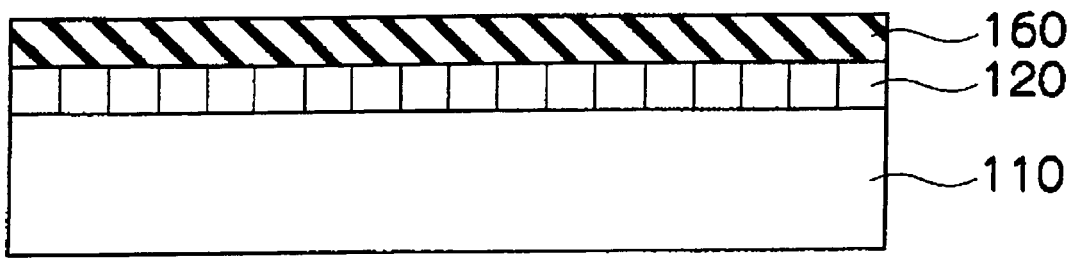
FIG. 3 is a schematic cross-sectional view showing an example of the third embodiment of an image transfer sheet of the present invention.

FIG. 3 is a schematic cross-sectional view showing an example of the third embodiment of an image transfer sheet for electrophotography of the invention.

As shown in FIG. 3, the transfer sheet of the third invention comprises a substrate 110, a releasing layer 120, and a image receiving layer 160. If necessary, a coating layer (a charge control layer), which is not illustrated, or a layer same as the image receiving layer may be formed on the surface of the substrate 110 where no image receiving layer is formed.

The transfer sheet of the third invention has the same structure as that of the transfer sheet of the second invention and the preferable embodiments are same as those of the second invention, except that only a curable silicone resin is used in place of the resin mixture of the curable silicone resin and a resin other than the curable silicone resin.

In the transfer sheet of the third invention, the curable silicone resin used for the image receiving layer is similar to the curable silicone resin used for the image receiving layer in the transfer sheet of the second invention and the preferable embodiments are also similar to those of the second invention.

In the transfer sheet of the third invention, the substrate is similar to the substrate in the transfer sheet of the second invention and the preferable embodiments are also similar to those of the second invention.

On the other hand, in the transfer sheet of the third invention, the releasing layer is similar to the releasing layer in the transfer sheet of the first invention and the preferable embodiments are also similar to those of the first invention.

The fourth embodiment of the image transfer sheet for electrophotography of the invention (hereinafter, referred to as "the transfer sheet of the fourth invention" in some cases) comprises a substrate and an image receiving layer formed on at least one surface of the substrate. The image receiving layer contains a photo-curable resin and has a self-restoration property. In the transfer sheet of the fourth invention, the image receiving layer is a layer containing the curable resin and the image receiving layer is releasable from the releasing layer adjacent in the substrate side.

In this case, the image receiving layer having the self-restoration property means an image receiving layer having the following properties. The self-restoration property is expressed by a haze value and the layer shows the self-restoration property when the difference of haze values measured before and after the series of the steps described hereinafter is within 10%. The haze values are measured by fixing a color OHP film (COLOR OHP FILM HG, manufactured by Fuji Xerox Office Supply Co., Ltd) of a 10 cm×10 cm size in the atmospheric conditions of 23° C. and 55% relative humidity on a measurement stand by a double-coated tape, overlaying an object to be measured (an image transfer sheet for electrophotography) of a 10 cm×10 cm size while setting the image receiving layer in the inner side, putting a 500 g weight, and repeatedly moving only the object to be measured 10 cm horizontally 100 times, and measuring the existence of scratches caused by the repeated movement by a haze meter HGM-2 manufactured by Suga Shikenki Co. Ltd. before and after the above-mentioned series of the steps.

If the haze value difference is within 10%, the surface light scattering owing to the scratches is scarcely observed and therefore it is preferable. The haze value difference is more preferably within 5% and even more preferably 3%.

With respect to the transfer sheet of the fourth invention, when an electrophotographic image is transferred on the image supporting element, the image receiving layer is released from the substrate or the releasing layer (if the releasing layer exists) and the image receiving layer covers the image transferred on the image supporting element and thus protects the image. Further, since the image receiving layer has self-restoration property, the scratching resistance (scratches are not obvious) is made excellent by covering the image with the resin.

Figure 4:
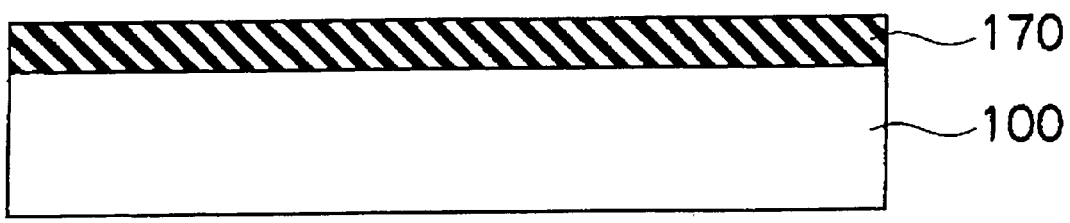
FIG. 4 is a schematic cross-sectional view showing an example of the fourth embodiment of an image transfer sheet of the present invention.

FIG. 4 is a schematic cross-sectional view showing an example of the fourth embodiment of an image transfer sheet for electrophotography of the invention.

As shown in FIG. 4, the transfer sheet of the fourth invention comprises a substrate 110 and an image receiving layer 170, and further a releasing layer may be formed between the substrate 110 and the image receiving layer 170. If necessary, a coating layer (a charge control layer), which is not illustrated, or a layer same as the image receiving layer may be formed on the surface of the substrate 110 where no image receiving layer 170 is formed.

The transfer sheet of the fourth invention will be described in detail.

The image receiving layer 170 is provided with a self-restoration property by adding the following photo-curable resin.

The photo-curable resin to be added to provide image receiving layer with a self-restoration property in the transfer sheet of the fourth invention is a composition containing a photopolymerizable monomer and a photocuring initiator. The photo-curable resin is cured by radiating electromagnetic wave such as ultraviolet rays to be a cured product having the self-restoration property. The photocuring initiator absorbs light energy and is put in excitation state by itself and generates radical for starting the polymerization reaction of the photopolymerizable monomer.

The reaction groups of the photopolymerizable monomer may include acryloyl, methacryloyl, vinyl, ally, mercapto, and amino group, and acryloyl and methacryloyl are preferable to be used from the viewpoint of a particularly high reactivity.

Specific examples of the photopolymerizable monomer are unsaturated polyesters, epoxy acrylates, urethane acrylates, urethane methacrylates, polyester acrylates, alkyd acrylates, silicone acrylates, polyene-polythiol type spirans, aminoalkyds, hydroxyethyl acrylate, and vinyl ethers. Among them, owing to transparency and small shrinkage ratio at the time of photocuring, urethane acrylates and urethane methacrylates are preferably used. Two or more of these monomers may be used in combination.

Yellowing-free polyisocyanate compounds are preferable to be used as the urethane acrylates and urethane methacrylates. Example of the yellowing-free polyisocyanate compounds include 4,4'-methylenebis(cyclohexylisocyanurate), isophorone diisocyanate, cyclohexane diisocyanate, tetramethylene diisocyanate, and hexamethylene diisocyanate.

The photocuring initiator may include benzoyl ether, 1-hydroxycyclohexyl phenyl ketone, 2-methyl-1-(4-(methylthio)phenyl)-2-morpholinopropan-1-one, 2,2-dimethoxy-1,2-diphenylethan-1-one, benzophenone, thioxanthone, xanthone, 2-chlorothioxanthone, Michler's ketone, 2-isopropylthioxanthone, benzil, 9,10-phenanthrenequinone, and 9,10-anthraquinone. Two or more photocuring initiators may be used in combination.

The addition amount of the photocuring initiators is preferable to be 0.1% by weight to 10% by weight (more preferably 0.2% by weight to 5% by weight). A light stabilizer, an antioxidant, an ultraviolet absorbent, an anti-bacterial agent, a flame retardant, and an antistatic agent may be added to the photo-curable resin.

The light source for curing the photo-curing resin may include a low pressure mercury lamp, a high pressure mercury lamp, an ultra high pressure mercury lamp, a metal halide lamp, an ultraviolet laser, an electrode-less discharge lamp, electron beam, and x-rays and any may be used if it can cause curing reaction.

The transfer sheet of the fourth invention is preferable to use a resin other than the photo-curable resin (a mixture of the photo-curable resin and a resin other than the photo-curable resin) in combination with the photo-curable resin. A curable silicone resin can be exemplified as the resin other than the photo-curable resin. The curable silicone resin is the same as the curable silicone resin to be used for the image receiving layer of the transfer sheet of the second invention and the preferable embodiments of the resin are also same as those of the second invention.

The components other than the photo-curable resin and the curable silicone resin in the transfer sheet of the fourth invention are same as the components other than the curable silicone resin in the transfer sheet in the third invention. It is also preferable that the transfer sheet has a similar volume average resistivity as that of the transfer sheet of the third invention.

The substrate in the transfer sheet of the fourth invention is same as the substrate in the transfer sheet of the second invention and preferable embodiments are also same as those in the transfer sheet of the second invention.

The releasing layer in the transfer sheet of the third invention is same as the releasing layer in the transfer sheet of the first invention and preferable embodiments are also same as those in the transfer sheet of the first invention.

(Image Recorded Medium and Method for Manufacturing Image Recorded Medium)

Next, an image recorded medium on which an image is formed by using the first to forth embodiments of the above-described transfer sheet for electrophotography of the present invention will be described. Herein, the term "image recorded medium" refers to a medium on which an image has been formed (recorded).

The image recorded medium of the present invention is an image recorded medium obtained by a process comprising: providing an image transfer sheet for electrophotography comprising a substrate and an image receiving layer on which a mirror image of a desired image made of an image forming material has been formed by an electrophotographic method; adhering the surface having the mirror image to a surface of an image supporting element by heat and pressure; and, after cooling and solidification of the image forming material, peeling the substrate off the image receiving layer. As a result, the image forming material is transferred to the image supporting element. The image information is recorded in this way. The image transfer sheet for electrophotography is the above-described image transfer sheet for electrophotography of the present invention.

The image recorded medium may be (1) an image recorded medium such as an image sheet or an image panel. The image recorded medium of this type is obtained by a process comprising transferring the image on the image forming material transfer sheet for electrophotography of the present invention to the image supporting element by thermocompression bonding. Prior to the transfer, a toner image according to the information has been formed on the surface of the image forming material transfer sheet. As an alternative, the image recorded medium may be (2) an image recorded medium such as an information recording medium. The image recorded medium of this type stores predetermined information and can communicate with an external device in a contact or non-contact manner. The image recorded medium may contain such an information chip(s) that the information can be read by using at least one of electric system, magnetic system, and optical system. The information chip(s) may be disposed in at least one location in the image supporting element. Examples of the image recorded medium of this type include an IC card, a magnetic card, an optical card, and a card which is a combination thereof.

In the image recorded medium as mentioned in the above item (1), the toner image is not particularly limited, and may be such a toner image that a part or the whole of the toner image serves as information with some identification function, such as a toner image containing image information or textual information. In addition, the information contained in the toner image does not have to be identifiable visually, and may be identified mechanically.

In the image recorded medium (information recording medium) as mentioned in the above item (2), the information chip is not particularly limited, provided that the information chip stores information having some identification function and that the information is readable by using at least one selected from an electric system, a magnetic system, and an optical system. The information chip may be of read-only type. As an alternative, the information chip may be an information chip on which information can be read and written (including "rewriting"), in accordance with the necessity. Specific examples of such an information chip include an IC chip (a semiconductor circuit).

When the above-mentioned information chip is used as an information source of the image recorded medium, it is not necessary for the entire toner image or a part of the toner image to have any information having identification function.

The information held by the toner image or the information chip is not particularly limited, provided that the information is identifiable. The information may contain variable information. The term "variable information" refers to such information field that the specific information recorded on each image recorded medium is different when a plurality of image recorded media are manufactured on the same specifications or standard.

For example, when the toner image contains variable information, the part of the toner image corresponding to the variable information may vary from one image recorded medium to another.

Further, the variable information may contain personal information. In this case, the image recorded medium (the information recording medium) of the present invention is applicable to cash cards, employee identification cards, student identification cards, individual membership cards, resident identification cards, various types of driver's licenses, various types of qualification certificates, and the like. When the image recorded medium is used for such applications, examples of the personal information include a facial photograph, image information for identity verification, the name, the address, the date of birth, and a combination thereof.

The image recorded medium of the present invention is manufactured by a process comprising:

electrophotographically forming a mirror image of a desired image made of an image forming material on the surface of the image transfer sheet for electrophotography (the transfer sheet for electrophotography of the present invention) which surface is on the side having thereon the image receiving layer;

superposing the transfer sheet for electrophotography on an image supporting element such that a surface of the image supporting element and the fixed mirror image contact each other to form a stacked assembly;

subjecting the stacked assembly to thermocompression bonding; and after cooling and solidification of the image forming material, peeling the transfer sheet for electrography off the image supporting element so as to transfer the image forming material to the image supporting element, thereby recording the image.

In order to form an image on the transfer sheet electrophotographically, the surface of the photoreceptor for electrophotography (an image carrier) is first uniformly provided with electric charge to be electrically charged, and then the surface is exposed to light based on the image information to form an electrostatic latent image corresponding to the light exposure. Then, the toner, which is an image forming material, is supplied from a developing unit to the electrostatic latent image on the surface of the photoreceptor, whereby the electrostatic latent image is developed with the toner and visualized (a toner image is formed). Then, the formed toner image is transferred to the surface of the transfer sheet which surface is on the side having the image receiving layer thereon. Finally the toner image is fixed on the surface of the image receiving layer by heat, pressure, and the like, and the transfer sheet is discharged from the electrophotographic apparatus.

When the transfer sheet for electrophotography of the present invention is used, the image formation surface (the surface on the side on which the image receiving layer is provided) is superposed on an image supporting element containing an IC chip or the like and the image is transferred. Therefore, the image formed on the image receiving layer of the transfer sheet has to be a reverse image (a mirror image). Accordingly, when an electrostatic latent image is formed on the surface of the photoreceptor, the image information used for exposure of the surface of the photoreceptor is preferably information of a mirror image of a desired image.

The image supporting element to be used in the present invention is made of a metal, a plastic, a ceramic, or the like, and is preferably in the form of a sheet.

The image supporting element to be used in the present invention is preferably a plastic sheet, and is preferably opaque. When an opaque image supporting element is used for forming an image recorded medium, the image formed thereon can be easily viewable. A whitened plastic sheet is a representative example of the image supporting element.

The resin for the above-mentioned plastic sheet may be any resin described above as an example of the resin used for the substrate of the image forming material transfer sheet for electrophotography. The plastic sheet is preferably a polyacetate film, a cellulose triacetate film, a nylon film, a polyester film, a polycarbonate film, a polystyrene film, a polyphenylene sulfide film, a polypropylene film, a polyimide film, cellophane, or an ABS (acrylonitrile-butadiene-styrene) resin film.

Among the above-mentioned various types of plastic films, a polyester film is preferable. The polyester film is preferably a film called PETG. The PETG film is obtained by substituting approximately half of the ethylene glycol component in the raw material of PET (polyethylene terephthalate formed from ethylene glycol and terephthalic acid) with 1,4-cyclohexane methanol component and then conducting copolymerization. Also preferable are polyester films obtained by incorporating polycarbonate to PETG to form an alloy, an amorphous polyester called A-PET, which is a PET which has not been biaxially stretched, and the like.

With respect to the image supporting element to be used in the invention, at least the surface on the side to which the image is transferred is preferable made of so-called PETG resin comprising a vinyl chloride resin, a polycarbonate resin, and a polyester formed by copolymerizing at least ethylene glycol, terephthalic acid, and 1,4-cyclohexa dimethanol.

In the present invention, at least the surface of the image supporting element to which surface an image is to be transferred contain PETG. When the surface contains PETG, the transferred image forming material (toner) can be almost completely embedded in the surface of the image supporting element. As a result, shape of the surface of the final image recorded medium can be the same as the shape of the surface of the releasing layer of the transfer sheet for electrophotography.

In the present invention, the image supporting element is preferably free of chlorine, as mentioned above. Accordingly, the following materials are also preferable: sheets obtained by adding a hot-melt adhesive, such as polyester or EVA, to the polystyrene resin sheet, ABS resin sheet, AS (acrylonitrile-styrene) resin sheet, PET sheet, or polyolefin resin sheet such as polyethylene or polypropylene.

As a method for whitening the plastic, a method may be employed in which a white pigment is mixed in the film. The white pigment may be, for example: particles of a metal oxide such as silicon oxide, titanium oxide, or calcium oxide; an organic white pigment; or polymer particles. It is also possible to subject the surface of the plastic sheet to sandblasting, embossing, or the like, thereby providing the surface of the plastic sheet with irregularities. The irregularities cause scattering of light, thereby whitening the plastic sheet.

As the image supporting element to be used in the present invention, it is preferable to use a plastic sheet having a thickness of 75 to 1000 µm, and it is more preferable to use a PETG sheet having a thickness of 100 to 750 µm.

In the present invention, when the final image recorded medium is used as an IC card or the like, an image supporting element which has a semiconductor circuit inside or on the surface thereof can be used as the image supporting element.

The method for incorporating a semiconductor circuit in the image supporting element may be a method of interposing a sheet called an inlet having a semiconductor circuit fixed thereon between sheet materials for constituting the image supporting element, and then conducting hot press to integrate them by thermal fusion bonding. It is also possible to use a method of directly disposing a semiconductor circuit without using the inlet sheet, and then integrating the image supporting element and the semiconductor circuit by thermal fusion bonding in the same manner as described above.

Instead of using the above-mentioned thermal fusion bonding, it is also possible to bond the sheets constituting the image supporting element to each other by using an adhesive such as hot-melt in the process for incorporating a semiconductor circuit. However, the method for manufacturing the image supporting element is not limited to the above methods, and may be, for example, any method for incorporating a semiconductor circuit into an IC card.

Further, it is also possible to dispose the semiconductor circuit such that the semiconductor circuit is exposed on the surface of the image supporting element, rather than inside the image supporting element, as long as the image supporting element is practically usable as an image recorded medium.

When the image recorded medium of the present invention is used as a magnetic card or the like, an antenna, a magnetic stripe, an external terminal, or the like is embedded in accordance with the necessity. In addition, a magnetic stripe, a hologram, or the like may be printed on the image recorded medium, or the necessary textual information may be embossed on the image recorded medium.

The overlapping of the transfer sheet for electrophotography and the image supporting element may be carried out by aligning the transfer sheet and the image supporting element by holding them by hand, or may be carried out by sequentially delivering the transfer sheet having an image formed thereon and the image supporting element to a collation tray or the like and automatically aligning them.

In the thermocompression bonding, the compression bonding method is not particularly limited, and may be any of conventionally known various types of lamination techniques. Accordingly, any of conventionally known various lamination apparatuses may be used. Among these, it is preferable to use a heat press method in which lamination is carried out by application of heat. For example, the compression bonding may be conducted by a conventional lamination technique and lamination apparatus which pass the stacked assembly comprising the transfer sheet and the image supporting element through the pressure bonding part (nip part) between a pair of heatable nip rolls to thermally fuse the stacked assembly to some degree, thereby performing fusion bonding.

The image formed on the image transfer sheet for electrophotography to be used for the thermocompression bonding may be an unfixed image. In this case, the color of the toner is exhibited well when the temperature of thermocompression bonding is set at a temperature which is slightly higher than the temperature in the case where the image has already undergone the fixing.

After the stacked assembly is subjected to thermocompression-bonding and then the image forming material cools to solidify, the substrate of the image transfer sheet is peeled off the image receiving layer, so that the image forming material is transferred to the image supporting element. In this way, the image is recorded to form an image recorded medium of the present invention.

The temperature of the stacked assembly immediately before peeling is specifically a temperature which equal to or lower than the softening point at which the toner solidifies sufficiently, which may be, for example, equal to or lower than the glass transition temperature of the image forming material. The temperature of the stacked assembly immediately before peeling is preferably in the range of from room temperature to 30° C. The condition in which the substrate of the transfer sheet is peeled off the image receiving layer is not particularly limited. In a preferable embodiment, the end of the transfer sheet is gripped and the substrate is gradually peeled off the image receiving layer.

Next, specific examples of the information recording medium as mentioned above will be described with reference to the drawings. FIG. 5 shows cross-sectional views illustrating the state of the image recorded medium of the present invention before thermocompression bonding in its production process, and an example of the image recorded medium after thermocompression bonding and peeling-off. In FIG. 5, the reference character 100 indicates a transfer sheet for electrophotography, and the reference character 200 indicates an image supporting element (an image recorded medium).

Figure 5A:
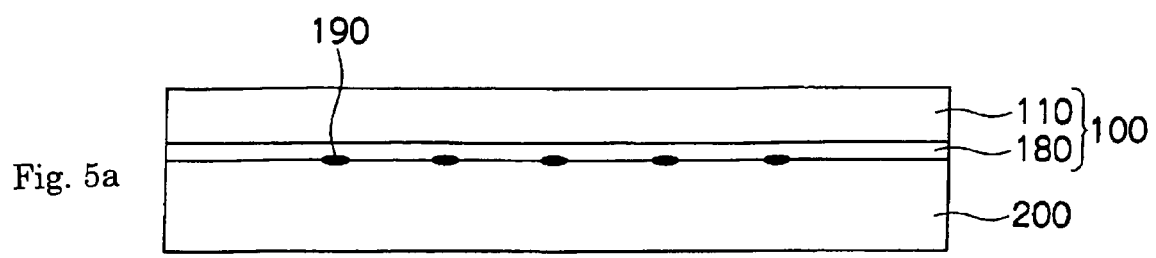
FIG. 5a is a schematic cross-sectional view showing the state that a laminate is formed by superposing a transfer sheet for electrophotography 100 and an image supporting element 200, to be transferred an image.

FIG. 5a illustrates a stacked assembly which has been formed by superposing the transfer sheet 100 for electrophotography on an image supporting element 200 (a PETG sheet) to which the image is to be transferred. Before thermocompression bonding, an image forming material (toner) 190 is present on the image receiving layer 180 side of the of the transfer sheet, or on the interface between the image receiving layer 180 and the image supporting element 200.

Further, the transfer sheet for electrophotography shown in FIG. 5 comprises a substrate having thereon an image receiving layer only. However, the transfer sheet may comprise a releasing layer or a curable resin layer as described in the embodiments of the transfer sheet of the present invention.

Figure 5B:
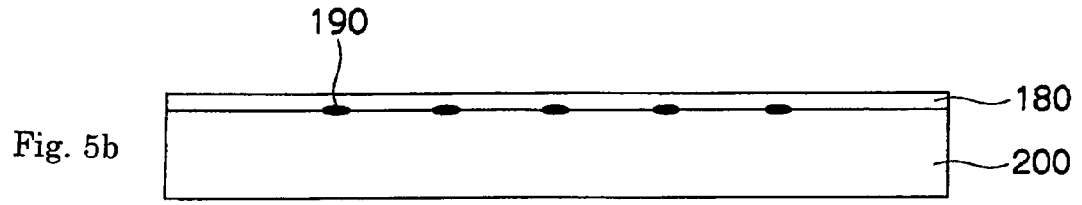
FIG. 5b is a schematic cross-sectional view showing the state that a transfer sheet for electrophotography 100 is released from the laminate formed by superposing the transfer sheet for electrophotography 100 and an image supporting element 200.

On the other hand, as shown in FIG. 5b, the image forming material 190 after thermocompression bonding and peeling-off is completely embedded in the image receiving layer 180. Accordingly, the obtained image recorded medium has the same feeling as an image recorded medium obtained by direct printing thereon. Further, the image forming material 190 is protected and does not come off easily.

The image recorded medium obtained by peeling can be used as an image recorded medium of the present invention, as it is. However, when a plurality of separate images are formed on the transfer sheet for electrophotography, the obtained image recorded medium may be cut for the respective images, to form a plurality of image recorded media having a predetermined size.

(Method for Manufacturing an Image Recorded Medium)

A method for manufacturing an image recorded medium comprises: providing an image transfer sheet for electrophotography comprising a substrate and an image receiving layer provided on the substrate; electrophotographically forming a mirror image of a desired image made of an image forming material on the surface of the image transfer sheet which surface is on the side having thereon the image receiving layer; superposing the image transfer sheet on an image supporting element such that a surface of the image supporting element and the fixed mirror image contact each other to form a stacked assembly; subjecting the stacked assembly to thermocompression bonding; and after cooling and solidification of the image forming material; peeling the substrate off the image receiving layer so as to transfer the image forming material to the image supporting element, wherein the image transfer sheet for electrophotography is the above-mentioned transfer sheet of the invention.

In the method for manufacturing an image recorded medium, it is preferable to set two image transfer sheets for electrophotography subjected to the image formation steps face to face to both faces of the image supporting element in the manner that the fixed image faces are set to the image supporting element faces in the positioning step since images can simultaneously be transferred to both of the front and back sides of the image supporting element.

Next, an image recorded medium manufacturing apparatus of the present invention will be described.

The image recorded medium manufacturing apparatus of the present invention uses the transfer sheet for electrophotography, and employs the image recorded medium manufacturing method of the present invention. The apparatus comprises a transfer sheet storing part, an image forming part, an image supporting element storing part, a positioning part, a thermocompression bonding part, and a peeling part. The transfer sheet storing part contains transfer sheets for electrophotography having an image receiving layer on at least one side thereof. The image forming part electrophotographically forms an image made of an image forming material as a mirror image on the image receiving layer side of the transfer sheet for electrophotography. The image supporting element storing part contains image supporting elements. The positioning part forms a stacked assembly by superposing the transfer sheet for electrophotography on at least one side of the image supporting element such that the side of the image supporting element contacts the transfer sheet surface having the image thereon. The thermocompression bonding part applies heat and pressure to the stacked assembly to conduct thermocompression-bonding. The peeling part peels the substrate of the transfer sheet off the image receiving layer after cooling and solidification of the image forming material, to transfer the image forming material to the image supporting element, thereby recording the image.

Figure 6:
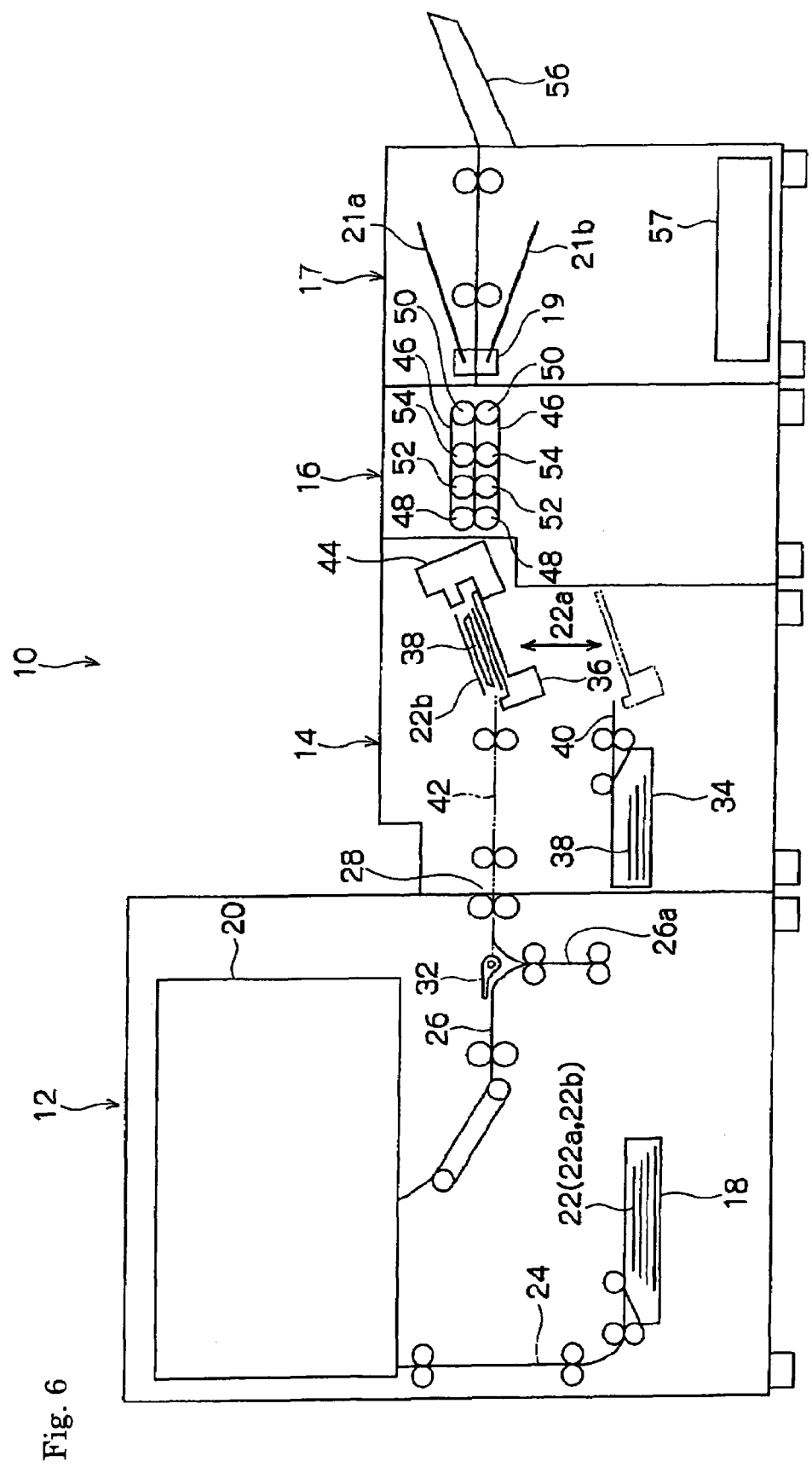
FIG. 6 is a schematic drawing showing an exemplary structure of an image recorded medium manufacturing apparatus of the present invention.

FIG. 6 is a schematic configuration drawing illustrating an image recorded medium manufacturing apparatus of the present invention.

The image recorded medium manufacturing apparatus 10 shown in FIG. 6 comprises an image forming apparatus 12, a collation apparatus 14 (positioning part), a lamination apparatus 16 (thermocompression bonding part), and a peeling apparatus 17 (peeling part).

The image forming apparatus 12 comprises, for example, a transfer sheet stacker 18 (transfer sheet storing part), an image forming part 20, a conveyance path 24 through which a transfer sheet 22 is conveyed from the transfer sheet stacker 18 to the image forming part 20, and a conveyance path 26 through which the transfer sheet 22 is conveyed from the image forming part 20 to a discharge opening 28. Description of the other components is omitted.

The transfer sheet stacker 18 stores transfer sheets 22, and comprises a pick-up roller and paper feed rollers which are similar to pick-up rollers and paper feed rollers provided in general paper feed apparatuses. The paper feed rollers and the like are rotated at a prescribed timing so as to convey the transfer sheet 22 to the image forming part 20.

The image forming part 20 comprises an apparatus of a known electrophotographic apparatus. The apparatus comprises: a latent image carrier for forming a latent image; a developing unit which uses a developer containing at least toner for developing the latent image to give a toner image; a transfer unit for transferring the developed toner image to the transfer sheet 22; and a fixing unit which heats and presses the toner image transferred to the transfer sheet 22 to fix the image.

The conveyance path 24, 26 comprises: a plurality of roller pairs including a drive roller pair, and a guide (not shown). The conveyance path 26 is provided with a reversing path 26a for reversing the direction of conveyance of the transfer sheet 22. In the vicinity of the point of bifurcation between the conveyance path 26 and the reversing path 26a, a cam 32 for changing the guiding direction of the transfer sheet 22 is provided. When the transfer sheet 22 enters the reversing path 26a and then returns to the conveyance path 26, the conveyance direction of the transfer sheet 22 is reversed, and the transfer sheet 22 is turned upside down.

The collation apparatus 14 comprises a plastic sheet (image supporting element) stacker 34, a collation tray 36 (positioning part), a conveyance path 40 through which a plastic sheet 38 (image supporting element) is conveyed from the plastic sheet (image supporting element) stacker 34 to the collation tray 36, and a conveyance path 42 through which the transfer sheet 22 delivered from the discharge opening 28 of the image forming apparatus 12 is supplied to the collation tray 36.

The discharge part of the conveyance path 40 for supplying the plastic sheet 38 to the collation tray 36, and the discharge part of the conveyance path 42 for supplying the transfer sheet 22 to the collation tray 36, are provided in parallel to each other and separated in the vertical direction.

The conveyance paths 40 and 42 each may comprise a smooth planar member and conveying rollers for conveying the transfer sheet 22 on the surface of the smooth planer member, or may comprise a rotating belt-like conveying element. And, the conveying rolls or the belt are rotated to convey the transfer sheet 22 or the plastic sheet 38 to the collation tray 36 in synchronization with the discharge of the transfer sheet 22 from the image forming apparatus 12 or with the discharge of the plastic sheet 38.

The plastic sheet stacker 34 (the image supporting element storing part) stores plastic sheets 38, and comprises a pick-up roller and paper feed rollers which are similar to pick-up rollers and paper feed rollers provided in general paper feed apparatuses. The paper feed rolls or the like are rotated to convey the plastic sheet 38 to the collation tray 36 immediately after the collation tray 36 is moved to the discharge opening of the plastic sheet stacker 34.

In order that the plastic sheet 38 and the transfer sheet 22 are supplied respectively from the discharge part of the conveyance path 40 and the discharge part of the conveyance path 42, the collation tray 36 may, for example, have a configuration in which: a part of the end of the collation tray 36 is connected to the outer surface of a belt which is installed vertically (from top to bottom in the drawing) and the collation tray 36 is vertically moved together with the rotating movement of the belt. The vertical moving system is not limited to this example, and may be a motor driving system or any other known system. A positioning device (not shown) is also provided to the collation tray 36 and the positioning device aligns the edges of the plastic sheet 38 and the transfer sheet 22 which have been overlapped.

The collation tray 36 is provided with a temporarily fastening apparatus 44 which temporarily fastens two transfer sheets 22 separated by a plastic sheet 38. This temporarily fastening apparatus, for example, comprises a pair of protrusions made of metal which can be heated by a heater, and the two transfer sheets 22 separated by a plastic sheet 38 are temporarily fastened to each other through thermal fusion of a vicinity of the edge of the stacked sheets when the vicinity of the edge of the stacked sheets is held by the heated pair of protrusions.

The temporarily fastening method which employs thermal fusing is not limited to the method using a pair of hot protrusions, and may be any other existing method, such as a method of penetrating a heated needle-like member through the sheets in the vertical direction or a method of holding the sheets with a member loaded with an ultrasonic vibrator to perform fusing by the heat generated by the ultrasonic vibration. Further, the method for temporarily fastening the sheets may be a method of mechanically restraining the mutual movement without using heat, such as a method of using a stapler needle or the like to fasten the sheets, or a method of using a gripper which is movable with the sheets along the conveyance path.

When the temporarily fastening apparatus 44 is provided on the conveyance path for conveying the stacked assembly from the collation tray 36 to the lamination apparatus 16, the temporarily fastening apparatus 44 has to be constructed such that the temporarily fastening apparatus 44 is disposed at the end of the collation tray 36 only when temporary fastening is carried out, and that the temporarily fastening apparatus 44 is capable of being withdrawn from the conveyance path at any other time.

The lamination apparatus 16 may employ, for example, a belt nip system which uses a pair of belts 46. The respective belts 46 are tightened by heat-press rolls 48 and tension rolls 50, and are also tightened by rolls 52 and 54.

The thermocompression bonding method for use in the lamination apparatus 16 is not particularly limited, and the thermocompression bonding may use any of various conventionally-known lamination techniques and lamination apparatuses. For example, the conventional lamination technique and lamination apparatus may be used in which the stacked assembly is passed through the nip part formed by a pair of nip rolls or the like so as to thermally fuse the stacked assembly to some degree and so as to conduct thermal fusion bonding. The compression bonding may be conducted also by a heat press technique and a heat press apparatus.

The peeling apparatus 17 comprises, for example, an air injection nozzle 19 and guides 21a and 21b. A discharge tray 56 may be provided on the downstream side of the plastic sheet conveyance path.

First, in the image forming apparatus 12, a first transfer sheet 22a (a transfer sheets 22) to be pressure-bonded to the back side (the lower side in the drawing) of the plastic sheet 38 is supplied from the transfer sheet stacker 18 to the image forming part 20 through the conveyance path 24. Then, a predetermined toner image is transferred to and then fixed on the front side (the upper side in the drawing) of the first transfer sheet 22a electrophotographically to form a fixed image (the image formation process). Since the fixed image is formed on the front side of the first transfer sheet 22a, the first transfer sheet 22a is conveyed directly to the discharge opening 28 through the conveyance path 26, and fed to the collation apparatus 14.

Then, in the collation apparatus 14, the first transfer sheet 22a is supplied to the collation tray 36 through the conveyance path 42 of the collation apparatus 14. Here, the first transfer sheet 22a which has left the discharge part of the conveyance path 42 is supplied to the collation tray 36 by its own weight with the image surface of the first transfer sheet 22a facing upward.

Then, the collation tray 36 is lowered to near the discharge part of the conveyance path 40, and the plastic sheet 38 is supplied from the plastic sheet stacker 34 to the collation tray 36 through the conveyance path 40. Here, the plastic sheet 38 which has left the discharge part of the conveyance path 40 is supplied to the collation tray 36 by its own weight to be superposed on the first transfer sheet 22a.

Then, in the image forming apparatus 12, a second transfer sheet 22b to be pressure-bonded to the front side (the top side in the drawing) of the plastic sheet 38 is supplied from the transfer sheet stacker 18 to the image forming part 20 through the conveyance path 24. Subsequently, a predetermined toner image is transferred to and then fixed on the front side (the top side in the drawing) of the second transfer sheet 22b electrophotographically to form a fixed image (the image formation process). Because the fixed image is formed on the front side of the second transfer sheet 22b, the second transfer sheet 22b is passed through the conveyance path 26 to enter the reversing path 26a once, and then the second transfer sheet 22b is brought back to the conveyance path 26 to be conveyed to the discharge opening 28, then further conveyed to the collation apparatus 14.

At this time, the cam 32 is driven such that the tip thereof is put upon the conveyance path 26 in the vicinity of the bifurcation point between the conveyance path 26 and the reversing path 26a, and the conveyance direction of the second transfer sheet 22b is changed when the second transfer sheet 22b reaches the tip of the cam 32, so that the second transfer sheet 22b is guided and conveyed to the reversing path 26a. After the second transfer sheet 22b reaches the reversing path 26a, the driving rollers (not shown) are rotated in the inverse direction to convey the second transfer sheet 22b in the inverse direction through the reversing path 26a, so that the second transfer sheet 22b is brought back to the conveyance path 26. Therefore, the second transfer sheet 22b which has been brought back to the conveyance path 26 has the opposite orientation to that of the second transfer sheet 22b before entering the reversing path 26a, with respect to the leading end and the trailing end and with respect to the upper side and the lower side. Thus, the image surface of the second transfer sheet 22b which has returned from the reversing path 26a faces downward (to the lower side in the drawing).

Then, in the collation apparatus 14, the second transfer sheet 22b is supplied to the collation tray 36 through the conveyance path 42 in the collation apparatus 14. Here, the second transfer sheet 22b which has left the discharge part of the conveyance path 42 is supplied to the collation tray 36 by its own weight to be superposed on the plastic sheet 38 with the image surface of the second transfer sheet 22b facing downward.

Thus, to the collation tray 36, the first transfer sheet 22a having the image surface facing upward, the plastic sheet 38, and the second transfer sheet 22b having the image surface facing downward are supplied in this order and superposed one upon another (the positioning process). In this stacked assembly, the image surface of the first transfer sheet 22a and the image surface of the second transfer sheet 22b contact the opposite surfaces of the plastic sheet 38, respectively.

Then, the edges of the first transfer sheet 22a, the plastic sheet 38, and the second transfer sheet 22b on the collation tray 36 are aligned by the positioning system (not shown), and then the edges of the stacked sheets are temporarily fastened by the temporarily fastening apparatus 44. Thereafter, the stacked sheets are fed to the lamination apparatus 16. The transfer sheet 22 and the plastic sheet 38 have the same size, and thus positioning is carried out by aligning the edges of the stacked sheets.

Then, in the lamination apparatus 16, the stacked assembly composed of the first transfer sheet 22a, the plastic sheet 38, and the second transfer sheet 22b are passed through the nip between the pair of belts 46 to be subjected to thermocompression bonding, and the plastic sheet 38 is thermocompression-bonded to the first transfer sheet 22a and the second transfer sheet 22b (the thermocompression bonding process).

The thermocompression-bonded stacked assembly is then fed to the peeling apparatus 17. The plastic sheet 38, for example, has a notch at the front right edge, and in that portion, the first transfer sheet 22a and the second transfer sheet 22b face each other with a certain clearance between them, without being adhered to the plastic sheet 38. When the leading end of the stacked assembly comes near the air injection nozzle 19, compressed air is injected from the nozzle. The edges of the first transfer sheet 22a and the second transfer sheet 22b are lifted from the plastic sheet 38, the ends of the guides 21a and 21b are inserted between the first transfer sheet 22a and the plastic sheet 38, and between the second transfer sheet 22b and the plastic sheet 38. Further, as the stacked assembly is conveyed, the two transfer sheets are conveyed in such directions along the guides 21a and 21b that the two transfer sheets are peeled off the plastic sheet 38. As a result, the transfer sheets are peeled off the plastic sheet 38.

The plastic sheet 38 is discharged to the discharge tray 56 to give a recorded plastic sheet. When a plurality of individual images are formed on the plastic sheet, the plastic sheet is cut out for the respective images to form plastic sheets having a predetermined size.

The first transfer sheet 22a and the second transfer sheet 22b are thereafter passed through paths (not shown) to be discharged to a transfer sheet discharge tray 57. The discharged transfer sheet may be returned to the transfer sheet stacker to be used for image recording again.

As described above, in the image recorded medium manufacturing apparatus of the present invention, an image is formed on one side of each of two transfer sheets 22 electrophotographically, and the image surfaces of these two transfer sheets 22 are allowed to face each other while separated by the plastic sheet 38. Then, thermocompression bonding is conducted, and then the transfer sheets are peeled off. Accordingly, an image having a high resolution can be printed on a plastic sheet with a high productivity by using an apparatus as an image forming device which can be obtained by minor modification of a conventional electrophotographic apparatus.

In addition, in the middle of the conveyance path 26 for conveying the transfer sheet 22 from the image forming part 20 to the discharge opening 28 in the image forming apparatus 12, the reversing path 26a is provided. The first transfer sheet 22a, which is to be supplied to the lower side of the collation tray 36, is conveyed without entering the reversing path 26a, and the second transfer sheet 22b, which is to be supplied to the upper side, is allowed to enter the reversing path 26a during conveyance and the front and back thereof is reversed. By selectively reversing the front and back of the transfer sheet 22 in this manner, positioning can be performed continuously, whereby printing on the plastic sheet can be conducted more efficiently.

A method for manufacturing an image recorded medium is preferable to comprises forming images of an image forming material in a form of mirror images by electrophotographic method on both front and rear faces of the image transfer sheet for electrophotography having the image receiving layers in both front and rear faces; positioning and obtaining a laminate by overlaying the image transfer sheet for electrophotography on image supporting elements in a manner that both front and rear faces of the supports are set face to face to the fixed image face sides; pressure boding the laminate subjected to the positioning; cooling and curing the image formation material; and separating the image transfer sheet for electrophotography from the image supporting elements and recording the images by transferring the image formation material to the image supporting elements and the image transfer sheet for electrophotography is the above-mentioned transfer sheet of the invention and two image recording bodies are produced using one transfer sheet for electrophotography.

Hereinafter, particularly preferable modes of the invention are listed. However, the invention is not necessarily limited to these modes.

<1> An image transfer sheet for electrophotography comprising a substrate and at least one layer including an image receiving layer on one side surface of the substrate, wherein at least one layer of the layers is a curable resin-containing layer which is a layer separable from the substrate or a layer disposed between the curable resin-containing layer and the substrate on the one side surface.

<2> The image transfer sheet for electrophotography as described in <1>, wherein the peel strength between the layer containing the curable resin and either the substrate or a layer disposed between the curable resin-containing layer and the substrate on the one side surface is 0.098 N/cm to 4.90 N/cm (10 gf/cm to 500 gf/cm).

<3> The image transfer sheet for electrophotography as described in <1>, wherein the surface resistivity of both surfaces of the sheet at 23° C. and 55% RH is in a range of $1.0 \times 10^8 \Omega$ to $1.0 \times 10^{13} \Omega$ and a releasing layer, a curable resin layer containing a curable resin, and an image receiving layer are formed successively in this order from the substrate side.

<4> The image transfer sheet for electrophotography as described in <3>, wherein the image receiving layer has a thickness of 2 μm to 25 μm and contains a thermoplastic resin and particles having a volume average particle diameter which is greater than a thickness of the image receiving layer.

<5> The image transfer sheet for electrophotography as described in <3>, wherein the image receiving layer contains at least one polyester resin.

<6> The image transfer sheet for electrophotography as described in <1>, wherein the image receiving layer is formed on the surfaced of the substrate and the image receiving layer contains a mixture of a curable silicone resin and a resin other than the curable silicone resin.

<7> The image transfer sheet for electrophotography as described in <6>, wherein the curable silicone resin is an acryl-modified silicone resin.

<8> The image transfer sheet for electrophotography as described in <6>, wherein the curable silicone resin is a thermosetting silicone resin.

<9> The image transfer sheet for electrophotography as described in <6>, wherein the curable silicone resin is a mixture of an acryl-modified silicone resin and a thermosetting silicone resin.

<10> The image transfer sheet for electrophotography as described in <6>, wherein the image receiving layer contains at least one compound selected from the group consisting of fluorine-containing silicone compounds, isocyanatosilane compounds, alkoxysilane compounds, silane coupling agents, and silane compounds having SiH groups.

<11> The image transfer sheet for electrophotography as described in <6>, wherein the image receiving layer contains at least one modified silicone oil selected from the group consisting of silanol-modified silicone oil, carboxy-modified silicone oil, and amino-modified silicone oil.

<12> The image transfer sheet for electrophotography as described in <6>, wherein the surface resistivity of both surfaces of the sheet is in a range of $1.0 \times 10^8 \Omega$ to $1.0 \times 10^{13} \Omega$ at 23° C. and 55% RH.

<13> The image transfer sheet for electrophotography as described in <1>, wherein a releasing layer and an image receiving layer are successively formed on the surface of the substrate on which the image receiving layer is formed and the image receiving layer contains a curable silicone resin.

<14> The image transfer sheet for electrophotography as described in <13>, wherein the curable silicone resin is an acryl-modified silicone resin.

<15> The image transfer sheet for electrophotography as described in <13>, wherein the curable silicone resin is a thermosetting silicone resin.

<16> The image transfer sheet for electrophotography as described in <13>, wherein the curable silicone resin is a mixture of an acryl-modified silicone resin and a thermosetting silicone resin.

<17> The image transfer sheet for electrophotography as described in <13>, wherein the image receiving layer contains at least one compound selected from the group consisting of fluorine-containing silicone compounds, isocyanatosilane compounds, alkoxysilane compounds, silane coupling agents, and silane compounds having SiH groups.

<18> The image transfer sheet for electrophotography as described in <13>, wherein the image receiving layer contains at least one modified silicone oil selected from the group consisting of silanol-modified silicone oil, carboxy-modified silicone oil, and amino-modified silicone oil.

<19> The image transfer sheet for electrophotography as described in <13>, wherein the surface resistivity of both surfaces of the sheet is in a range of $1.0\times10^8\Omega$ to $1.0\times10^{13}\Omega$ at 23° C. and 55% RH.

<20> The image transfer sheet for electrophotography as described in <1>, wherein the image receiving layer is formed on at least one surface of the substrate, and the image receiving layer contains a photo-curable resin having a self-restoration property.

<21> The image transfer sheet for electrophotography as described in <20>, wherein the photo-curable resin having the self-restoration property is a composition containing a photopolymerizable monomer and a photocuring initiator.

<22> The image transfer sheet for electrophotography as described in <20>, wherein the image receiving layer contains a mixture of the photo-curable resin and a resin other than the photo-curable resin.

<23> The image transfer sheet for electrophotography as described in <22>, wherein the resin other than the photo-curable resin is curable silicone resin.

<24> The image transfer sheet for electrophotography as described in <20>, wherein the image receiving layer contains a curable silicone compound containing at least one compound selected from the group consisting of fluorine-containing silicone compounds, isocyanatosilane compounds, alkoxysilane compounds, silane coupling agents, and silane compounds having SiH groups.

<25> The image transfer sheet for electrophotography as described in <20>, wherein the image receiving layer contains at least one modified silicone oil selected from thea group consisting of silanol-modified silicone oil, carboxy-modified silicone oil, and amino-modified silicone oil.

<26> The image transfer sheet for electrophotography as described in <20>, wherein the surface resistivity of both faces of the sheet is in a range of $1.0\times10^8\Omega$ to $1.0\times10^{13}\Omega$ at 23° C. and 55% RH.

<27> The image transfer sheet for electrophotography as described in <1>, wherein the image receiving layer contains a charge control agent.

<28> The image transfer sheet for electrophotography as described in <1>, wherein the image receiving layer contains a matting agent.

<29> The image transfer sheet for electrophotography as described in <1>, wherein the substrate is paper, a plastic film, a metal, or a ceramic.

<30> The image transfer sheet for electrophotography as described in <29>, wherein the substrate is a plastic film.

<31> An image recorded medium formed by process comprising: providing an image transfer sheet for electrophotography comprising a substrate and an image receiving layer provided on a surface of the substrate; electrophotographically forming a mirror image of a desired image made of an image forming material on the image receiving layer of the image transfer sheet; adhering the image receiving layer to an image supporting element by heat and pressure such that the mirror image contacts the image supporting element; and after cooling and solidifying the image formation material, peeling the substrate off the image receiving layer so as to transfer the image formation material to the image supporting element, wherein the image transfer sheet for electrophotography is the image transfer sheet for electrophotography as described in <1>.

<32> The image recorded medium as described in <31>, wherein the image supporting element is a plastic sheet.

<33> The image recorded medium as described in <31>, wherein at least a side of the image supporting element which side has the transferred image thereon comprises a vinyl chloride resin, a polycarbonate resin, or a polyester containing ethylene glycol, terephthalic acid, or 1,4-cyclohexandimethanol as a copolymer component.

<34> The image recorded medium as described in <31>, wherein the image supporting element comprises an information chip from which information can be retrieved by at least one of an electric system, a magnetic system, and an optical system.

<35> The image recorded medium as described in <34>, wherein the information chip is an IC chip.

<36> The image recorded medium as described in <34>, wherein the information is variable information.

<37> The image recorded medium as described in <36>, wherein the variable information include personal information.

<38> A method for manufacturing an image recorded medium, the method comprising: providing an image transfer sheet for electrophotography comprising a substrate and an image receiving layer provided on the substrate; electrophotographically forming a mirror image of a desired image made of an image forming material on the surface of the image transfer sheet which surface is on the side having thereon the image receiving layer; superposing the image transfer sheet on an image supporting element such that a surface of the image supporting element and the fixed mirror image contact each other to form a stacked assembly; subjecting the stacked assembly to thermocompression bonding; and after cooling and solidification of the image forming material; peeling the substrate off the image receiving layer so as to transfer the image forming material to the image supporting element, wherein the image transfer sheet for electrophotography is the image transfer sheet for electrophotography as described in <1>.

<39> The method as described in <38>, wherein two image transfer sheets for electrophotography subjected to the image-formation step are so as to keep the fixed image faces formed on the surfaces face to face in the superposing step.

<40> A method manufacturing for an image recorded medium comprising: providing an image transfer sheet for electrophotography comprising a substrate and an image receiving layer provided on the substrate; electrophotographically forming a mirror image of a desired image made of an image forming material on the surface of the image transfer sheet which surface is on the side having thereon the image receiving layer; superposing the image transfer sheet on an image supporting element such that a surface of the image supporting element and the fixed mirror image contact each other to form a stacked assembly; subjecting the stacked assembly to thermocompression bonding; and after cooling and solidification of the image forming material; peeling the substrate off the image receiving layer so as to transfer the image forming material to the image supporting element, wherein the image transfer sheet for electrophotography is the image transfer sheet for electrophotography as described in <1> and two image recorded media are produced using one transfer sheet for electrophotography.

EXAMPLES

Hereinafter, the present invention will be more specifically described by using Examples. However, the present invention is not limited to the following Examples. In the following description, the term "part" used in the Examples and Comparative Examples means "part by weight".

Example 1

A transfer sheet for electrophotography (transfer sheet 1) is manufactured as follows. Hereinafter, the manufacturing method will be described for each process.

(Preparation of Curable Resin Layer Coating Liquid 1)

20 parts of a silicone hardcoat agent containing an organic silane condensation product, melamine resin, and alkyd resin (manufactured by GE Toshiba Silicone; SHC900, solid content 30% by weight) is added to 30 parts of a solution obtained by mixing cyclohexanone and methyl ethyl ketone in a weight ratio of 10 to 90, and the mixture is thoroughly stirred to prepare a curable resin layer coating liquid 1.

(Preparation of Image Receiving Layer Coating Liquid 1)

30 parts of a polyester resin (manufactured by TOYOBO Co., Ltd.; VYLON 200), 1 part of cross-linked acrylic particles (manufactured by Soken Chemical & Engineering Co., Ltd.; MX-100, volume average particle diameter 10 μm), and 0.6 part of a charge control agent (manufactured by NOF CORPORATION; ELEGAN 264 WAX) are added to 70 parts of a solution obtained by mixing cyclohexanone and methyl ethyl ketone in a weight ratio of 10 to 90, and the mixture is thoroughly stirred to prepare an image receiving layer coating liquid 1.

(Preparation of Resistance Adjusting Layer Coating Liquid 1)

10 parts of a polyester resin (manufactured by Soken Chemical & Engineering Co., Ltd.; FORET 4M, solid content 30% by weight), 0.6 part of cross-linked acrylic particles (manufactured by Soken Chemical & Engineering Co., Ltd.; MX-300, volume average particle diameter 3 μm), and 0.3 part of a charge control agent (manufactured by NOF CORPORATION; ELEGAN 264 WAX) are added to 80 parts of a solution obtained by mixing cyclohexanone and methyl ethyl ketone in a weight ratio of 10 to 90, and the mixture is thoroughly stirred to prepare a resistance adjusting layer coating liquid 1.

(Manufacture of Transfer Sheet for Electrophotography)

Using a PET film (PET 100SG-2, thickness: 101 μm, manufactured by PANAC Industries, Inc.) bearing a separable thermosetting resin layer (a releasing layer) on one surface as a substrate, the resistance adjusting layer coating liquid 1 is applied to the other surface (the untreated surface) of the substrate by a wire bar, dried at 120° C. for 30 seconds to form a resistance adjusting layer with a thickness of 0.2 μm in the back side of the substrate. The curable resin layer coating liquid 1 is similarly applied to the surface of the separable thermosetting resin layer of the substrate by a wire bar and dried at 120° C. for 90 seconds to form a thermosetting resin layer with a thickness of 1 μm. Next, the image receiving layer coating liquid 1 is applied to the curable resin layer by a wire bar and dried at 120° C. for 60 second to form an image receiving layer with a thickness of 7.5 μm. After that, the substrate is cut in A4 size (210 mm×297 mm) to obtain a transfer sheet 1. The surface resistivity of the resistance adjusting layer in the transfer sheet 1 is $1.8 \times 10^9 \Omega$ (at 23° C. and 55% RH, hereinafter the same) and the surface resistivity of the image receiving layer is $3.7 \times 10^9 \Omega$. The peel strength between the curable resin layer and the separable thermosetting resin layer of the transfer sheet 1 is found to be 0.147 N/cm (15 gf/cm).

(Performance Evaluation of Image Forming Material Transfer Sheet for Electrophotography)

On the image receiving layer surface of the transfer sheet 1 (having no image thereon), a color mirror image of an image including a facial photograph, a name, numerical characters of 1 to 5 points in size, and a solid image is formed by using an image formation apparatus (a color copying machine DOCUCOLOR 1255CP manufactured by Fuji Xerox Co., Ltd.).

In the formation of this image, the traveling performance of the transfer sheet 1 in the image formation apparatus during conveyance is evaluated as follows:

—Traveling Performance Evaluation—

The traveling performance of the manufactured transfer sheet 1 in the color copying machine is evaluated by: setting 30 pieces of the transfer sheet 1 at the manual feed tray of the color copying machine DOCUCOLOR 1255CP, and counting the number of occurrences of jam and double feeding during continuous printing operation on the 30 pieces. The evaluation criteria are as follows:

A: the number of occurrences is 0;

B: the number of occurrences is 1; and

C: the number of occurrences is 2 or more.

The results are shown in Table 1.

(Manufacture of Image Recorded Medium (card 1))

An A4 white sheet (manufactured by Mitsubishi Plastics, Inc.; DIACLEAR W2012, thickness 600 μm) having front and rear surfaces made of PETG and core made of A-PET, is used as an image supporting element. The image transfer sheets 1 having the fixed images thereon are superposed on the front and rear surfaces of the image supporting element, respectively such that the image surfaces contact the A4-size white sheet. A laminator (manufactured by FUJIPLA Inc.; LAMIPACKER LPD3206 CITY) is used to perform lamination under the conditions of 160° C. and a feed rate of 0.3 m/min (5 mm/s). After the transfer sheets 1 are cooled to room temperature, the transfer sheets 1 are peeled off the white sheet to form a card 1 (an image recorded medium 1) having the transferred images including facial photographs on the white sheet.

(Evaluation of Image Recorded Medium)

The card 1 is evaluated as described below.

—Evaluation of Fixability of Image—

Evaluation of the fixability of a toner image is carried out by attaching a commercially available adhesive cellophane tape with a width of 18-mm (manufactured by NICHIBAN CO., LTD; Cellophane Tape) to the transferred image part on the front surface of the card 1 at a line pressure of 700 g/cm.

Then, the tape is peeled off at a speed of 10 mm/sec and the degree of peeling-off of the toner image is evaluated.

"A" indicates that the card 1 is not damaged at all, and "B" indicates that the image on the card 1 is peeled off or damaged even if only slightly. The results are shown in Table 1.

—Image Density and Quality Evaluation—

The evaluation of the image density is conducted by measuring the density of the solid image part by using the X-Rite 967 Densitometer (manufactured by X-Rite). "A" indicates that the image density is 1.5 or higher; "B" indicates that the image density is 1.3 or higher but lower than 1.5; and "C" indicates that the image density is lower than 1.3.

The image quality is evaluated based on whether the printed thin line textual image is precisely transferred (print reproducibility). After 1 to 5 point numerical characters are printed and transferred as an image, the minimum point size of the recognizable character is determined to evaluate the image quality. Specifically, "A" indicates that the minimum point size is 1 or 2 point, "B" indicates that the minimum point size is 3 point, "C" indicates that the minimum point size is 4 point, and "D" indicates that the minimum point size is 5 point or larger. The results are shown in Table 1.

—Evaluation of Surface Friction Wear Resistance—

Assuming that the manufactured card is used as a magnetic card, the card is passed through a magnetic card reader (manufactured by Elite; MR321/PS) 500 times continuously, and the scratches and wear which occur during this test are visually observed. "A" indicates that no change occurs, "B" indicates that only minute scratches are observable, "C" indicates that a significant scratch streak is observable, and "D" indicates that the image receiving layer is peeled off and the image is adversely affected. The results are shown in Table 1.

Comparative Example 1

Evaluation is carried out in the same manner as in Example 1, except that an unprocessed commercially available PET sheet (manufactured by Toray Industries, Inc.; T60, thickness 100 μm, surface resistivity $1 \times 10^{17} \Omega$) is used as the transfer sheet for electrophotography.

As a result, double feeding occurs frequently in the evaluation of the traveling performance. The fixed image does not have adequate density or image quality. Further, in manufacturing the image recorded medium, the PET sheet adheres to the white sheet (the image supporting element), and cannot be peeled off the white sheet. Therefore, the PET sheet cannot be used as a transfer sheet, and the desired image recorded medium is not obtained.

Example 2

(Preparation of Image Receiving Layer Coating Liquid 2)

20 parts of an acrylic urethane resin (manufactured by Soken Chemical & Engineering Co., Ltd.; FORET 4M, solid content 30% by weight), 0.1 part of cross-linked acrylic particles (manufactured by Soken Chemical & Engineering Co., Ltd.; MX-800, volume average particle diameter 8 μm), and 2.5 parts of a charge control agent (manufactured by NOF CORPORATION; ELEGAN 264 WAX) are added to 30 parts of a solution obtained by mixing cyclohexanone and methyl ethyl ketone in a weight ratio of 10 to 90. The mixture is thoroughly stirred to prepare an image receiving layer coating liquid 2.

(Manufacture of Transfer Sheet (Transfer Sheet 2) for Electrophotography)

A sheet is provided in the same manner as in Example 1 which has the resistance adjusting layer on its back surface and the releasing layer on the other surface. A resistance adjusting layer is formed on an un-treated face of a PET film (PET 100SG-2, thichness: 101 μm, manufactured by PANAC Industries, Inc.) and a 1 μm-thick curable resin layer is formed on the releasing layer and the coating liquid 2 for an image receiving layer is applied thereto by a wire bar and dried at 120° C. for 2 minutes to form an image receiving layer with a thickness of 5 μm. Thereafter, the obtained sheet is cut in A4 size (210 mm×297 mm) to obtain a transfer sheet 2. The surface resistivity of the image receiving layer is $2.3 \times 10^{12} \Omega$. The peel strength between the curable resin layer and the separable thermosetting resin layer of the transfer sheet 2 is found to be 0.147 N/cm (15 gf/cm).

(Performance Evaluation of Image Transfer Sheet 2 for Electrophotography)

On the image receiving layer surface of the transfer sheet 2 (having no image thereon), a color mirror image of an image including a facial photograph, a name, and a solid image is formed by using an image formation apparatus (a color copying machine DOCUCOLOR 1255CP manufactured by Fuji Xerox Co., Ltd.) in the same manner as in Example 1.

The traveling performance of the transfer sheet 2 during conveyance is evaluated in the same manner as in Example 1. There is no problem in conveyance as clarified in Table 1.

(Manufacture of Image Recorded Medium (card 2))

An A4-size white sheet (manufactured by Mitsubishi Plastics, Inc.; DIAFIX, thickness 600 μm) made of PETG is used as an image supporting element. The image transfer sheets 4 having fixed images thereon are respectively superposed on the front and rear surfaces of the image supporting element such that the image surfaces contact the white sheet. A laminator (manufactured by FUJIPLA Inc.; LAMIPACKER LPD3206 CITY) is used to perform lamination under the conditions of 170° C. and a feed rate of 0.3 m/min (5 mm/s). After the transfer sheets 2 are cooled to room temperature, the transfer sheets 4 are peeled off the white sheet to form a card 2 (an image recorded medium) having the transferred images including facial photographs on the white sheet.

(Evaluation of Card 2 (Image Recorded Medium 2))

The card 2 is evaluated with respect to the fixability of toner image, image density, image quality, and friction wear resistance, in the same manner as in Example 1. The results are shown in Table 1.

Example 3

(Preparation of Image Receiving Layer Coating Liquid 3)

40 parts of a urethane modified polyester resin (manufactured by TOYOBO Co., Ltd.; UR-4122, solid content 30% by weight), 0.6 part of cross-linked acrylic particles (manufactured by Soken Chemical & Engineering Co., Ltd.; MX-3000, volume average particle diameter 30 μm), and 0.8 part of a charge control agent (manufactured by NOF CORPORATION; ELEGAN 264 WAX) are added to 30 parts of a solution obtained by mixing cyclohexanone and methyl ethyl ketone in a weight ratio of 10 to 90. The mixture is thoroughly stirred to prepare an image receiving layer coating liquid 3.

(Manufacture of Transfer Sheet (Transfer Sheet 3) for Electrophotography)

A sheet is provided in the same manner as in Example 1 which has the resistance adjusting layer on its back surface and the releasing layer on the other surface. A 0.2 µm-thick resistance adjusting layer is formed on an un-treated surface of a PET film (PET 100SG-2, thickness: 101 µm, manufactured by PANAC Industries, Inc.) and a 3 µm-thick curable resin layer is formed on the releasing layer and the image receiving layer coating liquid 3 is applied thereto by a wire bar and dried at 120° C. for 4 minutes to form an image receiving layer with a thickness of 25 µm. Thereafter, the obtained sheet is cut in A4 size (210 mm×297 mm) to obtain a transfer sheet 3. The surface resistivity of the image receiving layer is $1.3 \times 10^8 \Omega$. The peel strength between the curable resin layer and the separable thermosetting resin layer of the transfer sheet 3 is found to be 0.098 N/cm (10 gf/cm).

(Performance Evaluation of Image Transfer Sheet 3 for Electrophotography)

On the image receiving layer surface of the transfer sheet 3 (having no image thereon), a color mirror image of an image including a facial photograph, a name, and a solid image is formed by using an image formation apparatus (a color copying machine DOCUCOLOR 1255CP manufactured by Fuji Xerox Co., Ltd.) in the same manner as in Example 1.

The traveling performance of the transfer sheet 3 during conveyance is evaluated in the same manner as in Example 1. There is no problem in conveyance as clarified in Table 1.

(Manufacture of Image Recorded Medium (Card 3))

An A4-size white sheet (manufactured by Mitsubishi Plastics, Inc.; VINYFOIL C-4636, thickness 500 µm) made of vinyl chloride resin is used as the image supporting element. The image transfer sheets 4 having the fixed images thereon are respectively superposed on the front and rear surfaces of the image supporting element such that the image surfaces contact the white sheet. A laminator (manufactured by FUJIPLA Inc.; LAMIPACKER LPD3206 CITY) is used to perform lamination under the conditions of 170° C. and a feed rate of 0.3 m/min (5 mm/s). After the transfer sheets 3 are cooled to room temperature, the transfer sheets 3 are peeled off the white sheet to form a card 3 (an image recorded medium 3) having the transferred images including facial photographs on the white sheet.

(Evaluation of Card 3 (Image Recorded Medium 3))

The card 3 is evaluated in the same manner as in Example 1, with respect to the fixability of toner image, image density, image quality, and friction wear resistance. The results are shown in Table 1.

Example 4

(Preparation of Curable Resin Layer Coating Liquid 2)

30 parts of an ultraviolet curable hard coating agent containing a silicone-modified acrylic resin (UVHC1105, solid content 100% by weight, manufactured by GE Toshiba Silicone Co., Ltd.) is added to 70 parts of isopropyl alcohol. The mixture is thoroughly stirred to produce the curable resin layer coating liquid 2.

(Preparation of Image Receiving Layer Coating Liquid 4)

40 parts of a polyester resin (manufactured by Soken Chemical & Engineering Co., Ltd.; FORET FF-4M, solid content 30% by weight), 6 parts of cross-linked acrylic particles (manufactured by Soken Chemical & Engineering Co., Ltd.; MX-500, volume average particle diameter 5 µm), and 0.4 part of a charge control agent (manufactured by NOF CORPORATION; ELEGAN 264 WAX) are added to 30 parts of a solution obtained by mixing cyclohexanone and methyl ethyl ketone in a weight ratio of 10 to 90. The mixture is thoroughly stirred to prepare an image receiving layer coating liquid 4.

(Manufacture of Transfer Sheet (Transfer Sheet 4) for Electrophotography)

A sheet is provided in the same manner as in Example 1 which has the resistance adjusting layer on its back surface and the releasing layer on the other surface. 0.2 µm-thick resistance adjusting layer is formed on an un-treated face of a PET film (PET 100SG-2, thickness: 101 µm, manufactured by PANAC Industries, Inc.) and a 2 µm-thick photo-curable resin layer is formed on the releasing layer on the other face by applying the curable resin layer coating liquid 2 by a wire bar and radiating ultraviolet rays at 160 W/cm for 15 seconds by an ultraviolet ray radiation apparatus (Unicure System, manufacture by Ushio Inc.). Further, the image receiving layer coating liquid 4 is applied thereto by a wire bar and dried at 120° C. for 1 minute to form an image receiving layer with a thickness of 2 µm. Thereafter, the sheet is cut in A4 size (210 mm×297 mm) to obtain a transfer sheet 4. The surface resistivity of the image receiving layer is $1.4 \times 10^9 \Omega$. The peel strength between the curable resin layer and the separable thermosetting resin layer of the transfer sheet 4 is found to be 0.343 N/cm (35 gf/cm).

(Performance Evaluation of Image Transfer Sheet 4 for Electrophotography)

On the image receiving layer surface of the transfer sheet 4 (having no image thereon), a color mirror image of an image including a facial photograph, a name, and a solid image is formed by using an image formation apparatus (a color copying machine DOCUCOLOR 1255CP manufactured by Fuji Xerox Co., Ltd.) in the same manner as in Example 1.

The traveling performance of the transfer sheet 4 during conveyance is evaluated in the same manner as in Example 1. There is no problem in conveyance as clarified in Table 1.

(Manufacture of Image Recorded Medium (Card 4))

An A4-size white sheet (manufactured by Mitsubishi Plastics, Inc.; PG-WHI, thickness 600 µm) made of PETG is used as an image supporting element. The image transfer sheets 6 having fixed images thereon are respectively superposed on the front and rear surfaces of the image supporting element such that the image surfaces contact the white sheet. A laminator (manufactured by FUJIPLA Inc.; LAMIPACKER LPD3206 CITY) is used to perform lamination under the conditions of 170° C. and a feed rate of 0.3 m/min (5 mm/s). After the transfer sheets 6 are cooled to room temperature, the transfer sheets 6 are peeled off the white sheet to form a card 4 (an image recorded medium 4) having the transferred images including facial photographs on the white sheet.

(Evaluation of Card 4 (Image Recorded Medium 4))

The card 4 is evaluated with respect to the fixability of toner image, image density, image quality, and friction wear resistance, in the same manner as in Example 1. The results are shown in Table 1.

Example 5

(Preparation of Image Receiving Layer Coating Liquid 5)

30 parts of a polyester resin (manufactured by TOYOBO Co., Ltd.; VYLON885), 0.5 part of cross-linked acrylic particles (manufactured by Soken Chemical & Engineering Co., Ltd.; MX-1500H, volume average particle diameter 15 μm), and 0.5 part of a charge control agent (manufactured by NOF CORPORATION; ELEGAN 264 WAX) are added to 70 parts of a solution obtained by mixing cyclohexanone and methyl ethyl ketone in a weight ratio of 10 to 90. The resultant mixture is thoroughly stirred to prepare an image receiving layer coating liquid 5.

(Manufacture of Transfer Sheet (Transfer Sheet 5) for Electrophotography)

In the same manner as Example 4, the image receiving layer coating liquid 5 is applied to the curable resin layer by a wire bar and dried at 120° C. for 2 minutes to form an image receiving layer with a thickness of 10 μm on the curable resin layer. Thereafter, the sheet is cut in A4 size (210 mm×297 mm) to obtain a transfer sheet 5. The surface resistivity of the image receiving layer is $7.3 \times 10^{11} \Omega$. The peel strength between the curable resin layer and the separable thermosetting resin layer of the transfer sheet 3 is found to be 0.343 N/cm (35 gf/cm).

(Performance Evaluation of Image Transfer Sheet 5 for Electrophotography)

On the image receiving layer surface of the transfer sheet 5 (having no image thereon), a color mirror image of an image including a facial photograph, a name, and a solid image is formed by using an image formation apparatus (a color copying machine DOCUCOLOR 1255CP manufactured by Fuji Xerox Co., Ltd.) in the same manner as in Example 1.

The traveling performance of the transfer sheet 5 during conveyance is evaluated in the same manner as in Example 1. There is no problem in conveyance as clarified in Table 1.

(Manufacture of Image Recorded Medium (Card 5))

An A4-size white sheet (manufactured by Mitsubishi Plastics, Inc.; PG-W, thickness 600 μm) made of PETG resin is used as an image supporting element. The image transfer sheets 7 having the fixed images are respectively superposed on the front and rear surfaces of the image supporting element such that the image surfaces contact the white sheet. A laminator (manufactured by FUJIPLA Inc.; LAMIPACKER LPD3206 CITY) is used to perform lamination under the conditions of 185° C. and a feed rate of 0.3 m/min (5 mm/s). After the transfer sheets 5 are cooled to room temperature, the transfer sheets 5 are peeled off the white sheet to form a card 5 (an image recorded medium 5) having the transferred images including facial photographs on the white sheet.

(Evaluation of Card 5 (Image Recorded Medium 5))

The card 5 is evaluated in the same manner as in Example 1, with respect to the fixability for toner image, image density, image quality, and friction wear resistance. The results are shown in Table 1.

Example 6

(Preparation of Image Receiving Layer Coating Liquid 6)

10 parts of a polyester resin (VYLON 296, manufactured by TOYOBO Co., Ltd.), 40 parts of a coating solution containing urethane-modified polyester (UR-1350, solid content: 33% by weight, manufactured by TOYOBO Co., Ltd.), 2 parts of a cross-linked acrylic fine particles (MX-2000, volume average particle diameter 20 μm: manufactured by Soken Chemical & Engineering Co., Ltd.), and 0.2 part of a charge control agent (ELEGAN 264 WAX, manufactured by NOF CORPORATION) are added to 80 parts of a mixed solution of cyclohexane and methyl ethyl ketone in a weight ratio of 10:90. The mixture is thoroughly stirred to obtain a image receiving layer coating liquid 6.

(Manufacture of Transfer Sheet (Transfer Sheet 6) for Electrophotography)

In the same manner as Example 4, the image receiving layer coating liquid 6 is applied to the curable resin layer by a wire bar and dried at 120° C. for 2 minutes to form an image receiving layer with a thickness of 15 μm on the curable resin layer. Thereafter, the sheet is cut in A4 size (210 mm×297 mm) to obtain a transfer sheet 6. The surface resistivity of the image receiving layer is $1 \times 10^{13} \Omega$. The peel strength between the curable resin layer and the separable thermosetting resin layer of the transfer sheet 6 is found to be 0.343 N/cm (35 gf/cm).

(Evaluation of Image Transfer Sheet 6 for Electrophotography)

In the same manner as Example 1, a color mirror image including a facial photograph, a name, and a solid image is formed on the image receiving layer surface of the transfer sheet 6 (having no image thereon) by using an image formation apparatus (a color copying machine DOCUCOLOR 1255 CP, manufactured by Fuji Xerox Co., Ltd.).

The traveling performance of the transfer sheet 6 during conveyance is evaluated in the same manner as Example 1. There is no problem as shown in Table 1.

(Manufacture of Image Recorded Medium (Card 6))

A white sheet (PG-WHIFG, thickness: 760 μm, manufactured by Mitsubishi Plastics, Inc.) with A4 size made of PETG resin is used as an image supporting element and the transfer sheets 6 having the fixed images thereon are superposed on the front and rear surfaces of the image supporting element, respectively such that the image surfaces contact the white sheet. A laminator (LAMIPACKER LPD 3206 City, manufactured by FujiPla Inc.) is used to perform lamination under the conditions of 180° C. and feeding speed of 0.3 m/min (5 mm/s). After the transfer sheets 8 are cooled to a room temperature, the transfer sheets are peeled off the white sheet to obtain a card 6 (an image recorded medium 6) having the transferred images including facial photographs on the white sheet.

(Evaluation of Card 6 (Image Recorded Medium 6))

The card 6 is evaluated in the same manner as Example 1, with respect to the fixability of the images, image density, image quality, and friction wear resistance. The results are shown in Table 1.

Example 7

(Preparation of Releasing Layer Coating Liquid 1)

40 parts of a silicon hard coating agent containing an organic silane condensate, a melamine resin, and an alkyd resin (SHC 900, solid content: 30% by weight, manufactured by GE Toshiba Silicone Co., Ltd.), 0.06 part of a trimethoxymethylsilane, and 0.06 part of an amino-modified silicone oil (TSF 4702, manufactured by GE Toshiba Silicone Co., Ltd.) are added to 60 parts of a mixed solution of cyclohexane and methyl ethyl ketone in a weight ratio of 10:90. The mixture is thoroughly stirred to obtain a releasing layer coating liquid 1.

(Preparation of Curable Resin Layer Coating Liquid 3)

30 parts of an ultraviolet-curable hard coating agent containing epoxy-modified acrylate (HITALOID 7851, solid content: 100% by weight, manufactured by Hitachi Chemical Co., Ltd.) is added to 70 parts of an isopropyl alcohol. The mixture is thoroughly stirred to produce a curable resin layer coating liquid 3.

(Preparation of Image Receiving Layer Coating Liquid 7)

40 parts of a polyester resin (VYLON MD-1500, solid content: 30% by weight, manufactured by TOYOBO Co., Ltd.), 0.6 part of a cross-linked acrylic fine particles (MX-1500 H, volume average particle diameter 15 μm: manufactured by Soken Chemical & Engineering Co., Ltd.), and 0.4 part of a charge control agent (ELEGAN 264 WAX, manufactured by NOF CORPORATION) are added to 20 parts of n-butylcellosolve. The mixture is thoroughly stirred to obtain an image receiving layer coating liquid 7.

(Manufacture of Transfer Sheet (Transfer Sheet 7) for Electrophotography)

Using a PET film (LUMIRROR 100T60, thickness: 100 μm, manufactured by Toray Industries, Inc.) as a substrate, the releasing layer coating liquid 1 is applied respectively to both surfaces of the substrate by a wire bar and dried at 120° C. for 30 seconds to form a 0.5 em-thick releasing layer on both front and rear surfaces of the substrate. The curable resin layer coating liquid 3 is applied to the releasing layer on both surfaces by a wire bar and radiated with ultraviolet rays with 160 W/cm intensity for 15 seconds by an ultraviolet radiation apparatus (Unicure System, manufacture by Ushio Inc.) to form a 2 μm-thick photo-curable resin layer on the releasing layer on both surfaces. Further, the image receiving layer coating liquid 7 is applied respectively thereto by a wire bar and dried at 80° C. for 5 minute to form an image receiving layer with a thickness of 10 μm on both front and rear surfaces of the substrate. Thereafter, the sheet is cut in A4 size (210 mm×297 mm) to obtain a transfer sheet 7. The surface resistivity of the image receiving layer on both surfaces is $6.2 \times 10^8 \Omega$. The peel strength between the curable resin layer and the separable thermosetting resin layer of the transfer sheet 7 is found to be 0.147 N/cm (150 gf/cm).

(Evaluation of Image Transfer Sheet 7 for Electrophotography)

On image receiving layer surfaces of the transfer sheet 7, a color mirror image including a facial photograph, a name, and a solid image is formed on both front and rear surfaces by an image formation apparatus (a color copying machine DOCU-COLOR 1255 CP, manufactured by Fuji Xerox Co., Ltd.) in the same manner as Example 1.

The traveling performance of the transfer sheet 7 during conveyance is evaluated in the same manner as Example 1 and there is no problem as shown in Table 1.

(Manufacture of Image Recorded Medium (Card 7))

A white sheets (PG-WHI, thickness: 500 μm, manufactured by Mitsubishi Plastics, Inc.) with A4 size are used as an image supporting element and superposed on both front and rear surfaces of the transfer sheet 7 having the fixed images. A laminator (LAMIPACKER LPD 3206 City, manufactured by FujiPla Inc.) is used to perform lamination under the conditions of 200° C. and feeding speed of 0.3 m/min (5 mm/s). After the white sheets are cooled to a room temperature, the white sheets are peeled off the transfer sheet 7 to obtain two cards 7 (image recorded medium 7) having the transferred images including facial photographs on the white sheets.

(Evaluation of Cards 7 (Image Recorded Medium 7))

The cards are evaluated in the same manner as Example 1, with respect to the fixability of the images, image density, image quality, and friction wear resistance. The results are shown in Table 1.

TABLE 1

| | Sheet | | | | | Image recorded medium | | | |
|---|---|---|---|---|---|---|---|---|---|
| | Curable resin layer | Image receiving layer | | | | | | | |
| | Thickness (μm) | Thickness (μm) | Fine particle diameter (μm) | Surface resistivity (Ω) | Traveling performance | Fixability | Image density | Image quality | Friction wear resistance |
| Example 1 | 1 | 7.5 | 10 | $3.7 \times 10^9$ | A | A | A | A | A |
| Example 2 | 1 | 5 | 8 | $2.3 \times 10^{12}$ | A | A | A | B | A |
| Example 3 | 3 | 25 | 30 | $1.3 \times 10^8$ | A | A | A | A | B |
| Example 4 | 2 | 2 | 5 | $1.4 \times 10^9$ | A | A | A | A | A |
| Example 5 | 2 | 10 | 15 | $7.3 \times 10^{11}$ | A | A | A | A | B |
| Example 6 | 2 | 15 | 20 | $1.0 \times 10^{13}$ | A | A | A | B | A |
| Example 7 | 2 | 10 | 15 | $6.2 \times 10^8$ | A | A | A | A | A |
| Comparative Example 1 | — | — | — | $1.0 \times 10^{17}$ | C | — | — | — | — |

As clear from Examples 1 to 7, the image transfer sheets for electrophotography of the invention exhibited superior traveling performance in the image formation apparatus and image transferability (image density and image quality). This is because the surface resistivity on the front and back surfaces thereof is in a range of $1.0 \times 10^8 \Omega$ to $1.0 \times 10^{13} \Omega$ at 23° C. and 55% RH, and because a releasing layer and an image receiving layer are formed successively on at least one side of the substrate, and because the image receiving layer contains fine particles having a volume average particle diameter which is larger than the thickness of the image receiving layer. On the other hand, the image transfer sheet for electrophotography of Comparative Example 1 exhibited insufficient performance as a transfer sheet element owing to the lack of the image receiving layer.

Further, the image recorded medium manufactured by using the respective image transfer sheets for electrophotography of Examples 1 to 7 are superior in any of the fixability, image density, and image quality, and are also good in quality as cards (information recording media).

Example 8

An image transfer sheet (transfer sheet 8) for electrophotography is manufactured. Hereinafter, the method of manufacture will be described for each process thereof.

<Manufacture of Image Transfer Sheet for Electrophotography>

—Preparation of Image Receiving Layer Coating Liquid A—

5 parts of a curable silicone resin (solid content: 100% by weight) (trade name: UVHC1105, manufactured by GE Toshiba Silicone Co., Ltd.), 5 parts of a polyester resin (trade name: FF-4, manufactured by Soken Chemical & Engineering Co., Ltd.), 0.5 part of a matting agent (silicone resin fine particles) (average diameter: 4.5 µm, GSD=1.5) (trade name: TOSPEARL TP145, manufactured by GE Toshiba Silicone Co., Ltd.), and 0.5 part of a quaternary ammonium salt as a charge control agent (trade name: ELEGAN 264 WAX, manufactured by NOF CORPORATION) are added to a solvent mixture of methyl ethyl ketone 80 parts and toluene 10 parts to obtain an image receiving layer coating liquid A.

(Manufacture of Image Transfer Sheet for Electrophotography)

In the same manner as Example 1, a resistance adjusting layer is applied uniformly on one surface of a polyethylene terephthalate substrate (trade name: PET100S-10, manufactured by Toray Industries Inc.) by a wire bar. The obtained image receiving layer coating liquid A of 25 g/m² is applied to the other surface of the substrate, and dried at 100° C. for 5 minutes and radiated with ultraviolet rays at 160 W/cm intensity for 1 minute at about 20 cm distance using a light radiation apparatus for carrying out photocuring reaction to obtain an image transfer sheet 8 for electrophotography having an image receiving layer (thickness 2.5 µm) which contains the photo-curable acrylic silicone resin and polyester resin on the polyethylene terephthalate substrate bearing the releasing layer.

The surface resistivity of the obtained image transfer sheet for electrophotography is $5.5 \times 10^9 \Omega$ in the image receiving layer side (the front surface side) and $1.8 \times 10^9 \Omega$ in the rear surface side. The peel strength between the image receiving layer of the transfer sheet 8 and the substrate is found to be 4.854 N/cm (495 gf/cm).

(Evaluation of the Image Transfer Sheet for Electrophotography)

A color mirror image including a solid image is printed on the surface of the image transfer sheet 8 (having no image thereon) by an image formation apparatus (a reformed color copying machine DOCUCOLOR 1250, manufactured by Fuji Xerox Co., Ltd.) to obtain the image transfer sheet 8 having the image formed thereon.

The traveling performance of the transfer sheet 8 during conveyance, the fixability of the image, the image density after image printing, and image re-transferability in relation to an object to be transferred are evaluated. The results are shown in Table 2.

—Traveling Performance Evaluation—

The traveling performance of the manufactured image transfer sheets in the color copying machine is evaluated by: setting 30 pieces of the image transfer sheet 8 at the manual feed tray of the reformed color copying machine DOCUCOLOR 1250 manufactured by Fuji Xerox Co., Ltd., and counting the number of occurrences of jam (clogging of films) and double feeding during continuous printing operation on the 30 pieces. The evaluation criteria are as follows:

A: the number of occurrences is 0;

B: the number of occurrences is 1; and

C: the number of occurrences is 2 or more.

—Evaluation of Fixability of Image—

Evaluation of the fixability of a toner image is carried out on the basis of the ratio (image density after peeling/image density before peeling; hereinafter abbreviated as OD ratio) of the image density after peeling to the image density before peeling when a commercially available adhesive cellophane tape with a width of 18-mm (manufactured by NICHIBAN CO., LTD; Cellophane Tape) is stuck by 300 g/cm linear pressure to a solid image part with an image density of about 1.8 in the image fixed on the surface of the image transfer sheet 8 by the above-mentioned electrophotographic apparatus and peeled off at 10 mm/sec. As a recorded medium for electrophotography, toner fixability of 0.8 or higher OD ratio is generally required. The evaluation standard is based on OD ratio as follows: 0.9 or higher, A; 0.8 or higher but lower than 0.9, B; and lower than 0.8, C.

—Image Density and Quality Evaluation—

The evaluation of the image density is conducted by measuring the density of the solid image part by using the X-Rite 968 Densitometer (manufactured by X-Rite). "A" indicates that the image density is 1.5 or higher; "B" indicates that the image density is 1.3 or higher but lower than 1.5; and "C" indicates that the image density is lower than 1.3.

The image quality evaluation is carried out by evaluating the precise printability of character (printing reproducibility) when images are outputted under high temperature and high humidity condition (28° C., 80% RH, condition 1), room temperature condition (22° C., 50% RH, condition 2), and low temperature and low humidity condition (15° C., 15% RH, condition 3). "A" indicates that there is no problem in any conditions, "B" indicates the condition in which the problem occurs.

—Evaluation of Image Transferability—

The medium to which the image is to be transferred is an A4 white sheet (manufactured by Mitsubishi Plastics, Inc.; DIACLEAR W2012, thickness 500 µm) having surface made of PETG and core made of A-PET. The transfer sheet 1 having the image described above is superposed on the white sheet such that the image surface contacts the white sheet. A laminator (manufactured by FUJIPLA Inc.; LAMIPACKER LPD3206 City) is used to adhere the transfer film 1 to the white sheet under the conditions of 160° C. and a feed rate of 0.3 m/min (5 mm/s). Thereafter, the image transfer sheet is peeled off to transfer (retransfer) the image and the image receiving layer to the white sheet.

"A" indicates that the image receiving layer is completely transferred to the white sheet together with the image. "B" indicates that the image receiving layer is partially left on the substrate. "C" indicates other cases.

The results are shown in Table 2.

(Evaluation of Image Recorded Medium)

An image recorded medium is produced in the same manner as Example 1 using the image transfer sheet 8 for electrophotography and subjected to the following evaluation.

—Evaluation of Fixability of Image—

Evaluation of the fixability of a toner image is carried out by attaching a commercially available adhesive cellophane tape with a width of 18-mm (Cellophane Tape, manufactured by Nichiban Co., Ltd.) to the transferred image part on the front surface of the card 1 at a line pressure of 700 g/cm. Then, the tape is peeled off at a speed of 10 mm/sec and the degree of peeling-off of the toner image is evaluated.

"A" indicates that there is not damaged at all, and "B" indicates that the image is peeled off or damaged even if only slightly. The results are shown in Table 2.

—Image Density and Quality Evaluation—

The evaluation of the image density is conducted by measuring the density of the solid image part by using the X-Rite 967 Densitometer (manufactured by X-Rite). "A" indicates that the image density is 1.5 or higher; "B" indicates that the image density is 1.3 or higher but lower than 1.5; and "C" indicates that the image density is lower than 1.3.

The image quality is evaluated based on whether the printed thin line textual image is precisely transferred (print reproducibility). After 1 to 5 point numerical characters are printed and transferred as an image, the minimum point size of the recognizable character is determined to evaluate the image quality. Specifically, "A" indicates that the minimum point size is 1 or 2 point, "B" indicates that the minimum point size is 3 point, "C" indicates that the minimum point size is 4 point, and "D" indicates that the minimum point size is 5 point or larger. The results are shown in Table 2.

—Image Density and Quality Evaluation—

—Evaluation of Surface Friction Wear Resistance—

Assuming that the manufactured card is used as a magnetic card, the card is passed through a magnetic card reader (MR 321/PS, manufactured by Elite Co. Ltd.) 500 times continuously, and the scratches and wear which occur during this test are visually observed. "A" indicates that no change occurs, "B" indicates that only minute scratches are observable, "C" indicates that a significant scratch streak is observable, and "D" indicates that the image receiving layer is peeled off and the image is adversely affected. The results are shown in Table 2.

Example 9

—Preparation of Image Receiving Layer Coating Liquid B—

17 parts of a thermosetting silicone resin (solid content: 30% by weight) (trade name: SHC-900, manufactured by GE Toshiba Silicone Co., Ltd.), 11 parts of an acrylic resin (solid content: 45.5% by weight) (trade name: M-45C, manufactured by Soken Chemical & Engineering Co., Ltd.), 0.3 part of a quaternary ammonium salt as a charge control agent (trade name: ELEGAN 264 WAX, manufactured by NOF CORPORATION), and 0.025 part of a matting agent (polymethyl methacrylate resin fine particles) (average diameter=5 μm) (trade name: MX-500, manufactured by Soken Chemical & Engineering Co., Ltd.) are added to a solvent mixture of methyl ethyl ketone 16 parts and toluene 4 parts to obtain 30 g/m² of an image receiving layer coating solution B.

(Manufacture of Image Transfer Sheet for Electrophotography)

In the same manner as Example 9, a resistance adjustment layer is formed on one surface of a polyethylene terephthalate substrate (trade name: PET100T-60, manufactured by Toray Industries Inc.). The obtained image receiving layer coating liquid B is applied to the other surface by a wire bar and then dried at a room temperature for 10 minutes and thermosetting reaction is carried out at 120° C. for 10 minutes by a hot air dryer to obtain an image transfer sheet 8 for electrophotography having an image receiving layer (thickness 2.5 μm) containing the thermosetting silicone resin on the polyethylene terephthalate substrate.

The surface resistivity of the obtained image transfer sheet 9 for electrophotography is $2.5 \times 10^{10} \Omega$ in the image receiving layer side (the front surface side) and $1.8 \times 10^{9} \Omega$ in the rear surface side. The substrate has 90% or higher transmittance in visible range and is sufficiently transparent. The peel strength between the image receiving layer of the transfer sheet 9 and the substrate is found to be 1.422 N/cm (145 gf/cm). Meanwhile, same as Example 8, the evaluation of the traveling performance in the apparatus during conveyance, fixability of the image, the image density after image printing, and the image retransferability to the object to receive an image are evaluated. Further, using the image transfer sheet 9 for electrophotography, an image recorded medium is produced in the same manner as Example 8 and evaluated. The results are shown in Table 2.

Example 10

An image transfer sheet 10 for electrophotography is produced in the same manner as Example 2, except that 0.05 part of trimethoxymethylsilane (trade name: LS-530) and modified silicone oil (trade name: TSF-4702, manufactured by GE Toshiba Silicone Co., Ltd.) respectively as curable silicone compounds are added to the image receiving layer coating liquid B in Example 9. The surface resistivity of the obtained image transfer sheet 10 for electrophotography is $4.5 \times 10^{10} \Omega$ in the image receiving layer side (the front surface side) and $1.8 \times 10^{9} \Omega$ in the rear surface side. The peel strength between the image receiving layer of the transfer sheet 10 and the substrate is found to be 0.098 N/cm (10 gf/cm). Meanwhile, same as Example 8, the evaluation of the traveling performance in the apparatus during conveyance, fixability of the image, the image density after image printing, and the image retransferability to the object to receive an image are evaluated. Further, using the image transfer sheet 10 for electrophotography, an image recorded medium is produced in the same manner as Example 8 and evaluated. The results are shown in Table 2.

Comparative Example 2

An image transfer sheet 11 for electrophotography is produced in the same manner as Example 1, except that the curable silicone resin is eliminated and polyester resin amount is changed to be 10 parts in production of the image receiving layer coating liquid B in Example 8. The surface resistivity of the obtained image transfer sheet 11 for electrophotography is $2.9 \times 10^{9} \Omega$ in the image receiving layer side (the front surface side) and $1.8 \times 10^{9} \Omega$ in the rear surface side. The peel strength between the image receiving layer of the transfer sheet 11 and the substrate is found to be 0.245 N/cm (25 gf/cm). Meanwhile, same as Example 8, the evaluation of the traveling performance in the apparatus during conveyance, fixability of the image, the image density after image printing, and the image retransferability to the object to receive an image are evaluated. Further, using the image transfer sheet 11 for electrophotography, an image recorded medium is produced in the same manner as Example 8 and evaluated. The results are shown in Table 2.

Comparative Example 3

An image transfer sheet 12 for electrophotography is produced in the same manner as Example 2, except that a polyester resin (trade name: FF-4, manufactured by Soken Chemical & Engineering Co., Ltd.) is used in place of the thermosetting silicone resin in Example 9 and the quaternary ammonium salt as the charge control agent is not used. The surface resistivity of the obtained image transfer sheet 12 for electrophotography is $6.8 \times 10^{15} \Omega$ in the image receiving layer side (the front surface side) and $1.8 \times 10^{9} \Omega$ in the rear surface side. The peel strength between the image receiving layer of the transfer sheet 12 and the substrate is found to be 0.275 N/cm (28 gf/cm). Meanwhile, same as Example 8, the evaluation of the traveling performance in the apparatus during conveyance, fixability of the image, the image density after image printing, and the image retransferability to the object to receive an image are evaluated. Further, using the image transfer sheet 12 for electrophotography, an image recorded medium is produced in the same manner as Example 8 and evaluated. The results are shown in Table 2.

TABLE 2

| | Sheet | | | | | Image recorded medium | | | Friction |
| --- | --- | --- | --- | --- | --- | --- | --- | --- | --- |
| | Traveling performance | Fixability | Image density | Image quality | Image transferability | Fixability | Image density | Image quality | wear resistance |
| Example 8 | A | A | A | A | A | A | A | A | A |
| Example 9 | A | A | A | A | A | B | A | B | A |
| Example 10 | A | A | A | A | A | A | A | A | B |
| Comparative Example 2 | A | A | A | A | A | B | A | B | D |
| Comparative Example 3 | A | A | C | B | A | C | C | D | D |

As clear from Table 2, the image transfer sheets for electrophotography in Examples 8 to 10 exhibited good traveling performance in the image formation apparatus and image transferability (image density and quality).

Example 11

(Preparation of Image Receiving Layer Coating Liquid C)

10 parts of a curable silicone resin (solid content: 100% by weight) (trade name: UVHC 1105, manufactured by GE Toshiba Silicone Co., Ltd.), 0.5 part of a matting agent (silicone fine particles) (average diameter=4.5 μm, GSD=1.5) (trade name: TOSPEARL TP 145, manufactured by GE Toshiba Silicone Co., Ltd.), and 2 parts of a quaternary ammonium salt as a charge control agent (trade name: ELEGAN 264 WAX, manufactured by NOF CORPORATION) are added to and diluted with 90 parts of isopropyl alcohol to obtain an image receiving layer coating liquid C.

(Manufacture of Image Transfer Sheet for Electrophotography)

25 g/m$^2$ of the obtained image receiving layer coating liquid C is applied to a substrate bearing a releasing layer (trade name: PET 100 SG-2, manufactured by PANAC Industries, Inc.) with an even thickness by a wire bar and then dried at 120° C. for 5 minutes and then radiated with light at 160 W/cm intensity for 1 minute at about 20 cm distance using a light radiation apparatus for carrying out photocuring reaction to obtain an image transfer sheet 13 for electrophotography having an image receiving layer (thickness 1.5 μm) containing the photo-curable acrylic silicone resin on the polyethylene terephthalate substrate bearing the releasing layer.

The surface resistivity of the obtained image transfer sheet 13 for electrophotography is $3.5 \times 10^{10} \Omega$ in the image receiving layer side (the front surface side) and $1.8 \times 10^{9} \Omega$ in the rear surface side. The peel strength between the image receiving layer of the transfer sheet 13 and the image receiving layer is found to be 0.343 N/cm (35 gf/cm). Meanwhile, same as Example 8, the evaluation of the traveling performance in the apparatus during conveyance, fixability of the image, the image density after image printing, and the image retransferability to the object to receive an image are evaluated. Further, using the image transfer sheet 13 for electrophotography, an image recorded medium is produced in the same manner as Example 8 and evaluated. The results are shown in Table 3.

Example 12

(Preparation of Image Receiving Layer Coating Liquid D)

10 parts of a curable silicone resin (solid content: 30% by weight) (trade name: SHC-900, manufactured by GE Toshiba Silicone Co., Ltd.), 0.05 part of a mixture of a curable silicone compound and a modified silicone oil (trade name: SIC-434, manufactured by Matsumoto Seiyaku Kogyo K.K.), 2 parts of a quaternary ammonium salt as a charge control agent (trade name: ELEGAN 264 WAX, manufactured by NOF CORPORATION), and 0.025 part of a matting agent (silicone fine particles) (average diameter=4.5 μm, GSD=1.5) (trade name: TOSPEARL TP 145, manufactured by GE Toshiba Silicone Co., Ltd.) are added to and diluted with 20 parts of ethyl acetate to obtain an image receiving layer coating liquid D.

(Manufacture of Image Transfer Sheet for Electrophotography)

The obtained image receiving layer coating liquid D is applied to a substrate bearing a releasing layer (trade name: PET 100 SG-2, manufactured by PANAC Industries, Inc.) with an even thickness of 30 g/m$^2$ by a wire bar and thereafter dried at a room temperature for 10 minutes and at 120° C. for 10 minutes by thermosetting reaction by a hot air dryer to obtain an image transfer sheet 14 for electrophotography having an image receiving layer (thickness 2.5 μm) containing the thermosetting silicone resin on the substrate bearing the releasing layer.

The surface resistivity of the obtained image transfer sheet 14 for electrophotography is $2.5 \times 10^{10} \Omega$ in the image receiving layer side (the front surface side) and $1.8 \times 10^{9} \Omega$ in the rear surface side under conditions of 25° C. and 65% RH. The substrate has 90% or higher transmittance in visible range and is sufficiently transparent. The peel strength between the image receiving layer of the transfer sheet 14 and the image receiving layer is found to be 0.539 N/cm (55 gf/cm). Meanwhile, same as Example 8, the evaluation of the traveling performance in the apparatus during conveyance, fixability of the image, the image density after image printing, and the image retransferability to the object to receive an image are evaluated. Further, using the image transfer sheet 14 for electrophotography, an image recorded medium is produced in the same manner as Example 8 and evaluated. The results are shown in Table 3.

Example 13

5 parts of a curable silicone resin (solid content: 100% by weight) (trade name: UVHC 1105, manufactured by GE Toshiba Silicone Co., Ltd.) of Example 11, 17 parts of a curable silicone resin (solid content: 30% by weight) (trade name: SHC-900, manufactured by GE Toshiba Silicone Co., Ltd.) of Example 12, 0.05 part of trimethoxymethylsilane (trade name: LS-530) and modified silicone oil (trade name: TSF-4702, manufactured by GE Toshiba Silicone Co., Ltd.) respectively, in place of SIC-434 as curable silicone compounds, and 2 parts of a quaternary ammonium salt as a charge control agent (trade name: ELEGAN 264 WAX, manufactured by NOF CORPORATION) are added and diluted with 80 parts of ethyl acetate to obtain an image transfer coating liquid E. In the same manner as Example 11, using the coating liquid E, an image transfer sheet 15 for electrophotography is obtained. The surface resistivity of the obtained image transfer sheet 15 is $4.9 \times 10^{10} \Omega$ in the image receiving layer side (the front surface side) and $1.8 \times 10^9 \Omega$ in the rear surface side under conditions of 25° C. and 65% RH. The peel strength between the releasing layer of the transfer sheet 15 and the image receiving layer is found to be 0.098 N/cm (10 gf/cm). Meanwhile, same as Example 8, the evaluation of the traveling performance in the apparatus during conveyance, fixability of the image, the image density after image printing, and the image retransferability to the object to receive an image are evaluated. Further, using the image transfer sheet 15 for electrophotography, an image recorded medium is produced in the same manner as Example 8 and evaluated. The results are shown in Table 3.

Comparative Example 4

An image transfer sheet 16 for electrophotography is produced in the same manner as Example 1, except that a PET substrate (trade name: PET100T-60, manufactured by PANAC Industries, Inc.) bearing no separable thermosetting resin layer is used in place of the PET film (PET 100SG-2, thickness: 101 μm, manufactured by PANAC Industries, Inc.) bearing a separable thermosetting resin layer in Example 11. The surface resistivity of the obtained image transfer sheet 16 for electrophotography is $2 \times 10^{10} \Omega$ in the image receiving layer side (the front surface side) and $1.8 \times 10^9 \Omega$ in the rear surface side under conditions of 25° C. and 65% RH. The peel strength between the substrate of the transfer sheet 16 for electrophotography and the image receiving layer is measured to find that the adhesion is so firm as to make the measurement impossible. Meanwhile, same as Example 8, the evaluation of the traveling performance in the apparatus during conveyance, fixability of the image, the image density after image printing, and the image retransferability to the object to receive an image are evaluated. Further, using the image transfer sheet 16 for electrophotography, an image recorded medium is produced in the same manner as Example 8 and evaluated. The results are shown in Table 3.

Comparative Example 5

An image transfer sheet 17 for electrophotography is produced in the same manner as Example 12, except that a polyester resin (trade name: FF-4, manufactured by Soken Chemical & Engineering Co., Ltd.) is used in place of the thermosetting silicone resin and the quaternary ammonium as the charge control agent is not used in Example 12. The surface resistivity of the obtained image transfer sheet 17 for electrophotography is $4.5 \times 10^5 \Omega$ in the image receiving layer side (the front surface side) and $1.8 \times 10^9 \Omega$ in the rear surface side under conditions of 25° C. and 65% RH. The peel strength between the releasing layer of the transfer sheet 17 and the image receiving layer is found to be 0.275 N/cm (28 gf/cm). Meanwhile, same as Example 8, the evaluation of the traveling performance in the apparatus during conveyance, fixability of the image, the image density after image printing, and the image retransferability to the object to receive an image are evaluated. Further, using the image transfer sheet 17 for electrophotography, an image recorded medium is produced in the same manner as Example 8 and evaluated. The results are shown in Table 3.

TABLE 3

| | Sheet | | | | | Image recorded medium | | | |
|---|---|---|---|---|---|---|---|---|---|
| | Traveling performance | Fixability | Image density | Image quality | Iamge transferability | Fixability | Image density | Image quality | Friction wear resistance |
| Example 11 | A | A | A | A | A | A | A | A | A |
| Example 12 | A | A | A | A | A | A | A | A | A |
| Example 13 | A | A | A | A | A | A | A | A | A |
| Comparative Example 4 | B | A | A | A | C | C | C | B | D |
| Comparative Example 5 | A | A | C | B | A | C | C | B | D |

As clear from Table 3, the image transfer sheets for electrophotography in Examples 11 to 13 exhibited good traveling performance in the image formation apparatus and image transferability (image density and quality).

Example 14

(Preparation of Image Receiving Layer Coating Liquid E)

A photo-curable urethane acrylate monomer (trade name: Karenzu AOI, manufactured by Showa Denko K.K.), a photocuring initiator (Irgacure 184) 5% by mole, a matting agent (silicone fine particles) (average diameter=4.5 μm, GSD=1.5) (trade name: TOSPEARL TP 145, manufactured by GE Toshiba Silicone Co., Ltd.) 0.5% by weight based on the monomer weight, and a quaternary ammonium salt as a charge control agent (trade name: ELEGAN 264 WAX, manufactured by NOF CORPORATION) 5% by weight based on the monomer weight are added to and diluted with a solvent mixture of methyl ethyl ketone/toluene (4:1 by weight) to obtain an image receiving layer coating liquid E.

(Manufacture of Image Transfer Sheet for Electrophotography)

The obtained image receiving layer coating liquid E is applied to a substrate bearing a releasing layer (trade name: PET 100 SG-2, manufactured by PANAC Industries, Inc.) with an even thickness of 25 g/m² by a wire bar and then dried at 100° C. for 5 minutes and then radiated with light at 160 W/cm intensity for 1 minute at about 20 cm distance using a high pressure mercury lamp for carrying out photocuring reaction to obtain an image transfer sheet 18 for electrophotography having an image receiving layer (thickness 2.1 μm) containing the photo-curable urethane acrylate resin on the polyethylene terephthalate substrate bearing the releasing layer.

The surface resistivity of the obtained image transfer sheet 18 for electrophotography is $4.5 \times 10^{10} \Omega$ in the image receiving layer side (the front surface side) and $1.8 \times 10^9 \Omega$ in the rear surface side. The peel strength between the image receiving layer of the transfer sheet 18 and the image receiving layer is found to be 3.432 N/cm (350 gf/cm).

With respect to the image transfer sheet 18 for electrophotography, the self-restoration property is measured as follows.

Under the atmospheric conditions of 23° C. and 55% relative humidity, a color OHP film (COLOR OHP FILM HG, manufactured by Fuji Xerox Office Supply Co., Ltd) of a 10 cm×10 cm size is fixed on a measurement stand by a double-coated tape, an object to be measured (an image transfer sheet for electrophotography) of a 10 cm×10 cm size is superposed while the image receiving layer is set in the inner side, a 500 g weight is put thereon, and only the object to be measured is repeatedly moved 10 cm horizontally 100 times. Before and after the above-described series of movement, the haze values are measured to find that the haze value difference before and after the movement is 7.5%. "A" indicates that the haze value difference is 10% or lower, "B" indicates that it exceeds 10%. Meanwhile, same as Example 8, the evaluation of the traveling performance in the apparatus during conveyance, fixability of the image, the image density after image printing, and the image retransferability to the object to receive an image are evaluated. Further, using the image transfer sheet 18 for electrophotography, an image recorded medium is produced in the same manner as Example 8 and evaluated. The results are shown in Table 4.

Example 15

—Preparation of Image Receiving Layer Coating Liquid F—

An image receiving layer coating liquid F is prepared in the same manner as Example 14, except a photo-curable silicon resin (trade name: UVHC1105, manufactured by GE Toshiba Silicone Co., Ltd.) is added in a proper amount to adjust the ratio of the photo-curable urethane acrylate monomer and the photo-curable silicon resin at 1:1 by weight and a mixture of a curable silicone compound and a modified silicon oil (trade name: SIC-434, manufactured by Matsumoto Seiyaku Kogyo K.K.) 0.5% by weight is added to the resin.

(Manufacture of Image Recorded Medium)

The obtained image receiving layer coating liquid F is applied to a PET substrate (trade name: PET-T60, manufactured by PANAC Industries, Inc.) with an even thickness of 30 g/m² by a wire bar and then dried at 100° C. for 5 minutes and then radiated with light at 160 W/cm intensity for 1 minute at about 20 cm distance using a high pressure mercury lamp for carrying out photocuring reaction to obtain an image transfer sheet 19 for electrophotography having an image receiving layer (thickness 2.5 μm) containing the self-restorable photo-curable resin and a photo-curable acrylic silicone resin.

The surface resistivity of the obtained image transfer sheet for electrophotography is $3.5 \times 10^{11} \Omega$ in the image receiving layer side (the front surface side) and $1.8 \times 10^9 \Omega$ in the rear surface side. The peel strength between the releasing layer of the transfer sheet 19 for electrophotography and the image receiving layer is found to be 4.413 N/cm (450 gf/cm). The substrate has 90% or higher transmittance in visible range and is sufficiently transparent. Meanwhile, same as Example 14, the self-restorability, the evaluation of the traveling performance in the apparatus during conveyance, fixability of the image, the image density after image printing, and the image retransferability to the object to receive an image are evaluated. Further, using the image transfer sheet 19 for electrophotography, an image recorded medium is produced in the same manner as Example 8 and evaluated. The results are shown in Table 4.

Example 16

An image receiving layer coating liquid G is prepared in the same manner as Example 15, except a thermosetting silicone compound (trade name: SHC-900, manufactured by GE Toshiba Silicone Co., Ltd.) is used in place of the photo-curable silicon resin. The obtained coating solution G for an image receiving layer is applied to a PET substrate (trade name: PET-T60, manufactured by PANAC Industries, Inc.) with an even thickness of 30 g/m² by a wire bar and then dried at 120° C. for 10 minutes and then radiated with light at 160 W/cm intensity for 1 minute at about 20 cm distance using a high pressure mercury lamp for carrying out photocuring reaction to obtain an image transfer sheet 20 for electrophotography having an image receiving layer (thickness 2.3 μm) containing the self-restorable photo-curable resin and the thermosetting acrylic silicone resin. The surface resistivity of the obtained image transfer sheet for electrophotography is $4.9 \times 10^{11} \Omega$ in the image receiving layer side (the front surface side) and $1.8 \times 10^9 \Omega$ in the rear surface side. The peel strength between the releasing layer of the transfer sheet 20 for electrophotography and the image receiving layer is found to be 0.451 N/cm (50 gf/cm). Meanwhile, same as Example 14, the self-restorability, the evaluation of the traveling performance in the apparatus during conveyance, fixability of the image, the image density after image printing, and the image retransferability to the object to receive an image are evaluated. Further, using the image transfer sheet 20 for electrophotography, an image recorded medium is produced in the same manner as Example 8 and evaluated. The results are shown in Table 4.

Comparative Example 6

An image transfer sheet 21 for electrophotography is produced in the same manner as Example 14, except that a polyester resin (trade name: FF-4, manufactured by Soken Chemical Engineering Co., Ltd.) is used in place of the photo-curable urethane acrylate monomer and the photocuring initiator to obtain an image receiving layer coating liquid H. The obtained image receiving layer coating liquid H is applied in an even thickness to a substrate bearing a releasing layer (trade name: PET 100SG-2, manufactured by PANAC Industries, Inc.) by a wire bar and then dried at 100° C. for 10 minutes to obtain an image transfer sheet 21 for electrophotography having an image receiving layer (thickness 2.6 µm). The surface resistivity of the obtained image transfer sheet 21 for electrophotography is $4.9\times10^{10}\Omega$ in the image receiving layer side (the front surface side) and $1.8\times10^{9}\Omega$ in the rear surface side under conditions of 25° C. and 65% RH. The peel strength between the releasing layer of the transfer sheet 21 and the image receiving layer is found to be 0.294 N/cm (30 gf/cm). Meanwhile, same as Example 14, the self-restorability, the evaluation of the traveling performance in the apparatus during conveyance, fixability of the image, the image density after image printing, and the image retransferability to the object to receive an image are evaluated. Further, using the image transfer sheet 21 for electrophotography, an image recorded medium is produced in the same manner as Example 8 and evaluated. The results are shown in Table 4.

Comparative Example 7

An image transfer sheet 22 for electrophotography is produced in the same manner as Example 15, except that a polyester resin (trade name: FF-4, manufactured by Soken Chemical Engineering Co., Ltd.) is used in place of the photocurable urethane acrylate monomer and the quaternary ammonium salt as a charge control agent is not used. The surface resistivity of the obtained image transfer sheet 22 for electrophotography is $4.5\times10^{15}\Omega$ in the image receiving layer side (the front surface side) and $1.8\times10^{9}\Omega$ in the rear surface side under conditions of 25° C. and 65% RH. The peel strength between the releasing layer of the transfer sheet 21 and the image receiving layer is found to be 0.343 N/cm (35 gf/cm). Meanwhile, same as Example 14, the self-restorability, the evaluation of the traveling performance in the apparatus during conveyance, fixability of the image, the image density after image printing, and the image retransferability to the object to receive an image are evaluated. Further, using the image transfer sheet 22 for electrophotography, an image recorded medium is produced in the same manner as Example 8 and evaluated. The results are shown in Table 4.

What is claimed is:

1. An image transfer sheet for electrophotography comprising:
   a substrate; and
   at least one layer including an image receiving layer on one side surface of the substrate, wherein
   at least one layer of the layers is a curable resin-containing layer which is a layer separable from the substrate or a layer disposed between the curable resin-containing layer and the substrate on the one side surface, and
   a surface resistivity of both surfaces of the sheet at 23° C. and 55% RH is in a range of $1.0\times10^{8}\Omega$ to $1.0\times10^{13}\Omega$ and a releasing layer, a curable resin layer containing a curable resin, and an image receiving layer are formed successively in this order from the substrate side.

2. The image transfer sheet for electrophotography according to claim 1, wherein a peel strength between the curable resin-containing layer and the releasing layer is in a range of 0.098 N/cm to 4.90 N/cm.

3. The image transfer sheet for electrophotography according to claim 1, wherein the image receiving layer has a thickness of 2 to 25 µm and contains a thermoplastic resin and particles having a volume average particle diameter larger than the thickness thereof.

4. An image transfer sheet for electrophotography, comprising:
   a substrate; and
   at least one layer including an image receiving layer on one side surface of the substrate, wherein
   at least one layer of the layers is a curable resin-containing layer which is a layer separable from the substrate or a layer disposed between the curable resin-containing layer and the substrate on the one side surface, and
   a releasing layer and an image receiving layer are successively formed on the one side surface of the substrate in which the image receiving layer is formed and the image receiving layer contains a curable silicone resin.

TABLE 4

| | Sheet | | | | | Image recorded medium | | | |
|---|---|---|---|---|---|---|---|---|---|
| | Traveling performance | Fixability | Image density | Image quality | Iamge transferability | Fixability | Image density | Image quality | Self-restorability |
| Example 14 | A | A | A | A | A | A | A | A | A |
| Example 15 | A | A | A | A | A | A | A | A | A |
| Example 16 | A | A | A | A | A | A | A | A | A |
| Comparative Example 6 | A | A | A | A | A | A | A | A | B |
| Comparative Example 7 | C | — | C | B | C | C | C | B | B |

As clear from Table 4, the image transfer sheets for electrophotography in Examples 14 to 16 exhibited good traveling performance in the image formation apparatus and image transferability (image density and quality).

Accordingly, the invention provides an image transfer sheet for electrophotography capable of transferring an image formed by electrophotography on an image supporting element in the state that the image is protected, a method for manufacturing an image recorded medium using the sheet, a transfer sheet for electrophotography for proving an image recorded medium, a manufacture method of the image recorded-medium using the sheet, and an image recorded medium.

5. The image transfer sheet for electrophotography according to claim 4, wherein the curable silicone resin is a resin mixture of an acryl-modified silicone resin and a thermosetting silicone resin.

6. The image transfer sheet for electrophotography according to claim 4, wherein the image receiving layer contains the curable silicone resin having at least one compound selected from the group consisting of fluorine-containing silicone compounds, isocyanatosilane compounds, alkoxysilane compounds, silane coupling agents, and silane compounds having SiH groups.

7. The image transfer sheet for electrophotography according to claim 4, wherein the image receiving layer comprises at least one modified silicone oil selected from the group consisting of silanol-modified silicone oil, carboxy-modified silicone oil, and amino-modified silicone oil.

8. A method for manufacturing an image recorded medium, the method comprising:
providing an image transfer sheet for electrophotography comprising a substrate and an image receiving layer provided on the substrate;
electrophotographically forming a mirror image of a desired image made of an image forming material on the surface of the image transfer sheet which surface is on the side having thereon the image receiving layer;
superposing the image transfer sheet on an image supporting element such that a surface of the image supporting element and the fixed mirror image contact each other to form a stacked assembly;
subjecting the stacked assembly to thermocompression bonding; and
after cooling and solidification of the image forming material peeling the substrate off the image receiving layer so as to transfer the image forming material to the image supporting element, wherein
the image transfer sheet for electrophotography comprising a substrate and at least one layer including an image receiving layer on one side surface of the-substrate, wherein at least one layer of the layers is a curable resin-containing layer which is a layer separable from the substrate or a layer disposed between the curable resin-containing layer and the substrate on the one side surface.

9. The method for manufacturing an image recorded medium according to claim 8, wherein two image transfer sheets for electrophotography subjected to the image-formation step are positioned so as to keep fixed image faces formed on the respective surfaces face to face in the superposing step.

10. A method for manufacturing an image recorded medium, comprising:
providing an image transfer sheet for electrophotography comprising a substrate and an image receiving layer provided on the substrate;
electrophotographically forming a mirror image of a desired image made of an image forming material on the surface of the image transfer sheet which surface is on the side having thereon the image receiving layer;
superposing the image transfer sheet on an image supporting element such that a surface of the image supporting element and the fixed mirror image contact each other to form a stacked assembly;
subjecting the stacked assembly to thermocompression bonding; and
after cooling and solidification of the image forming material, peeling the substrate off the image receiving layer so as to transfer the image forming material to the image supporting element, wherein
the image transfer sheet for electrophotography comprises a substrate and at least one layer including an image receiving layer on one side surface of the substrate,
wherein at least one layer of the layers is a curable resin-containing layer which is a layer separable from the substrate or a layer disposed between the curable resin-containing layer and the substrate on the one side surface, and two image recorded medium are produced using one transfer sheet for electrophotography.

\* \* \* \* \*